US012572091B2

(12) United States Patent
Munetsugu et al.

(10) Patent No.: US 12,572,091 B2
(45) Date of Patent: Mar. 10, 2026

(54) TONER CONTAINER HAVING SPECIFIC DIMENSIONS AND IMAGE FORMING SYSTEM

(71) Applicant: CANON KABUSHIKI KAISHA, Tokyo (JP)

(72) Inventors: Hiroyuki Munetsugu, Kanagawa (JP); Masaaki Sato, Kanagawa (JP); Goshi Ozaki, Kanagawa (JP); Mitsuhiro Sato, Tokyo (JP); Shinjiro Toba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/675,292

(22) Filed: May 28, 2024

(65) Prior Publication Data

US 2024/0310752 A1 Sep. 19, 2024

Related U.S. Application Data

(63) Continuation of application No. PCT/JP2022/040277, filed on Oct. 21, 2022.

(30) Foreign Application Priority Data

Dec. 6, 2021 (JP) ................................ 2021-197505
Dec. 16, 2021 (JP) ................................ 2021-204531

(51) Int. Cl.
*G03G 15/08* (2006.01)
*B65D 33/00* (2006.01)
(Continued)

(52) U.S. Cl.
CPC ......... *G03G 15/0874* (2013.01); *B65D 33/00* (2013.01); *B65D 83/06* (2013.01);
(Continued)

(58) Field of Classification Search
CPC ........... G03G 15/0874; G03G 15/0886; G03G 2215/0678; G03G 2215/0682;
(Continued)

(56) References Cited

U.S. PATENT DOCUMENTS 7,158,736 B2 1/2007 Sato et al.
7,212,768 B2 5/2007 Numagami et al.
(Continued)

FOREIGN PATENT DOCUMENTS

CN 112407574 A * 2/2021 ......... B65D 75/5827
JP H01-152355 U 10/1989
(Continued)

OTHER PUBLICATIONS

Co-Pending U.S. Appl. No. 18/679,707, filed May 31, 2024.
(Continued)

*Primary Examiner* — Robert B Beatty
(74) *Attorney, Agent, or Firm* — Venable LLP

(57) ABSTRACT

A toner container is provided with a bag member made of flexible film material and a discharging member connected to the bag member and configured to discharge toner from an accommodating space to an outside. When a length from an opposing surface of the discharging member to an end portion in an opposite side of the opposing surface of the bag member in a first direction is defined as Xmax, and in a case in which a position X (0≤X≤Xmax) using the opposing surface as a reference in the first direction is given, a length of the bag member on a plane perpendicular to the first direction in a second direction is defined as Y and a length of the bag member on the plane in a third direction is defined as Z, in a case in which Z is Z0 in X=0, Xmax>Y≥Z in a range of 0≤X≤Xmax, 0.8×Z0≤Z≤1.2×Z0 in the range of 0≤X≤Xmax, and Y≤2×Z in a range of 0≤X<0.5×Xmax.

20 Claims, 30 Drawing Sheets

(51) Int. Cl.
*B65D 83/00* (2006.01)
*B65D 83/06* (2006.01)

(52) U.S. Cl.
CPC ................ *B65D 2585/6892* (2013.01); *G03G 2215/0682* (2013.01)

(58) Field of Classification Search
CPC ........ B65D 25/42; B65D 29/00; B65D 33/00; B65D 47/263; B65D 83/06; B65D 2585/6892
USPC .................................................. 399/258, 262
See application file for complete search history.

(56) References Cited

U.S. PATENT DOCUMENTS 7,248,810 B2 7/2007 Miyabe et al.
7,349,657 B2 3/2008 Sato et al.
7,412,193 B2 8/2008 Sato et al.
7,660,550 B2 2/2010 Mori et al.
7,860,433 B2 12/2010 Toba et al.
7,894,733 B2 2/2011 Tanabe et al.
7,953,340 B2 5/2011 Tanabe et al.
8,160,478 B2 4/2012 Munetsugu et al.
8,165,493 B2 4/2012 Chadani et al.
8,213,831 B2 7/2012 Toba et al.
8,301,054 B2 10/2012 Tanabe et al.
8,712,284 B2 4/2014 Toba et al.
9,134,696 B2 9/2015 Sato et al.
9,213,266 B2 12/2015 Toba et al.
9,213,306 B2 12/2015 Morioka et al.
9,304,488 B2 4/2016 Toba et al.
9,377,714 B2 6/2016 Nakazawa et al.
9,429,877 B2 8/2016 Sato et al.
9,429,906 B2 8/2016 Yoshimura et al.
9,529,298 B2 12/2016 Sato et al.
9,632,451 B2 4/2017 Hayashi et al.
9,733,612 B2 8/2017 Toba et al.
9,804,560 B2 10/2017 Sato et al.
9,836,020 B2 12/2017 Yoshimura et al.
9,885,974 B2 2/2018 Sato et al.
10,139,777 B2 11/2018 Sato et al.
10,168,664 B2 1/2019 Yoshimura et al.
10,228,652 B2 3/2019 Sato et al.
10,254,712 B2 4/2019 Uneme et al.
10,353,339 B2 7/2019 Koishi et al.
10,386,786 B2 8/2019 Sato et al.
10,401,788 B2 9/2019 Yoshimura et al.
10,459,402 B2 10/2019 Kashiide et al.
10,534,313 B2 1/2020 Sugimoto et al.
10,591,868 B2 3/2020 Yoshimura et al.
10,635,047 B2 4/2020 Kamoshida et al.
10,678,185 B2 6/2020 Uneme et al.
10,705,480 B2 7/2020 Sato et al.
10,712,708 B2 7/2020 Sato et al.
10,782,647 B2 9/2020 Kashiide et al.
10,824,110 B2 11/2020 Sugimoto et al.
10,901,365 B2 1/2021 Sato et al.
10,996,623 B2 5/2021 Sato et al.
11,036,181 B2 6/2021 Uneme et al.
11,067,950 B2 7/2021 Kashiide et al.
11,099,521 B2 8/2021 Uneme et al.
11,112,751 B2 9/2021 Sato et al.
11,131,960 B2 9/2021 Sato et al.
11,156,954 B2 10/2021 Yoshimura et al.
11,175,624 B2 11/2021 Sugimoto et al.
11,307,529 B2 4/2022 Sato et al.
11,307,531 B2 4/2022 Uneme et al.
11,314,199 B2 4/2022 Sato et al.
11,353,822 B2 6/2022 Kashiide et al.
11,385,593 B2 7/2022 Sato et al.
11,520,284 B2 12/2022 Sato et al.
11,567,445 B2 1/2023 Munetsugu et al.
11,573,524 B2 2/2023 Sugimoto et al.
11,592,766 B2 2/2023 Ozaki et al.
11,599,058 B2 3/2023 Yoshimura et al.
11,614,710 B2 3/2023 Sato et al.
11,662,673 B2 5/2023 Ozaki et al.
11,662,687 B2 5/2023 Kashiide et al.
11,693,355 B2 7/2023 Sato et al.
11,693,356 B2 7/2023 Ozaki et al.
11,698,601 B2 7/2023 Sato et al.
11,754,970 B2 9/2023 Yoshimura et al.
11,774,881 B2 10/2023 Sato et al.
11,796,958 B2 10/2023 Munetsugu et al.
11,822,265 B2 11/2023 Ozaki et al.
11,829,096 B2 11/2023 Ozaki et al.
11,829,100 B2 11/2023 Fukui et al.
11,927,910 B2 3/2024 Murakami et al.
11,960,237 B2 4/2024 Sato et al.
11,960,239 B2 4/2024 Kashiide et al.
11,966,193 B2 4/2024 Ozaki et al.
11,977,344 B2 5/2024 Toba et al.
12,050,432 B2 7/2024 Sato et al.
12,066,769 B2 8/2024 Sato et al.
12,066,785 B2 8/2024 Sugimoto et al.
12,072,664 B2 8/2024 Matsumaru et al.
2001/0033758 A1* 10/2001 Katsuyama ........ G03G 15/0865 399/258
2004/0131392 A1* 7/2004 Matsumoto ........ G03G 15/0886 399/262
2005/0226655 A1* 10/2005 Katsuyama ........ G03G 15/0877 399/258
2008/0063434 A1* 3/2008 Uno .................. G03G 15/0879 399/260
2020/0301352 A1 9/2020 Matsumaru et al.
2022/0155708 A1 5/2022 Sato et al.
2023/0176496 A1 6/2023 Fujino et al.
2023/0176503 A1 6/2023 Fukui et al.
2023/0205129 A1 6/2023 Suetsugu et al.
2023/0244157 A1 8/2023 Kubo et al.
2023/0266695 A1 8/2023 Munetsugu et al.
2023/0297024 A1 9/2023 Sato et al.
2023/0324829 A1 10/2023 Munetsugu et al.
2023/0367260 A1 11/2023 Yoshimura et al.
2023/0400792 A1 12/2023 Sato et al.
2023/0408970 A1 12/2023 Munetsugu et al.
2024/0012357 A1 1/2024 Ozaki et al.
2024/0036496 A1 2/2024 Ozaki et al.
2024/0036513 A1 2/2024 Fukui et al.
2024/0045367 A1 2/2024 Uoo et al.
2024/0069489 A1 2/2024 Sato et al.
2024/0142913 A1 5/2024 Sato et al.
2024/0168425 A1 5/2024 Munetsugu et al.
2024/0219866 A1 7/2024 Kashiide et al.
2024/0231271 A1 7/2024 Ozaki et al.
2024/0264552 A1 8/2024 Sato et al.
2024/0302788 A1 9/2024 Sato et al.
2024/0302789 A1 9/2024 Sato et al.

FOREIGN PATENT DOCUMENTS

JP H05-35095 A 2/1993
JP 2002-002833 A 1/2002
JP 2004-185038 A 7/2004
JP 2006-201362 A 8/2006
JP 2006-235046 A 9/2006
JP 3132556 U 6/2007
JP 3132566 U 6/2007
JP 2010-030632 A 2/2010
JP 2021-026200 A 2/2021
JP 2021026202 A 2/2021
WO WO-2021177109 A1 * 9/2021 ............. B65D 77/30
WO WO-2021241568 A1 * 12/2021 ............. B65D 81/34

OTHER PUBLICATIONS

Co-Pending U.S. Appl. No. 18/731,432, filed Jun. 3, 2024.
Co-Pending U.S. Appl. No. 18/749,774, filed Jun. 21, 2024.
Co-Pending U.S. Appl. No. 18/768,295, filed Jul. 10, 2024.
Co-Pending U.S. Appl. No. 18/806,952, filed Aug. 16, 2024.
Co-Pending U.S. Appl. No. 18/806,982, filed Aug. 16, 2024.
Co-Pending U.S. Appl. No. 18/815,906, filed Aug. 27, 2024.

(56) References Cited

OTHER PUBLICATIONS

Co-Pending U.S. Appl. No. 18/817,460, filed Aug. 28, 2024.
Co-Pending U.S. Appl. No. 18/628,926, filed Apr. 8, 2024.
International Search Report and Written Opinion for International Patent Application No. PCT/JP2022/040277.
Jul. 15, 2025 Office Action in Japanese Patent Application Pub. No. 2021-204531.
Sep. 30, 2025 Office Action in Japanese Patent Application Pub. No. 2021-204531 (with English translation).

* cited by examiner (a)

(b)

(a)

(b)

TONER CONTAINER HAVING SPECIFIC DIMENSIONS AND IMAGE FORMING SYSTEM

TECHNICAL FIELD

The present invention relates to a toner container and an image forming system.

BACKGROUND ART

In an image forming apparatus of electrophotographic type, an electrostatic latent image formed on an image bearing member such as a photosensitive drum is developed using toner as developer to visualize the image as a toner image. A method for replenishing the toner consumed by the development is to provide a replenishing opening in the image forming apparatus, and when toner replenishment becomes necessary, a toner container is mounted to the replenishing opening and only the toner in the toner container is transferred into the image forming apparatus. In Japanese Patent Application Laid-Open No. 2021-26202, a toner container including a bag member (pouch) made of flexible film and a base for discharging toner in the pouch with a supplying opening being connected to a replenishing opening of an image forming apparatus is disclosed.

SUMMARY OF THE INVENTION

Problem to be Solved by the Invention

In recent years, it is demanded from users that a toner container mountable to an image forming apparatus be used in a variety of ways.

Therefore, an object of the present invention is to provide a form of a toner container mounted to an image forming apparatus.

Means for Solving the Problem

An aspect of the present invention is a toner container mounted to and demounted from an image forming apparatus comprising: a bag member made of flexible film material, the bag member including a side surface portion configured to form an accommodating space for accommodating toner inside thereof and extend in a first direction and a bottom portion configured to close the accommodating space from one side in the first direction; and a discharging member connected to the bag member and configured to discharge the toner from the accommodating space to an outside, the discharging member including an opposing surface configured to close the accommodating space from an other side in the first direction and opposed to the bottom portion, a receiving opening provided in the opposing surface and configured to receive the toner inside the accommodating space, and a discharging opening communicating with the receiving opening and configured to discharge the toner received via the receiving opening, wherein when directions perpendicular to the first direction respectively and perpendicular to each other are respectively defined as a second direction and a third direction, a length from the opposing surface to an end in an opposite side of the opposing surface of the bag member in the first direction is defined as Xmax, and in a case in which a position X (0≤X≤Xmax) using the opposing surface as a reference in the first direction is given, a length of the bag member on a plane perpendicular to the first direction in the second direction is defined as Y and a length of the bag member on the plane in the third direction is defined as Z, in a case in which Z is Z0 in X=0, Xmax>Y≥Z in a range of 0≤X≤Xmax, 0.8×Z0≤Z≤1.2×Z0 in the range of 0≤X≤Xmax, and Y≤2×Z in a range of 0≤X<0.5×Xmax.

Effect of the Invention

According to the present invention, it becomes possible to provide a form of a toner container mountable to an image forming apparatus.

BRIEF DESCRIPTION OF THE DRAWINGS

Part (*a*) of FIG. 1 is a cross-sectional view and part (*b*) of FIG. 1 is a perspective view of an image forming apparatus according to an Embodiment 1.

Figure 5:
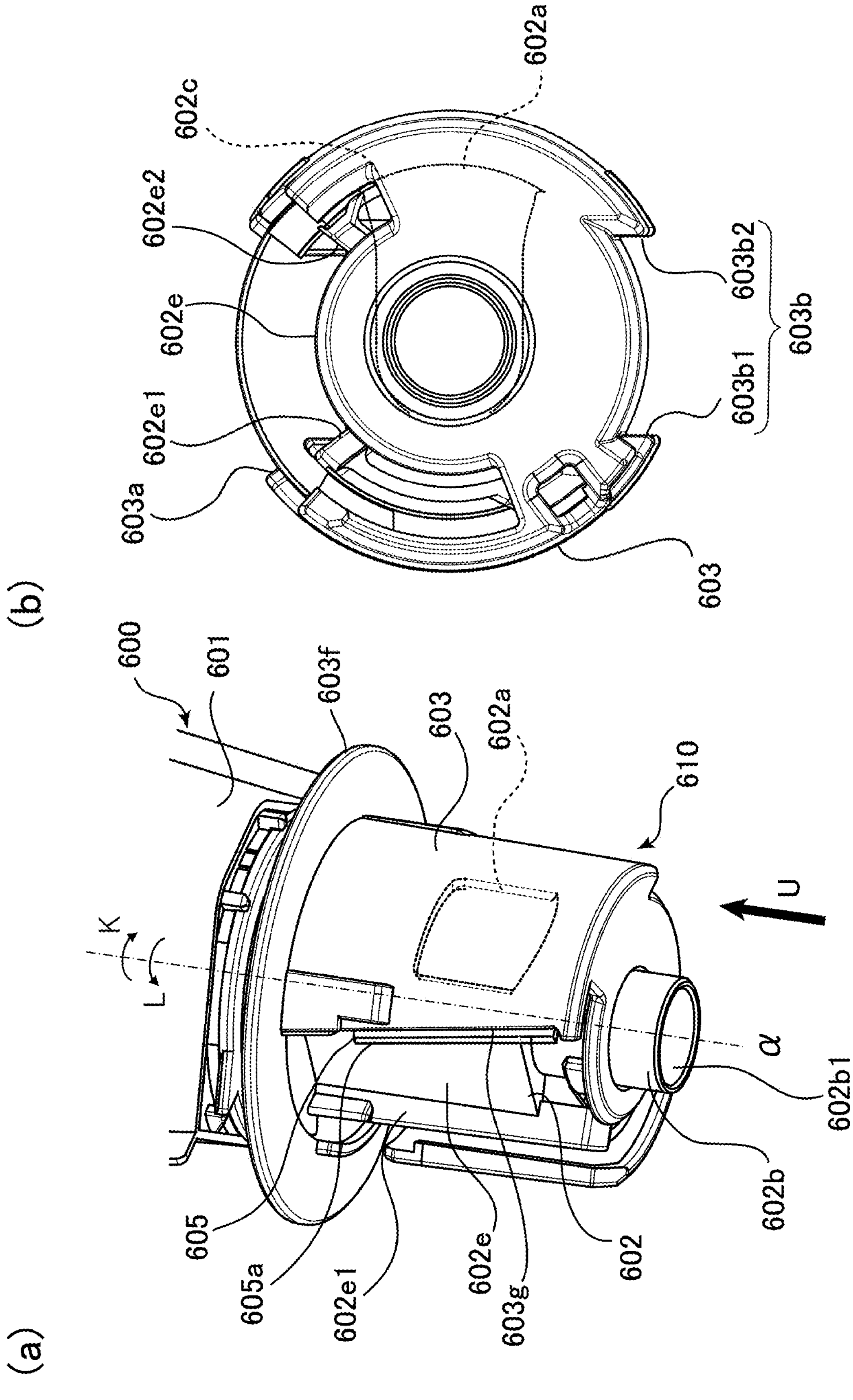

Part (*a*) of FIG. 5 is a perspective view and part (*b*) is a bottom view of a nozzle of the toner pack according to the Embodiment 1.

Figure 6:
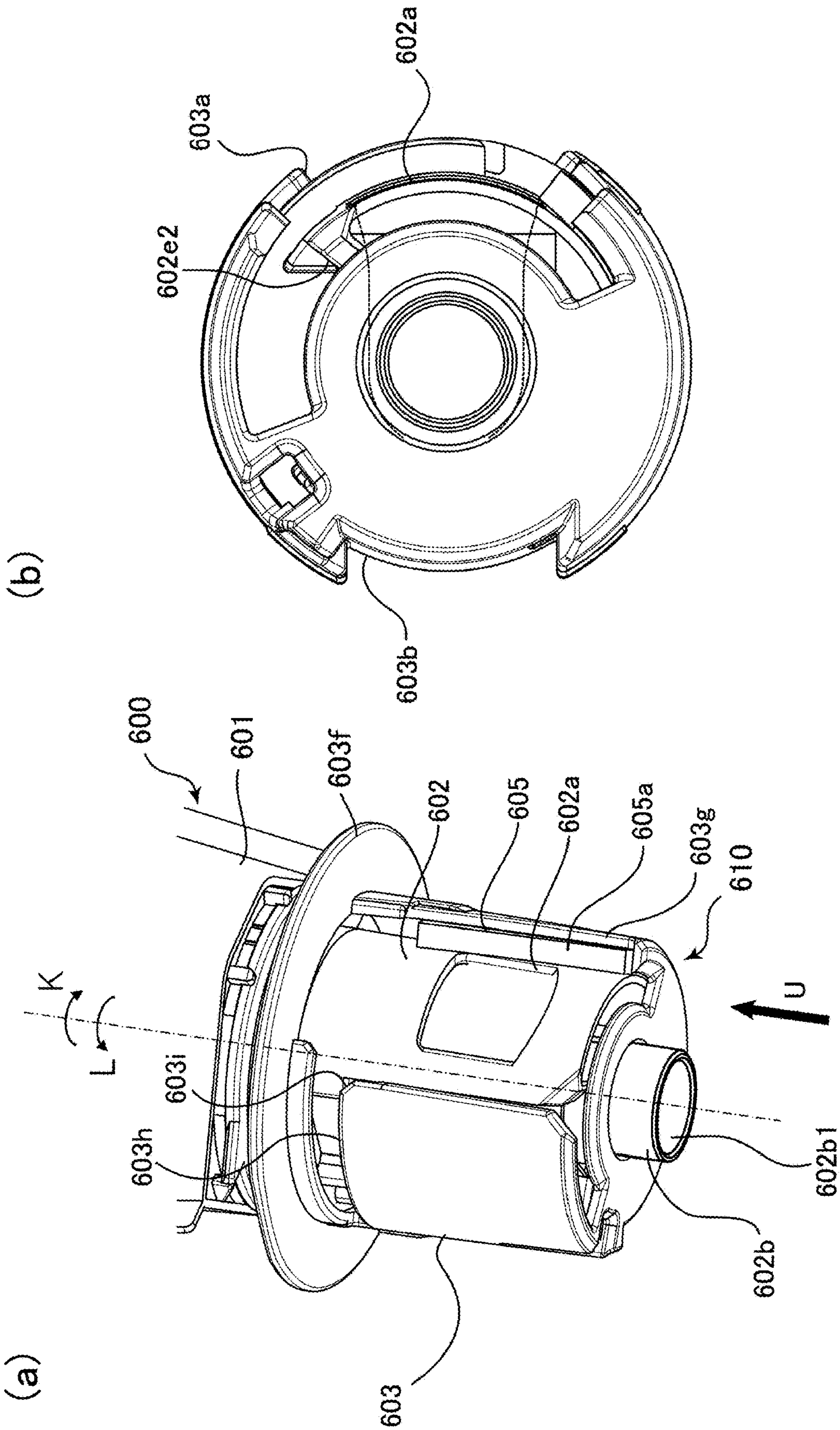

Part (*a*) of FIG. 6 is a perspective view and part (*b*) is a bottom view of the nozzle of the toner pack according to the Embodiment 1.

Figure 7:
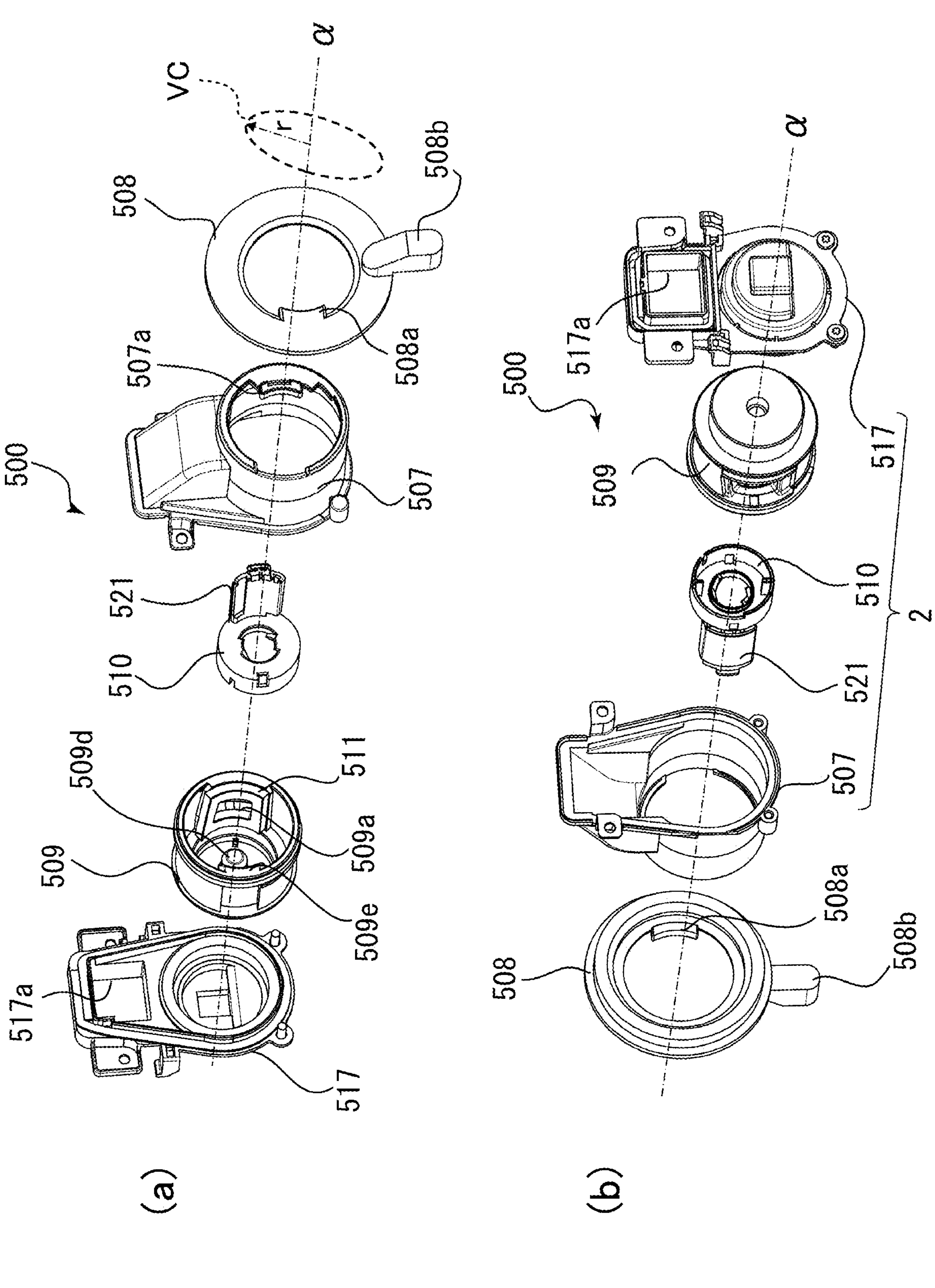

FIG. 7, part (*a*) and part (*b*), is an exploded view of a mounting portion according to the Embodiment 1.

Figure 8:
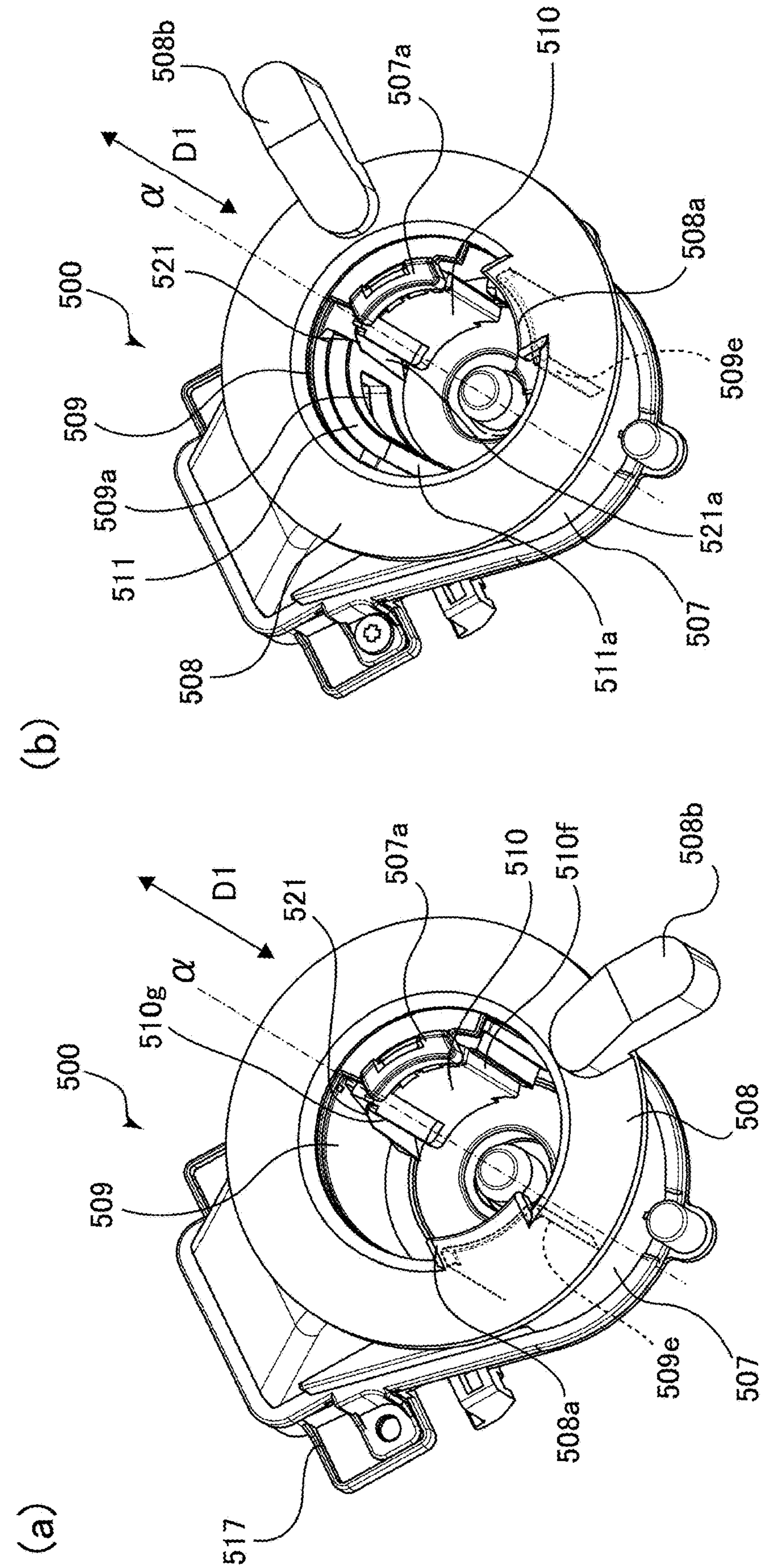

FIG. 8, part (*a*) and part (*b*), is a perspective view of the mounting portion according to the Embodiment 1.

Figure 9:
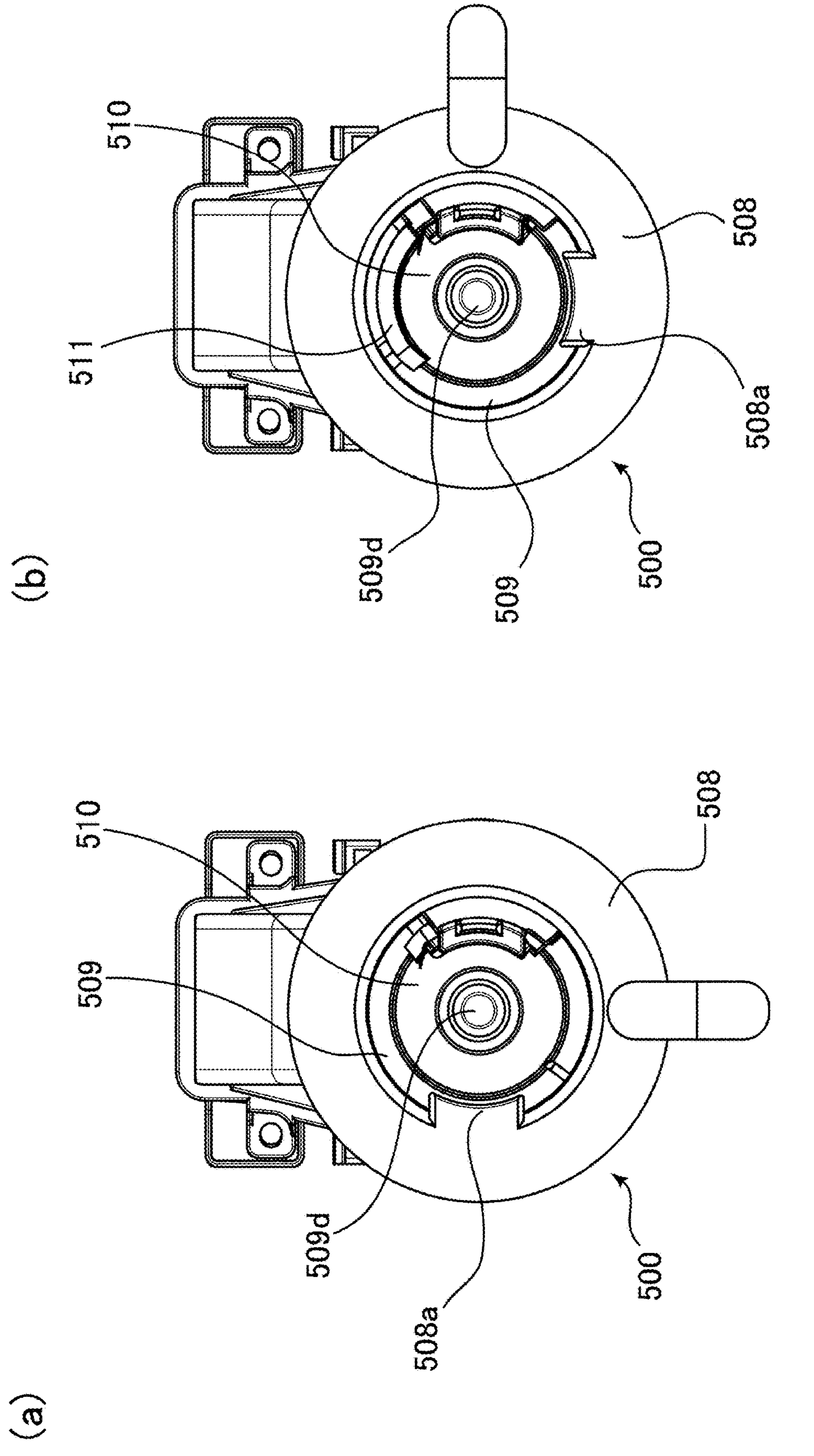

FIG. 9, part (*a*) and part(*b*), is a plane view of the mounting portion according to the Embodiment 1.

Figure 10:
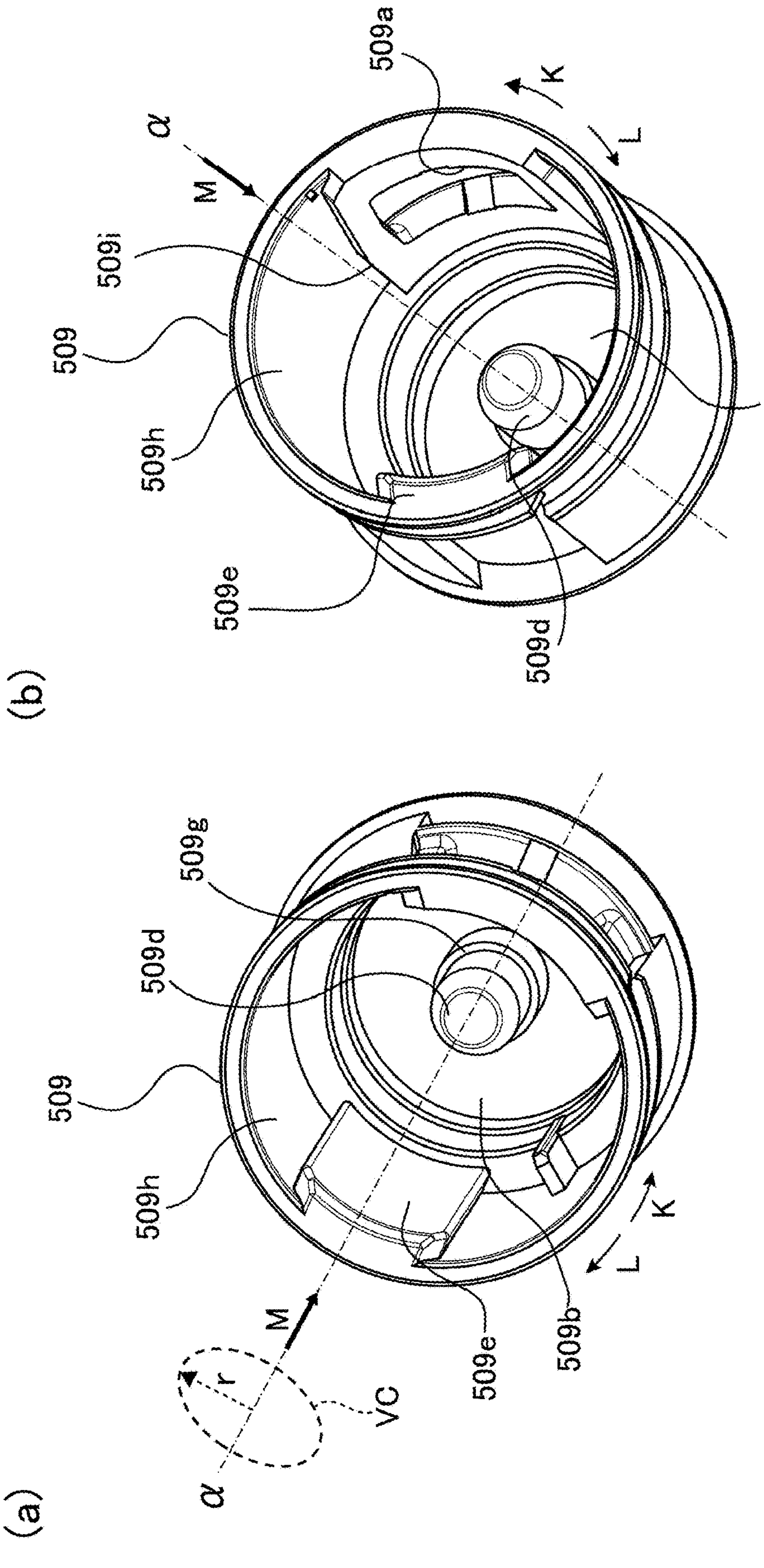

FIG. 10, part (*a*) and part (*b*), is a perspective view of an apparatus side shutter of the mounting portion according to the Embodiment 1.

Figure 11:
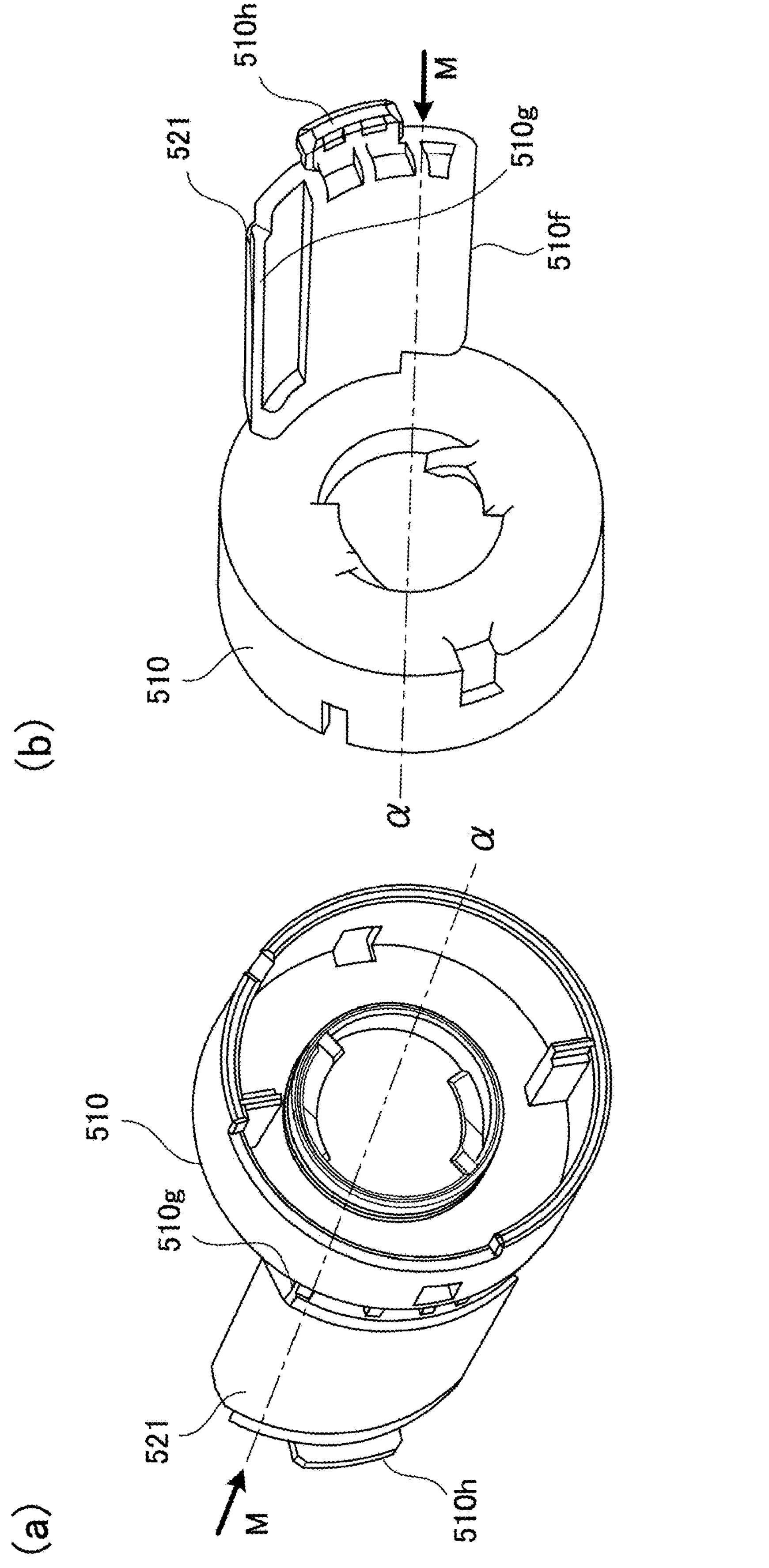

FIG. 11, part (*a*) and part (*b*), is a perspective view illustrating a cover and a shutter sheet of the mounting portion according to the Embodiment 1.

Figure 12:
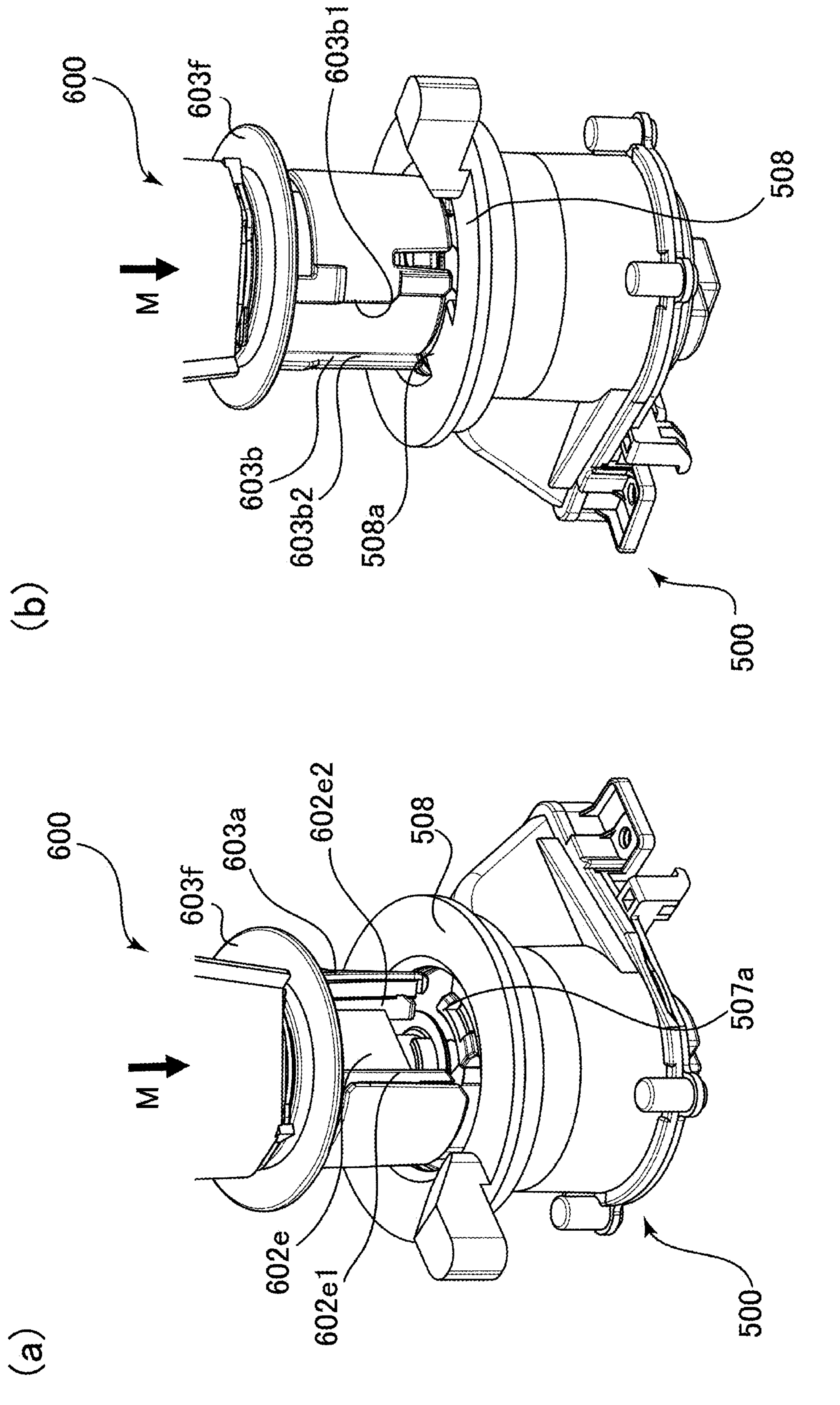

FIG. 12, part (*a*) and part (*b*), is a perspective view illustrating a state in which the toner pack according to the Embodiment 1 is in a process of being mounted to the mounting portion.

Figure 13:
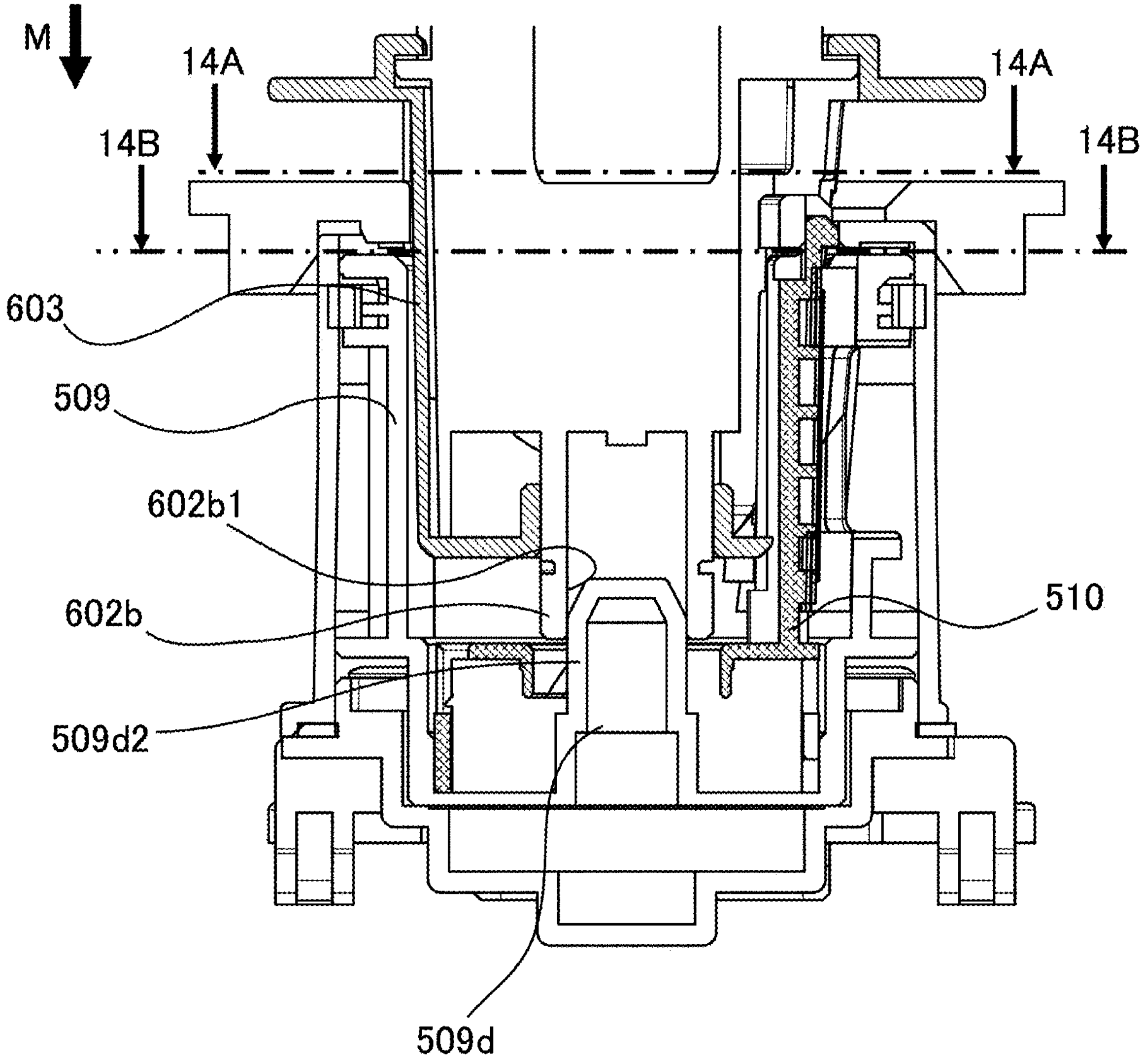

FIG. 13 is a cross-sectional view illustrating a state in which the toner pack according to the Embodiment 1 is in a process of being mounted to the mounting portion.

Figure 14:
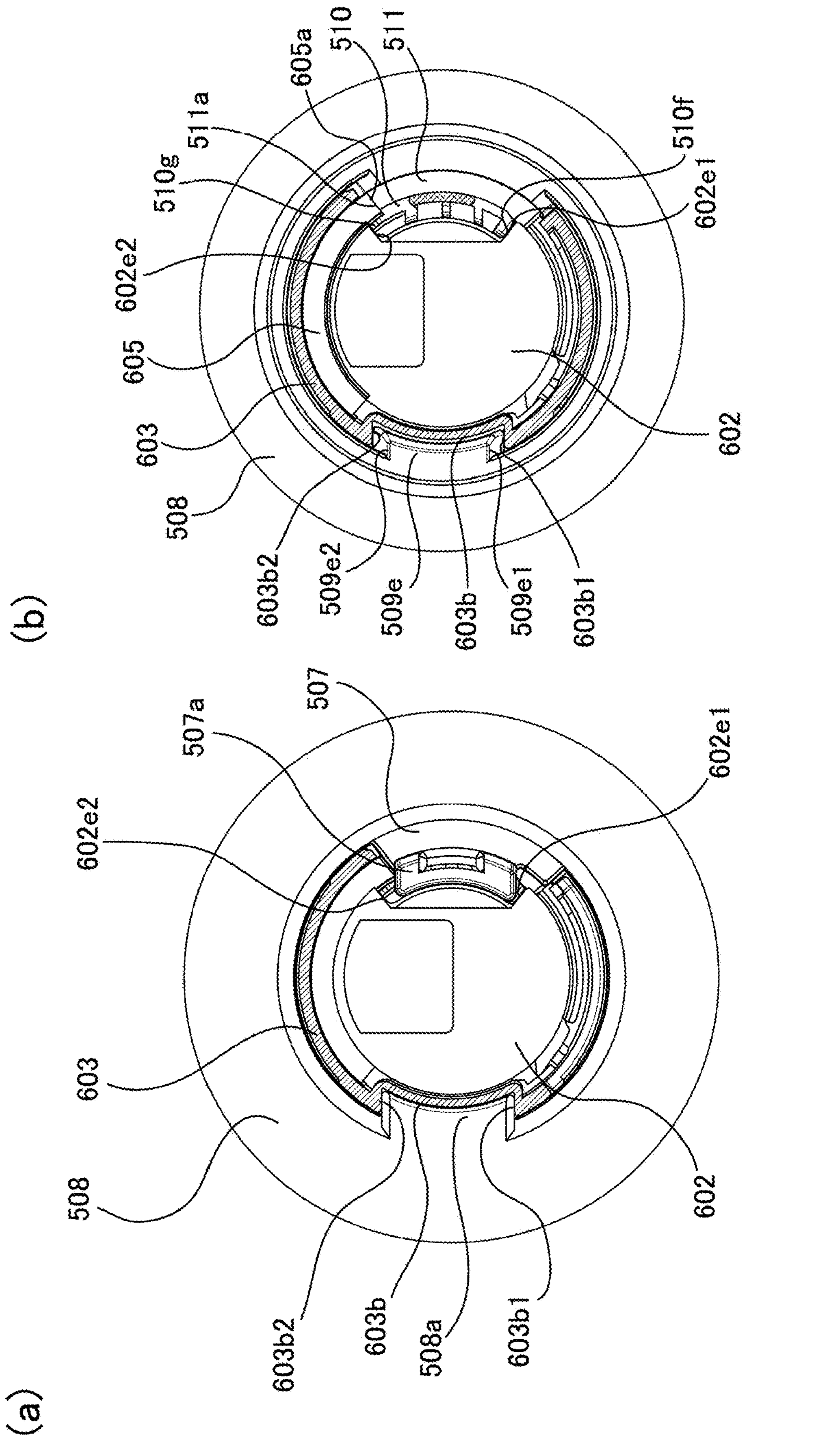

FIG. 14, part (*a*) and part (*b*), is a cross-sectional view of the toner pack and the mounting portion in cross-sectional positions shown in FIG. 13.

Figure 15:
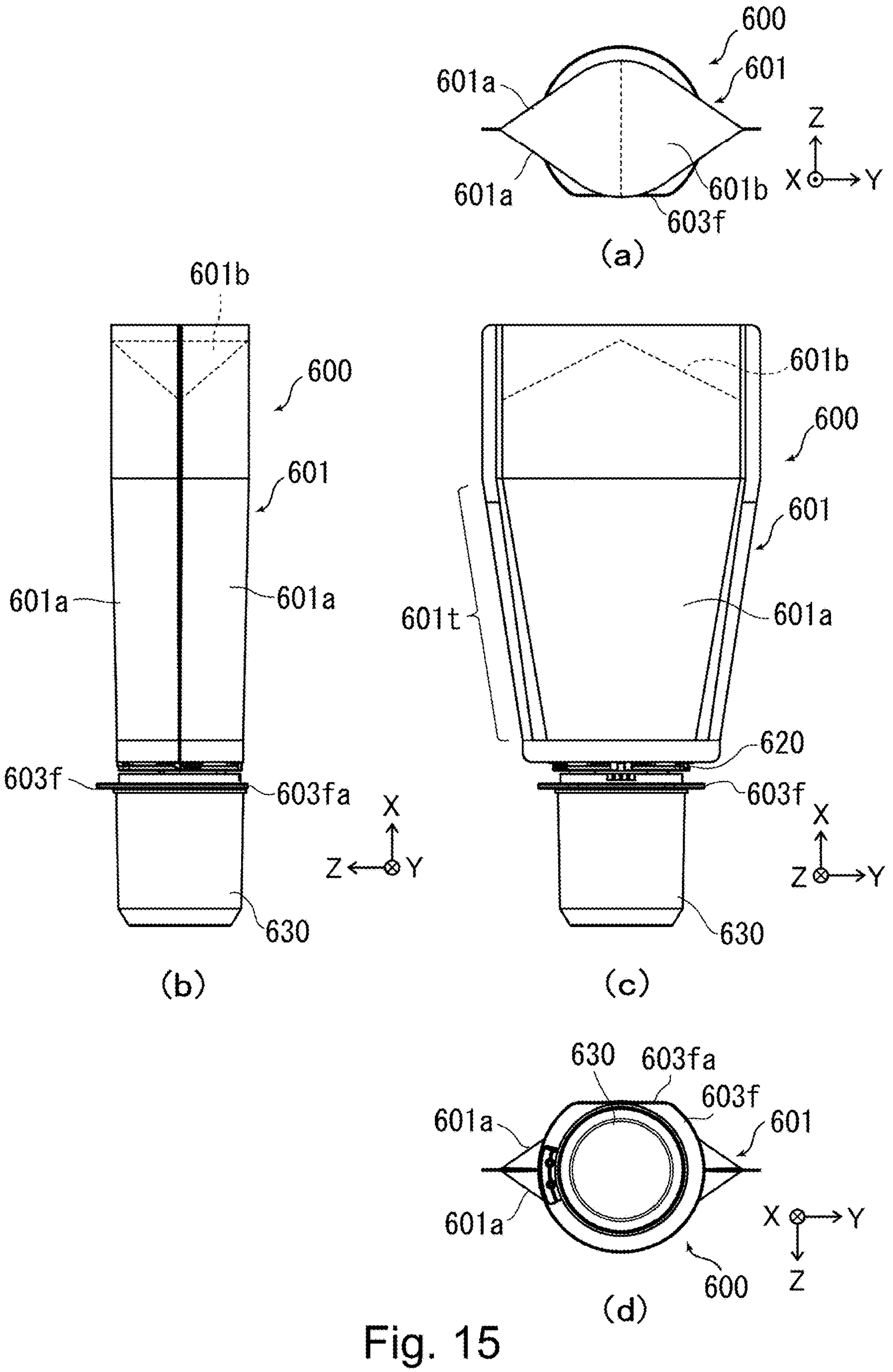

Part (*a*) of FIG. 15 is a plane view, part (*b*) is a side view, part (*c*) is a front view and part (d) is a bottom view of the toner pack (before cap removal) according to the Embodiment 1.

Figure 16:
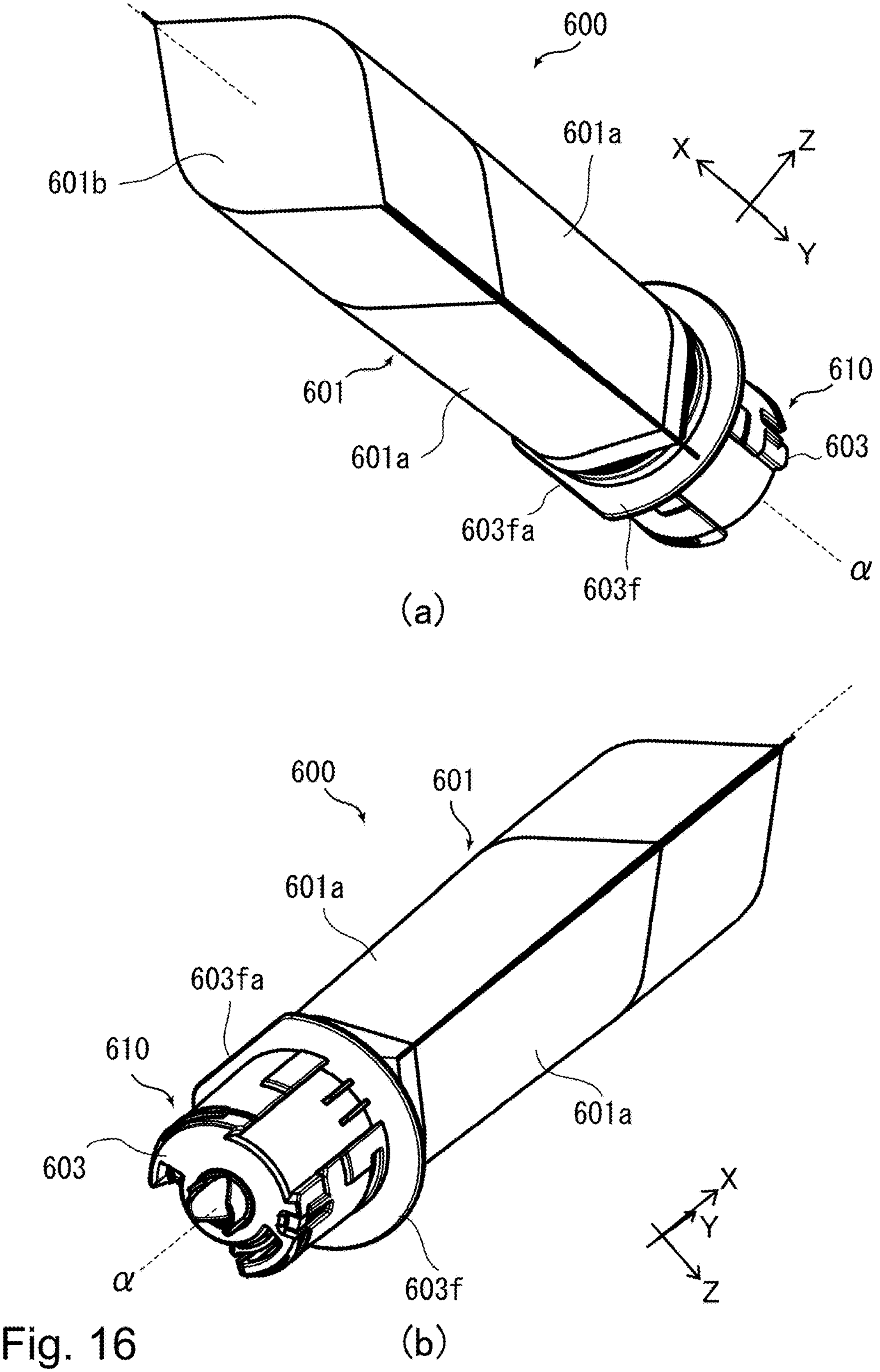

FIG. 16, part (*a*) and part (*b*), is a perspective view of the toner pack according to the Embodiment 1.

Figure 17:
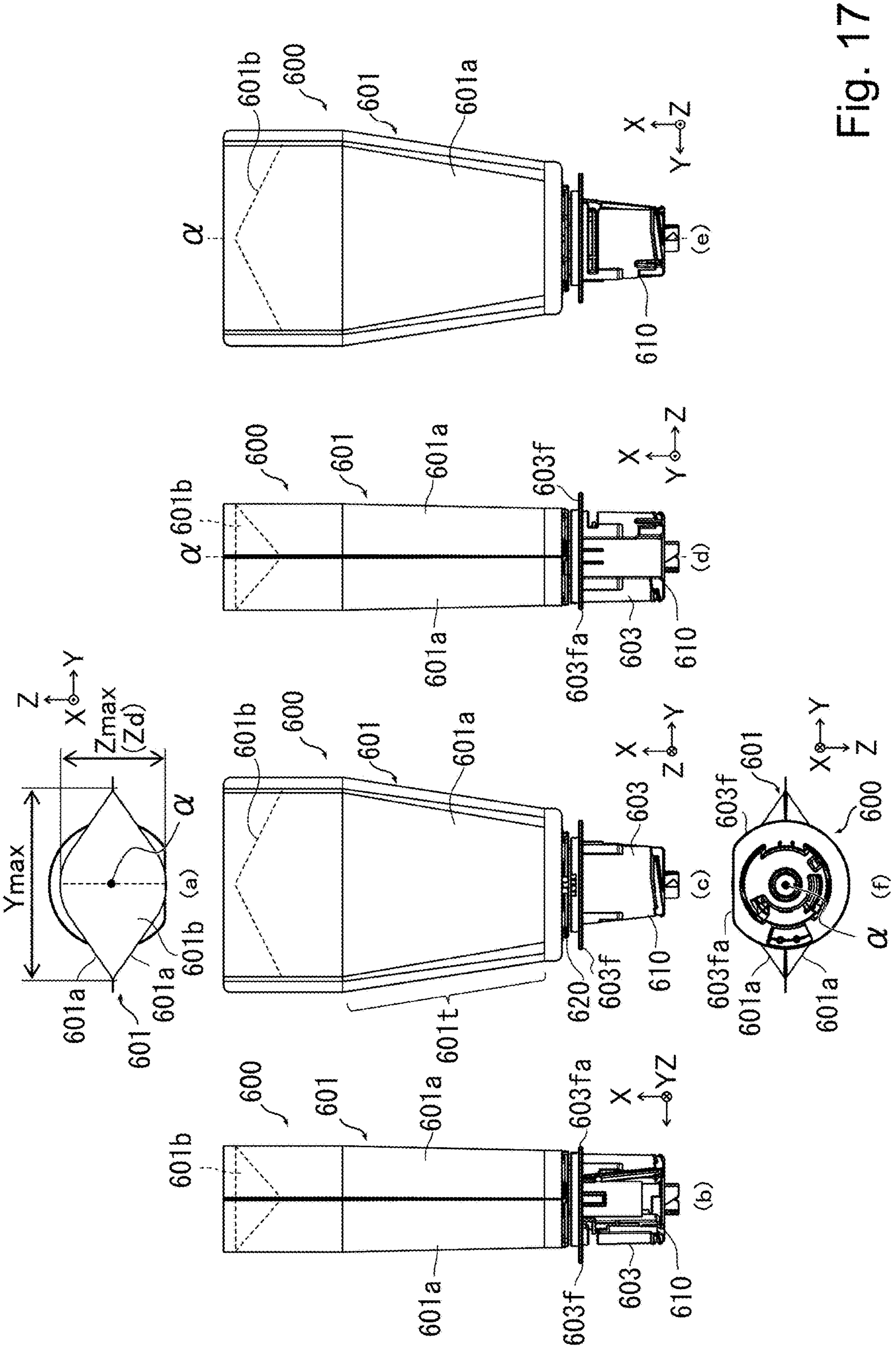

Part (*a*) of FIG. 17 is a plane view, part (*b*) is a left side view, part (*c*) is a front view, part (*d*) is a right side view, part (*e*) is a back side view and part (*f*) is a bottom view of the toner pack according to the Embodiment 1.

Figure 18:
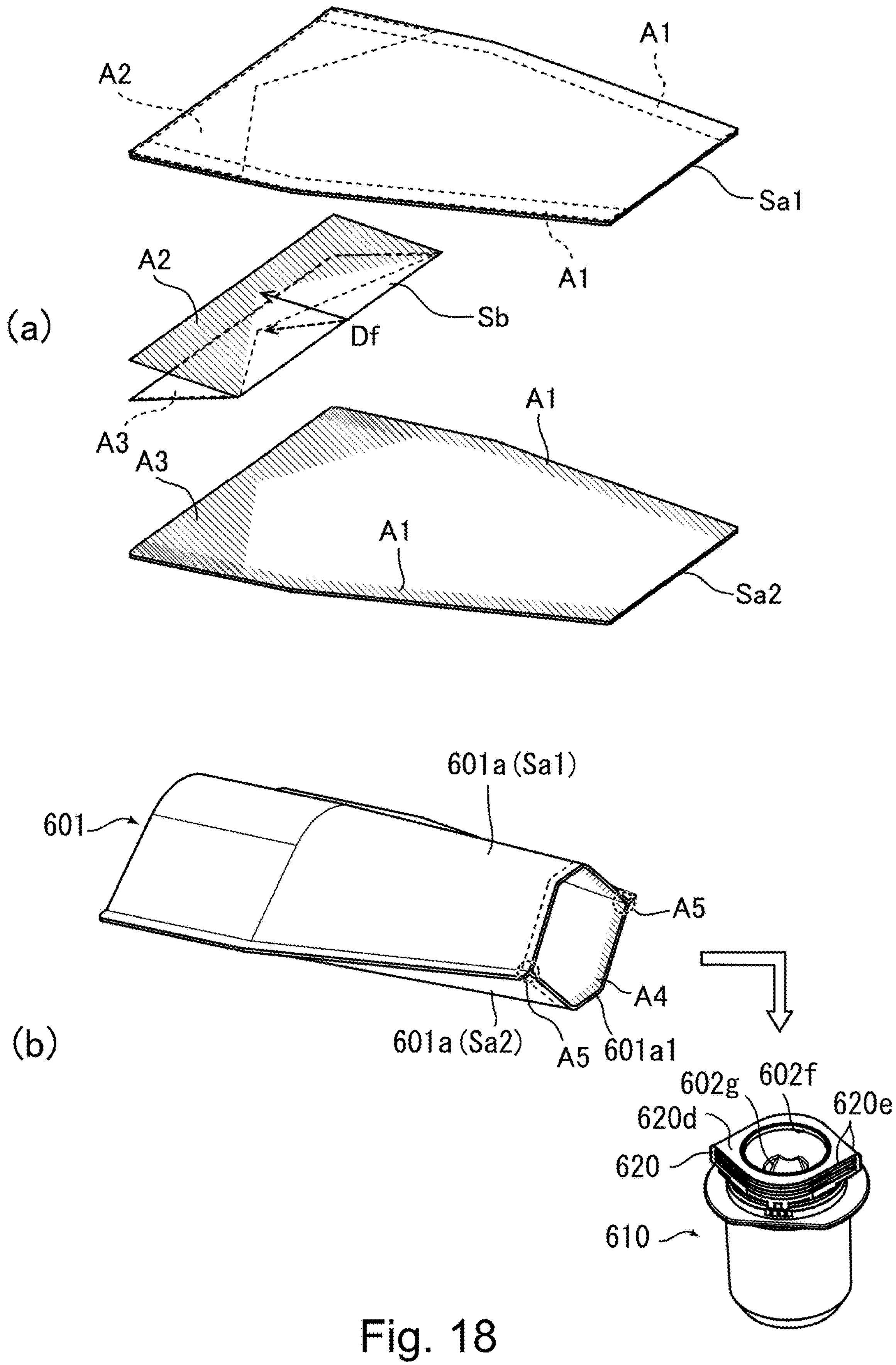

FIG. 18, part (*a*) and part (*b*), is a schematic view representing a manufacturing method of the toner pack according to the Embodiment 1.

Figure 19:
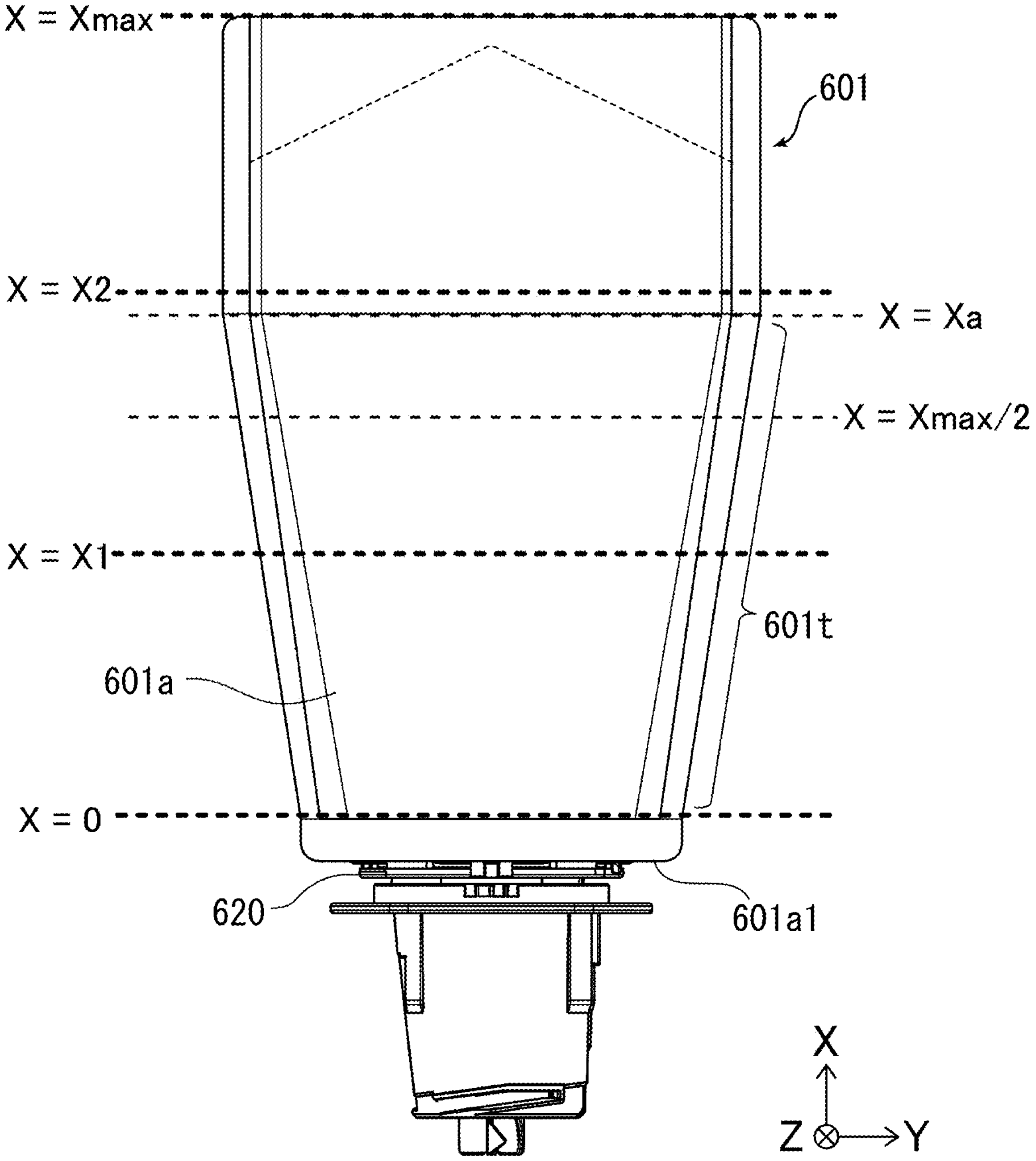

FIG. 19 is a view for describing a shape of the toner pack according to the Embodiment 1.

Figure 20:
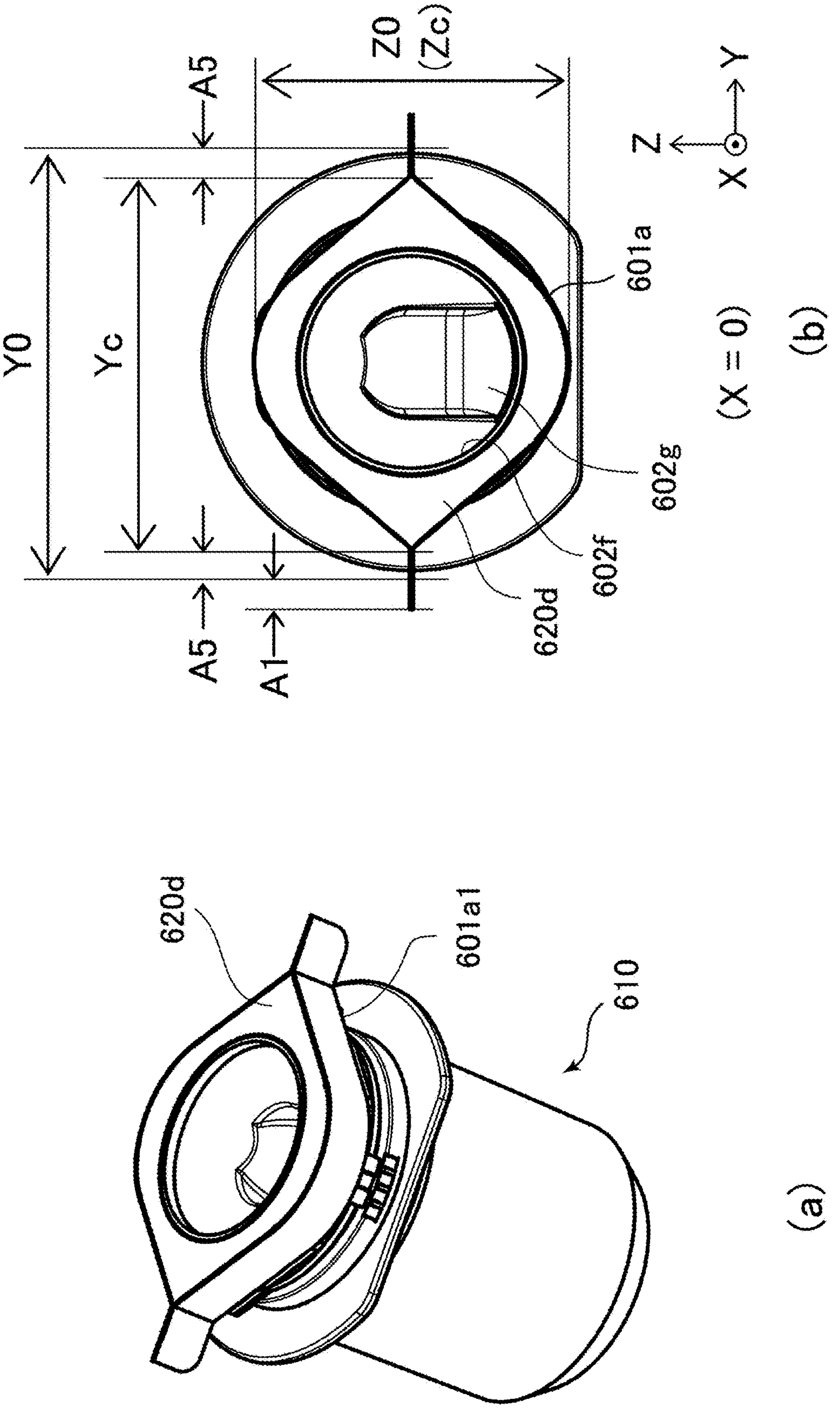

Part (*a*) of FIG. 20 is a perspective view and part (*b*) is a cross-sectional view of a portion of the toner pack cut at a position of X=0.

Figure 21:
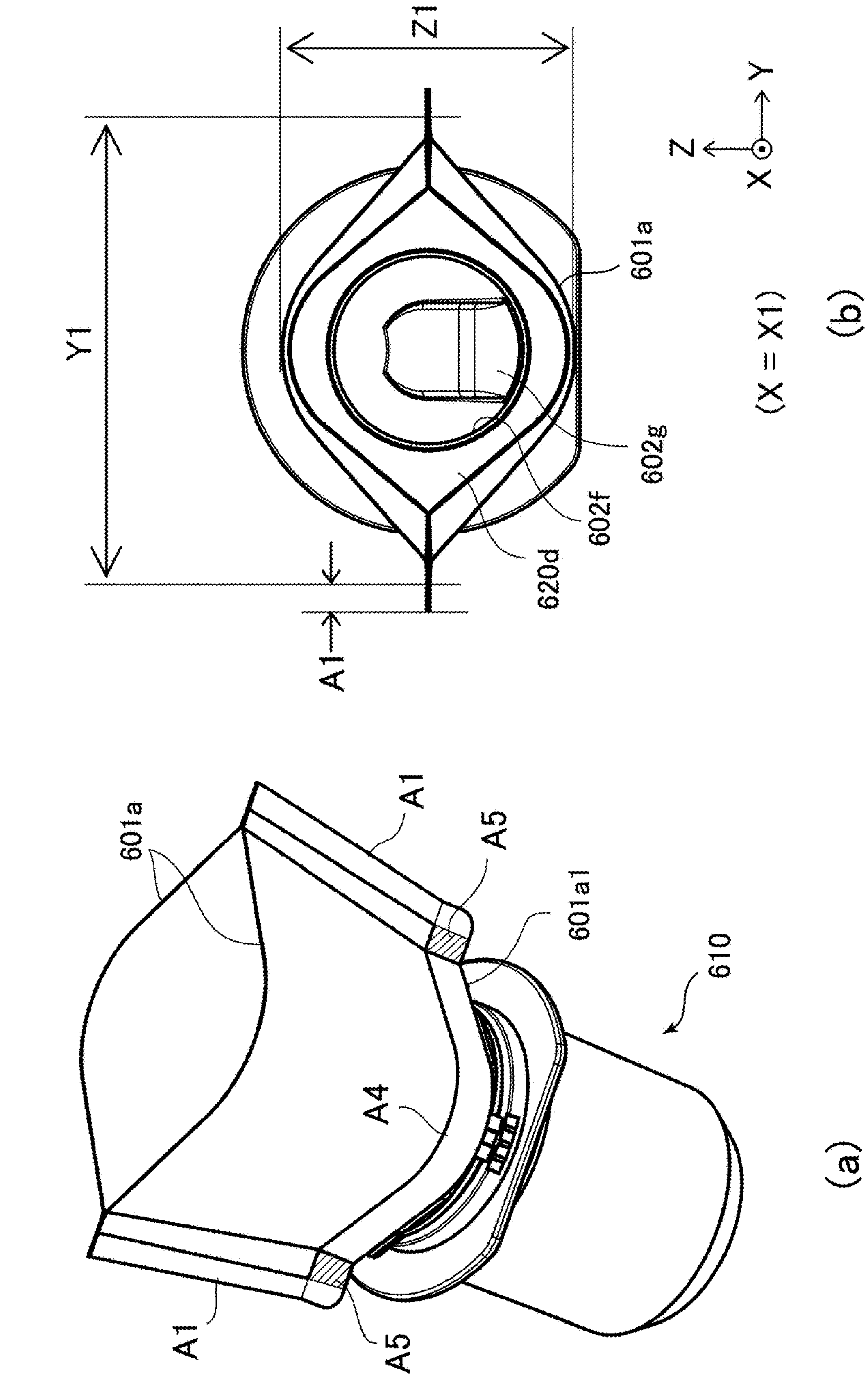

Part (*a*) of FIG. 21 is a perspective view and part (*b*) is a cross-sectional view of a portion of the toner pack cut at a position of X=X1.

Figure 22:
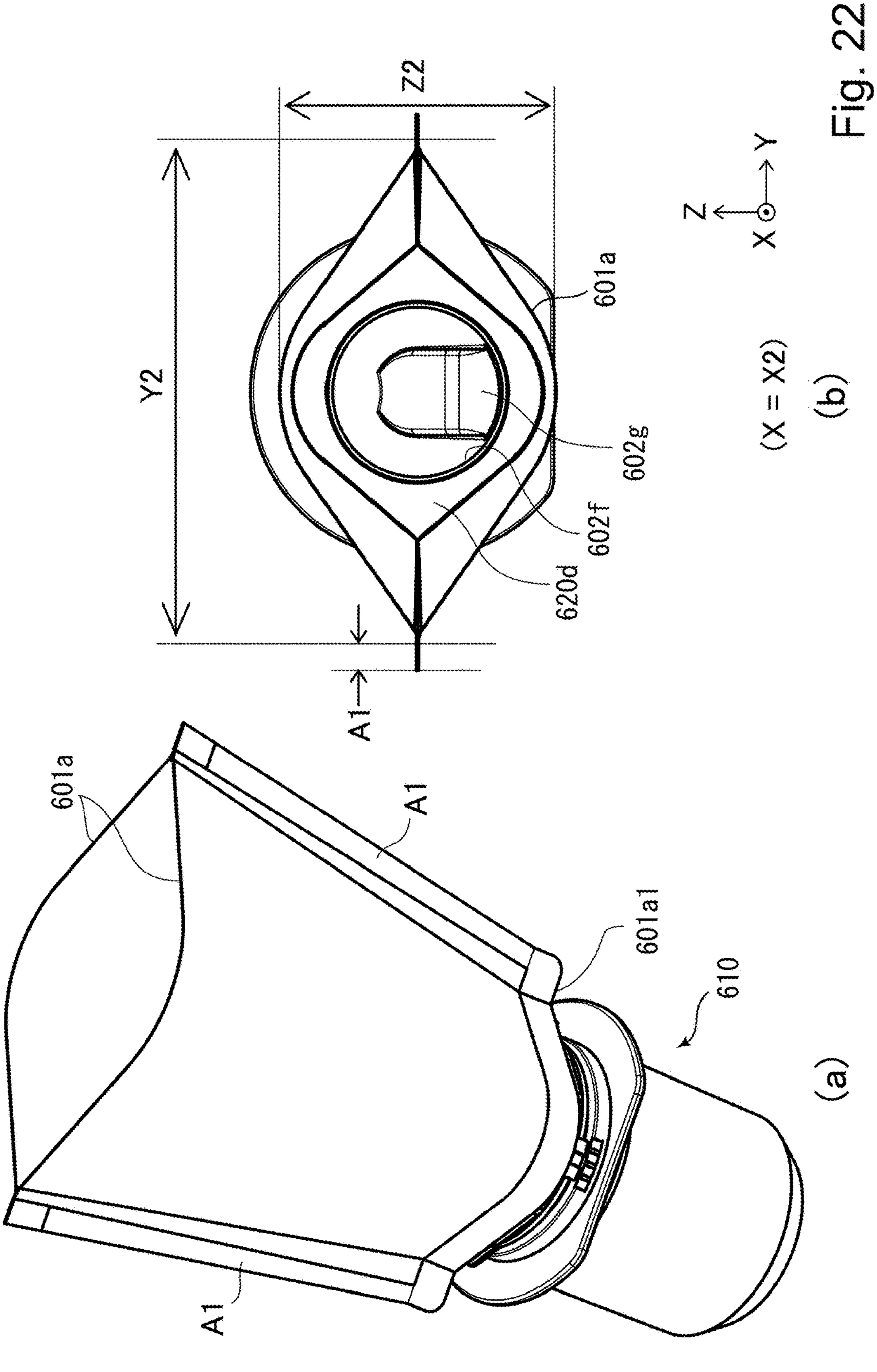

Part (*a*) of FIG. 22 is a perspective view and part (*b*) is a cross-sectional view of a portion of the toner pack cut at a position of X=X2.

Figure 23:
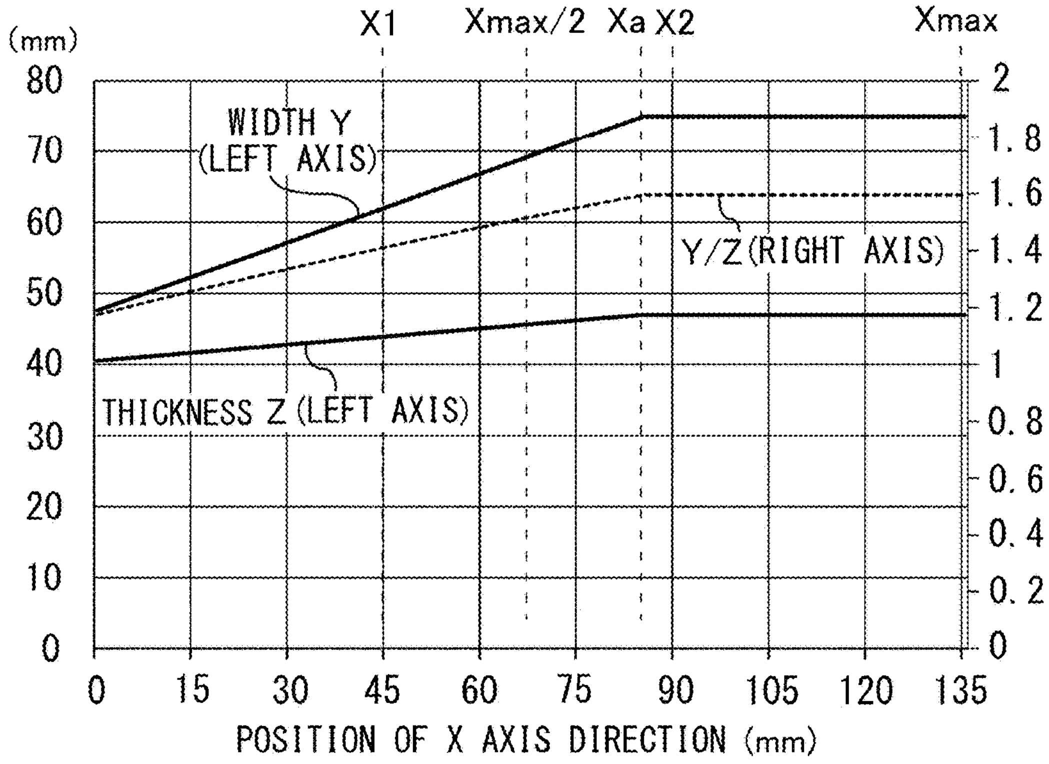
Figure 23:
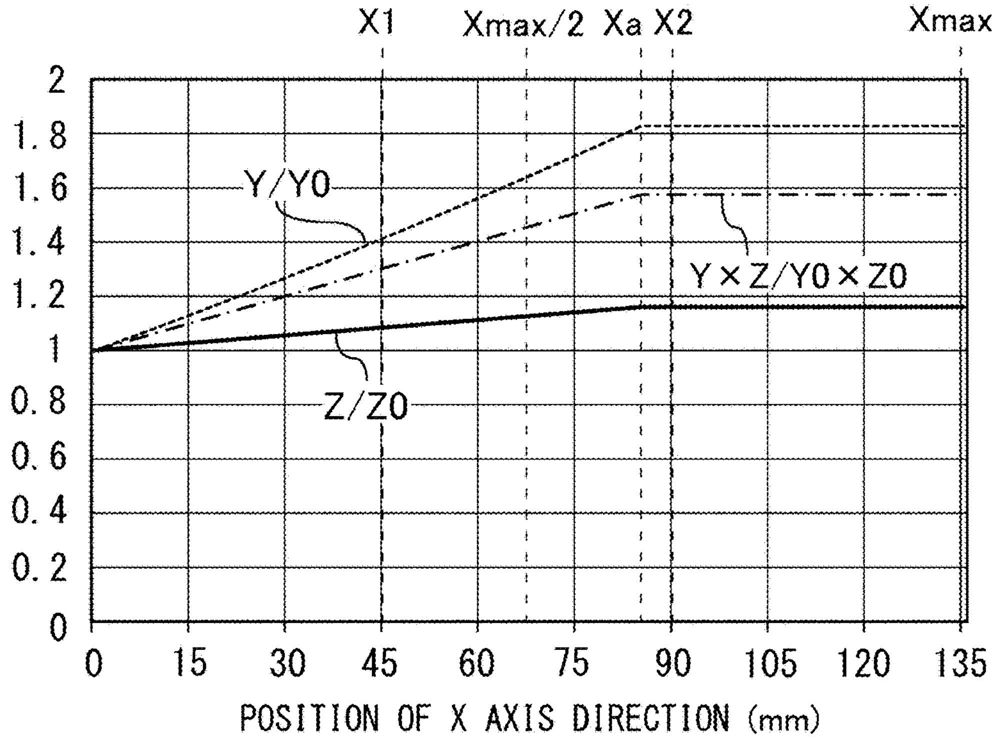

FIG. 23, part (*a*) and part (*b*), is a graph illustrating parameters related to the shape of the toner pack.

Figure 24:
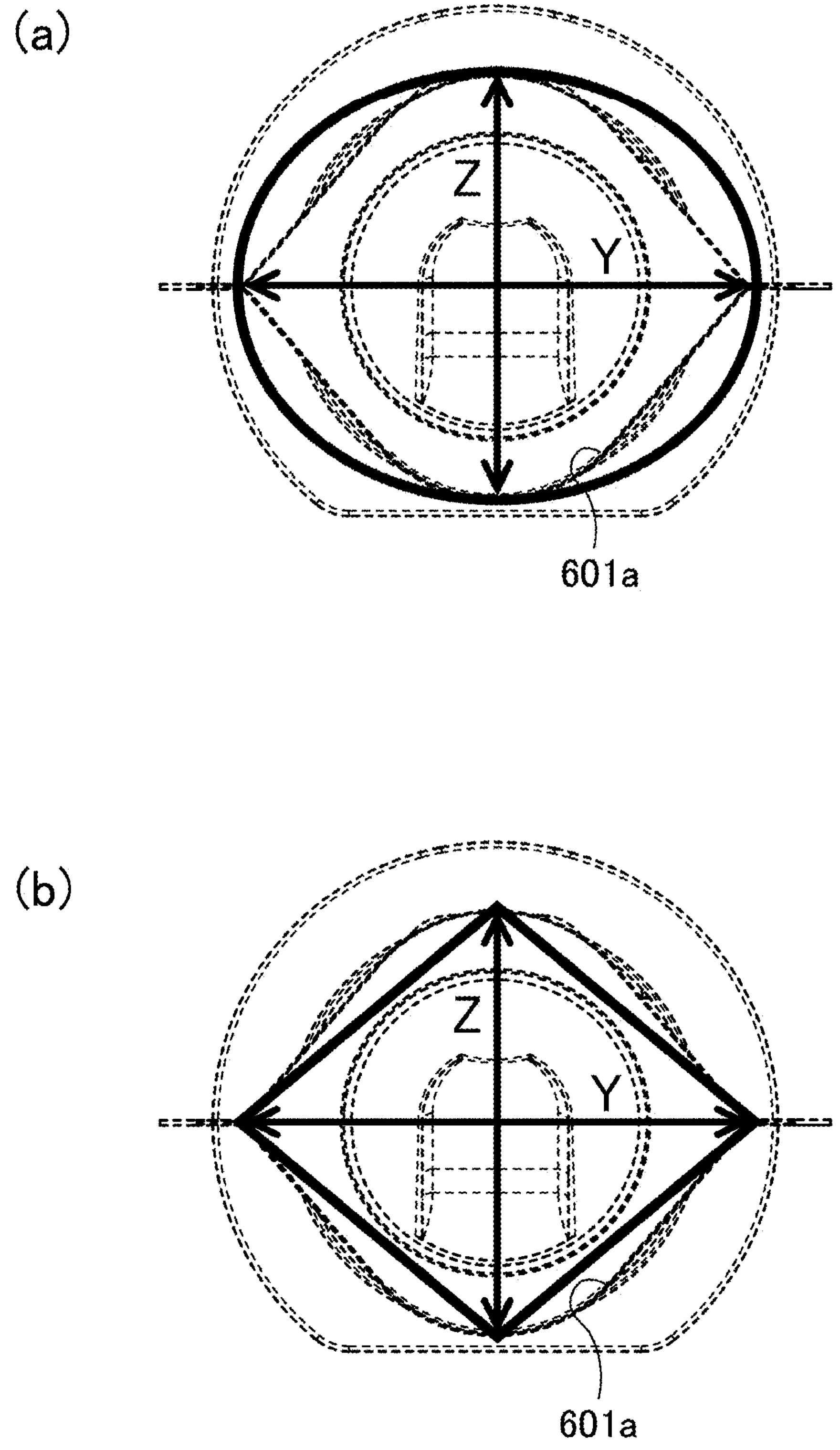

FIG. 24, part (*a*) and part (*b*), is a view for describing an approximating method of a cross-sectional shape of the toner pack.

Figure 25:
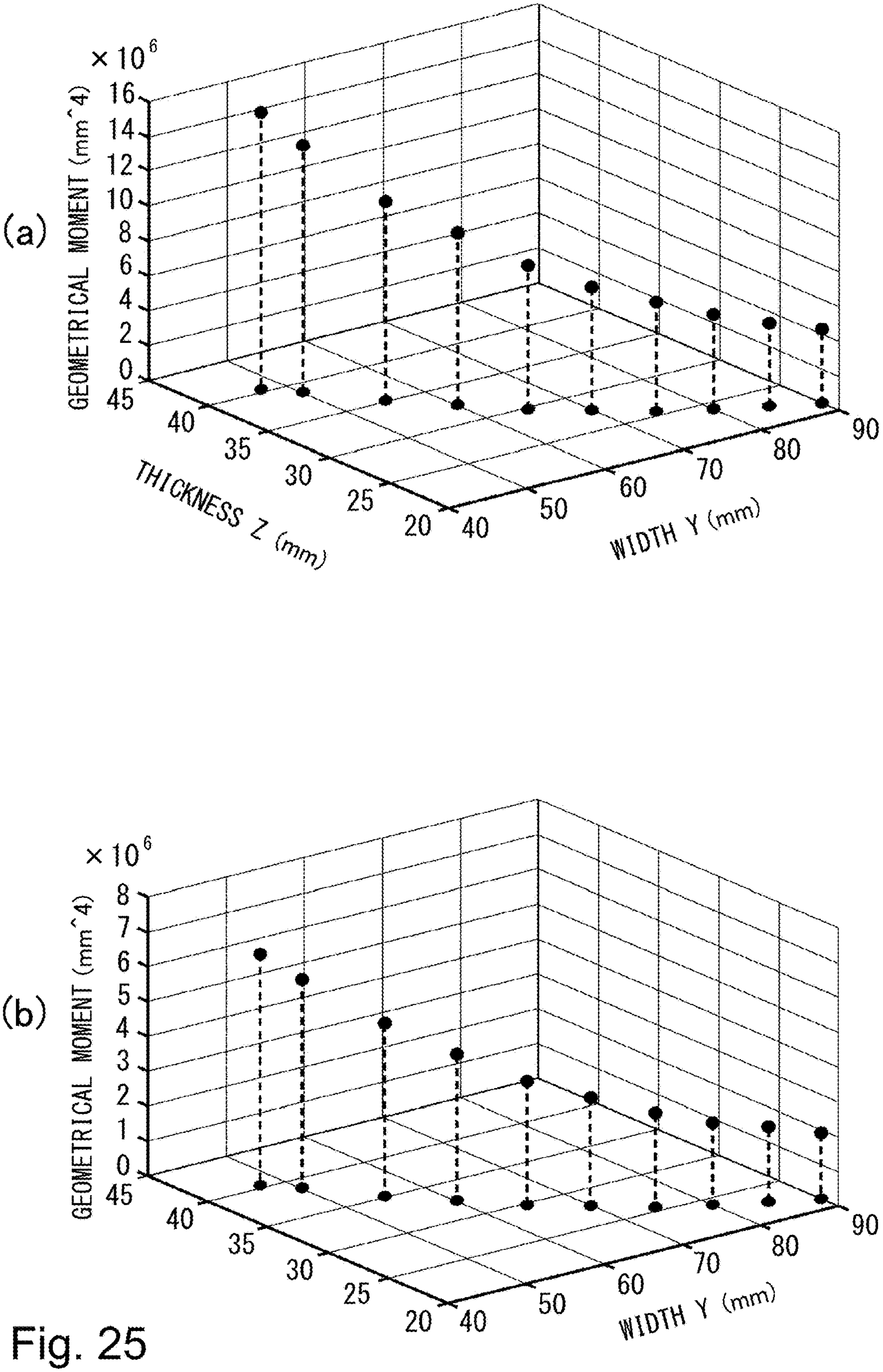

FIG. 25, part (*a*) and part (*b*), is a graph for describing relationship between a width and a thickness and geometrical moment of inertia in a cross section of the toner pack.

Figure 26:
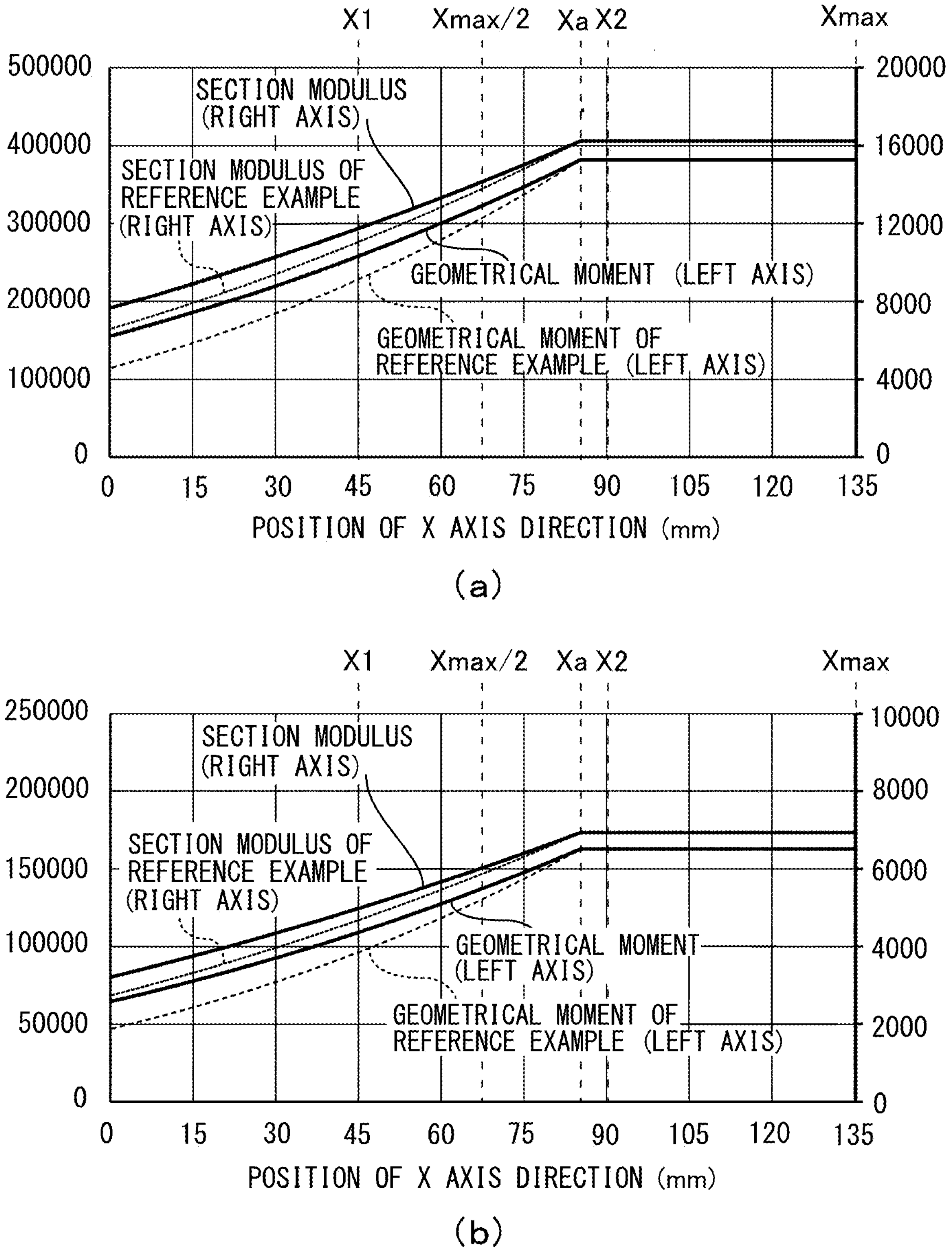

FIG. 26, part (*a*) and part (*b*), is a graph illustrating the geometrical moment of inertia and section modulus of the toner pack according to the Embodiment 1.

Figure 27:
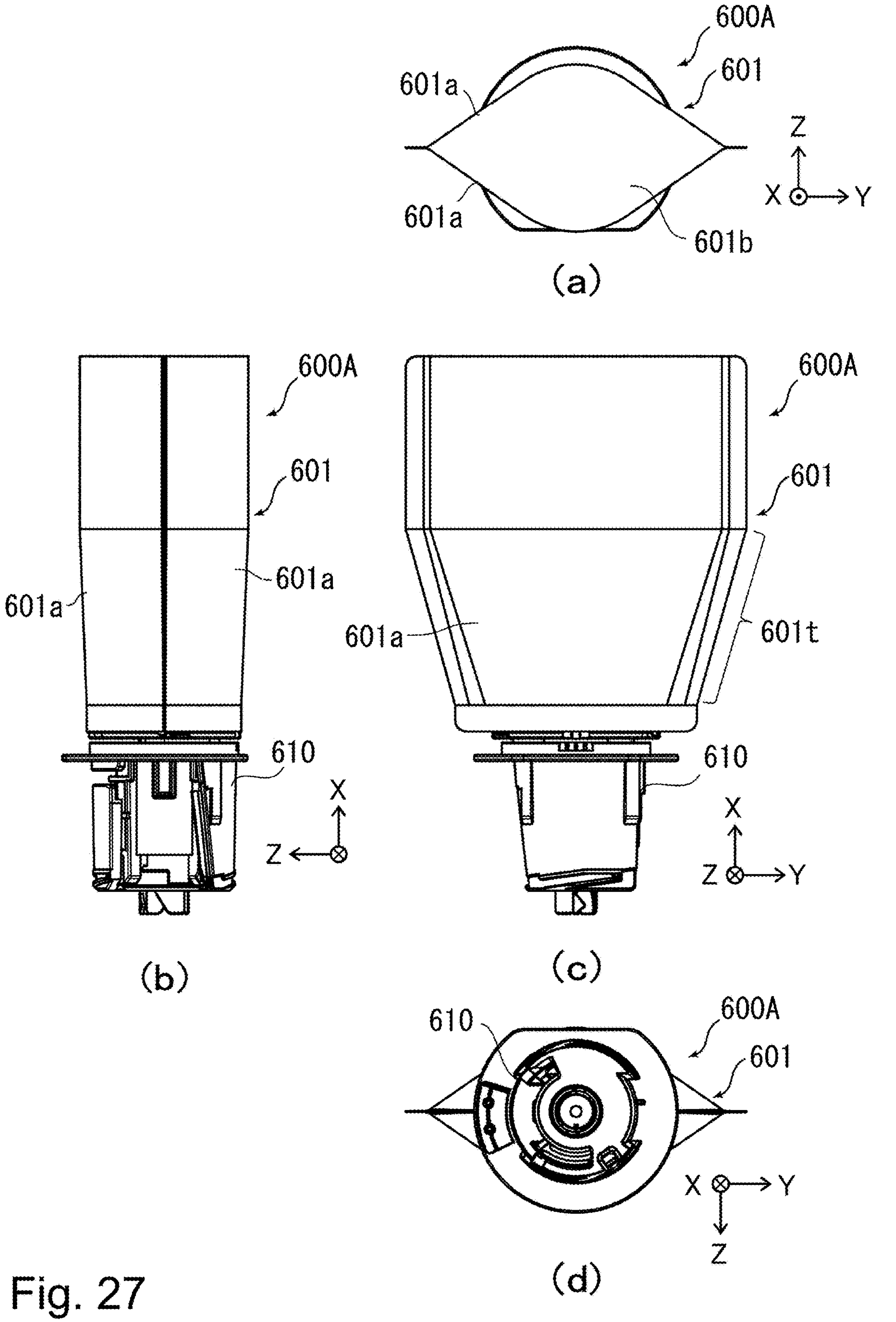

Part (*a*) of FIG. 27 is a plane view, part (*b*) is a left side view, part (*c*) is a front view and part (*d*) is a bottom view of a toner pack according to a Modified Example 1.

Figure 28:
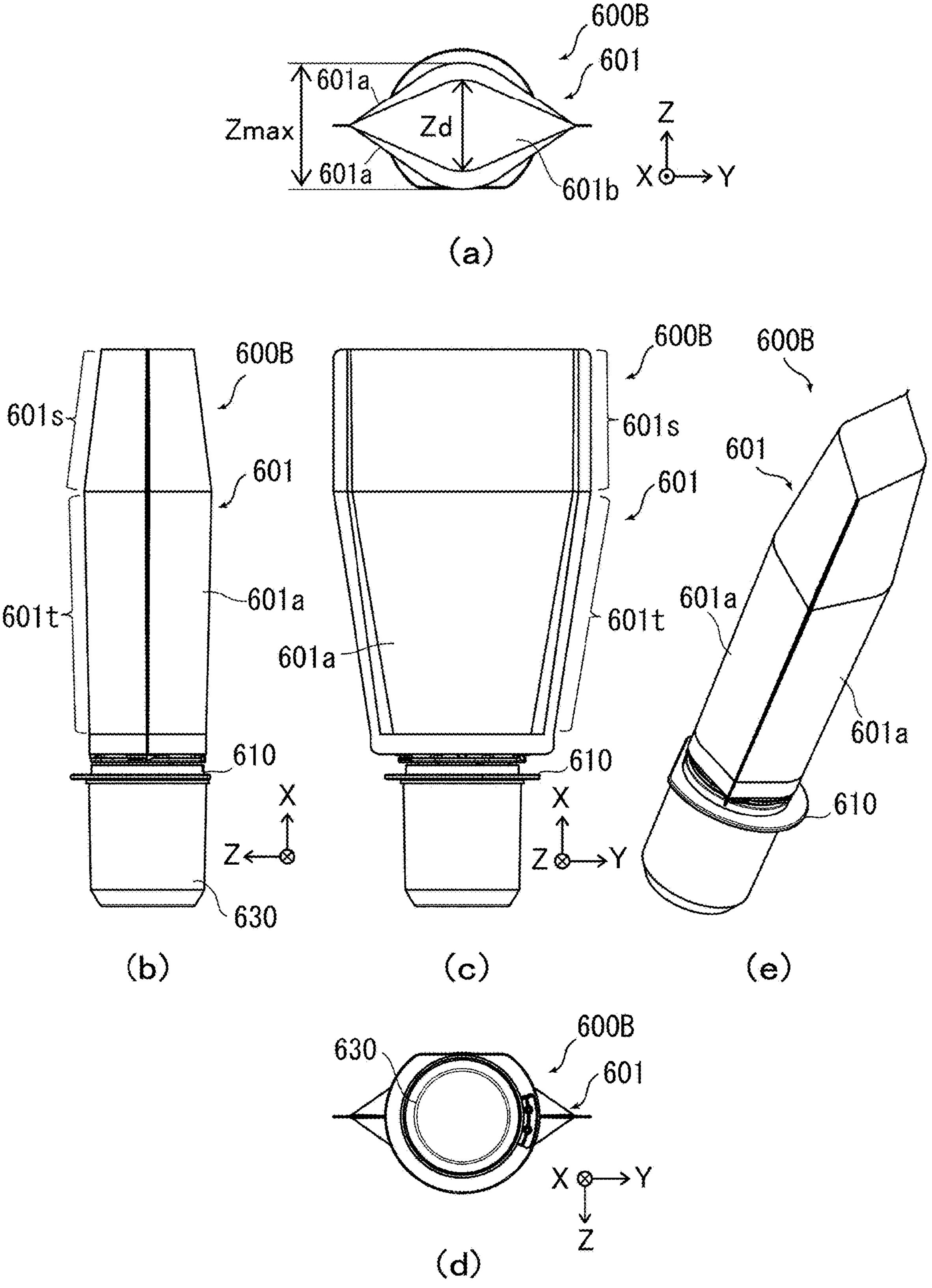

Part (*a*) of FIG. 28 is a plane view, part (*b*) is a left side view, part (*c*) is a front view, part (*d*) is a bottom view and part (*e*) is a perspective view of a toner pack according to a Modified Example 2.

Figure 29:
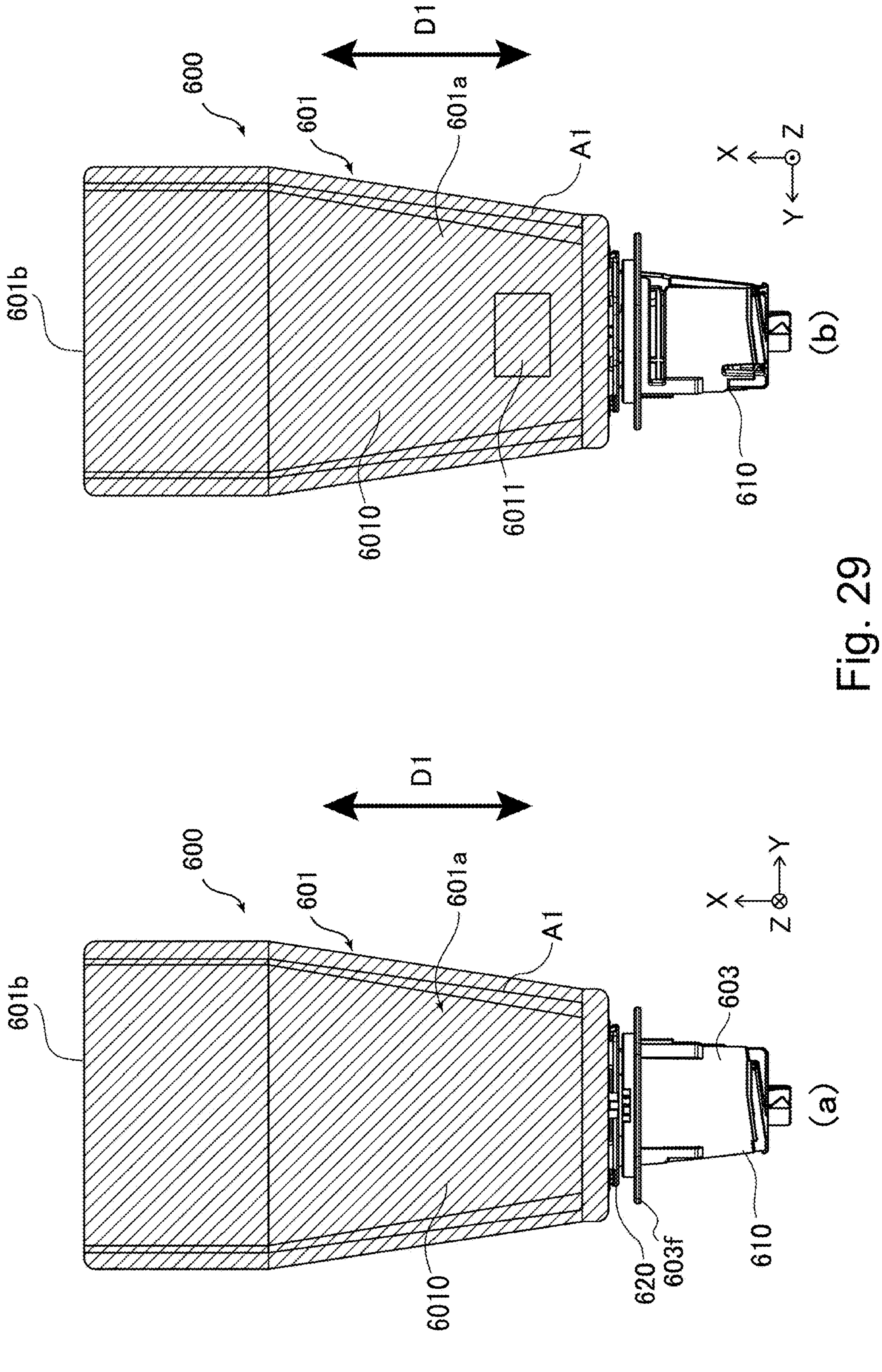

FIG. 29, part (*a*) and part (*b*), is a view for describing a rough surface area of a toner pack according to an Embodiment 2.

Figure 30:
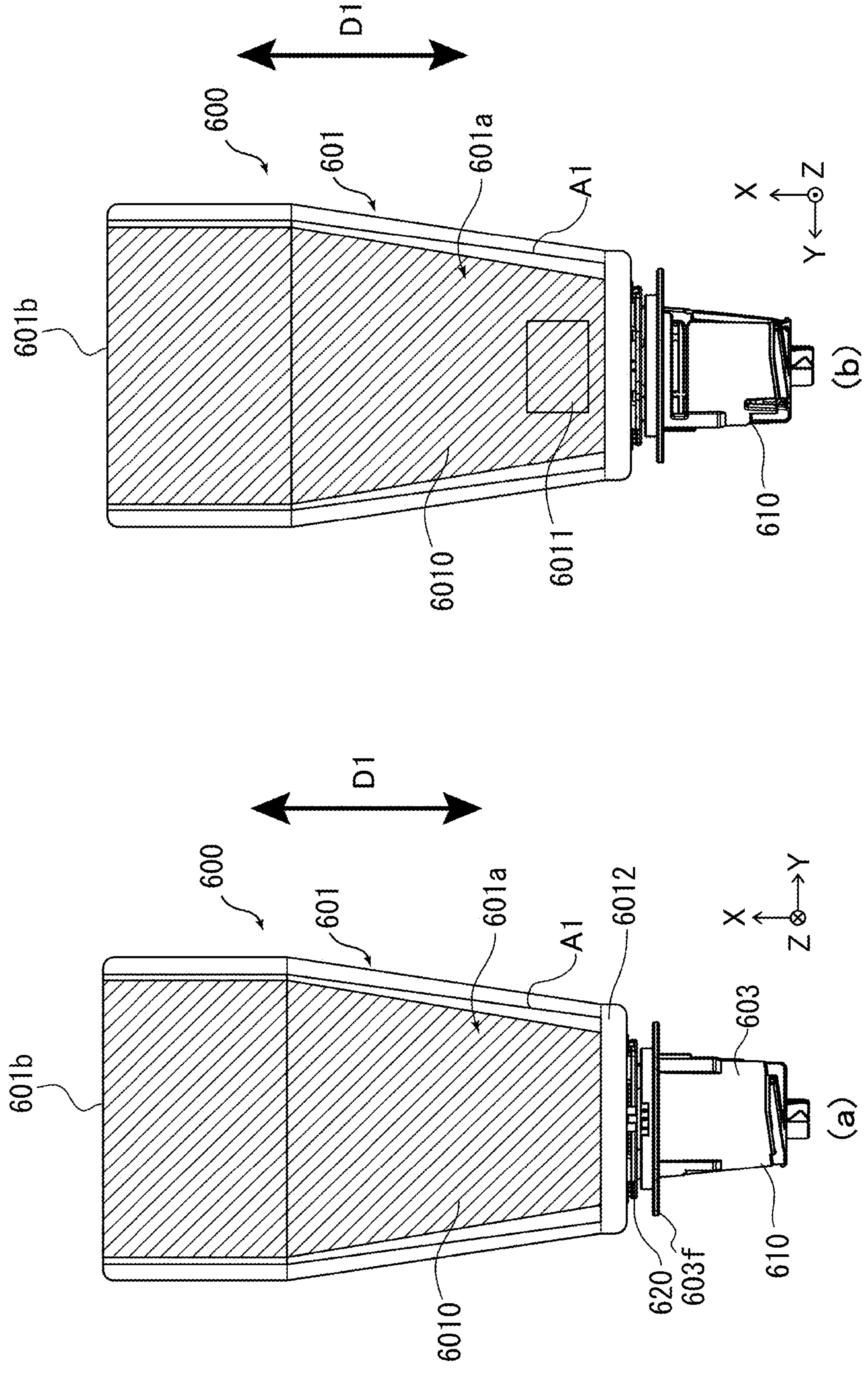

FIG. 30, part (*a*) and part (*b*), is a view for describing a rough surface area of a toner pack according to a Modified Example 3.

EMBODIMENTS OF THE INVENTION

Hereinafter, Embodiments according to the present invention will be described with reference to the drawings.

Embodiment 1

[Overall Configuration]

Figure 1:
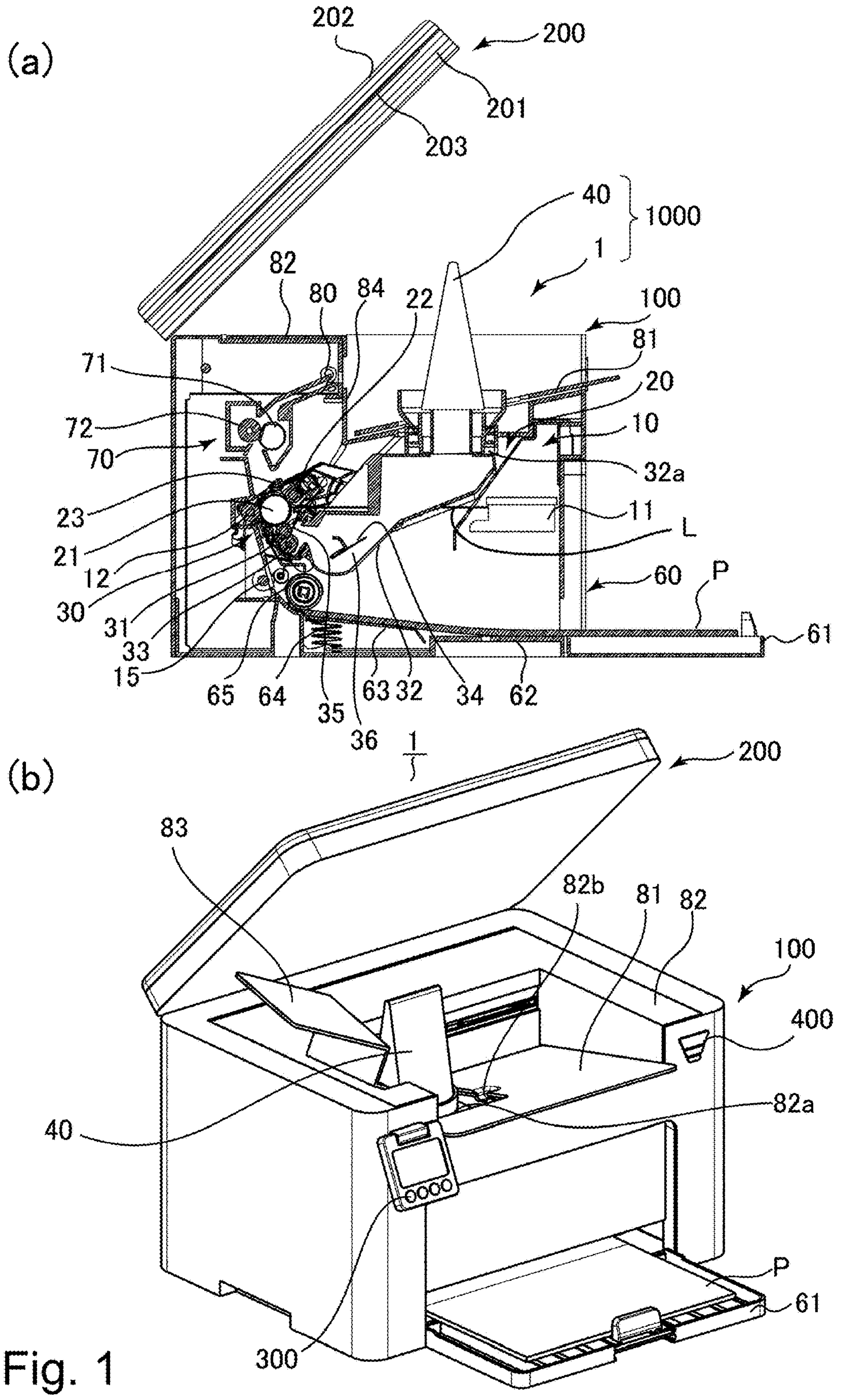
Figure 2:
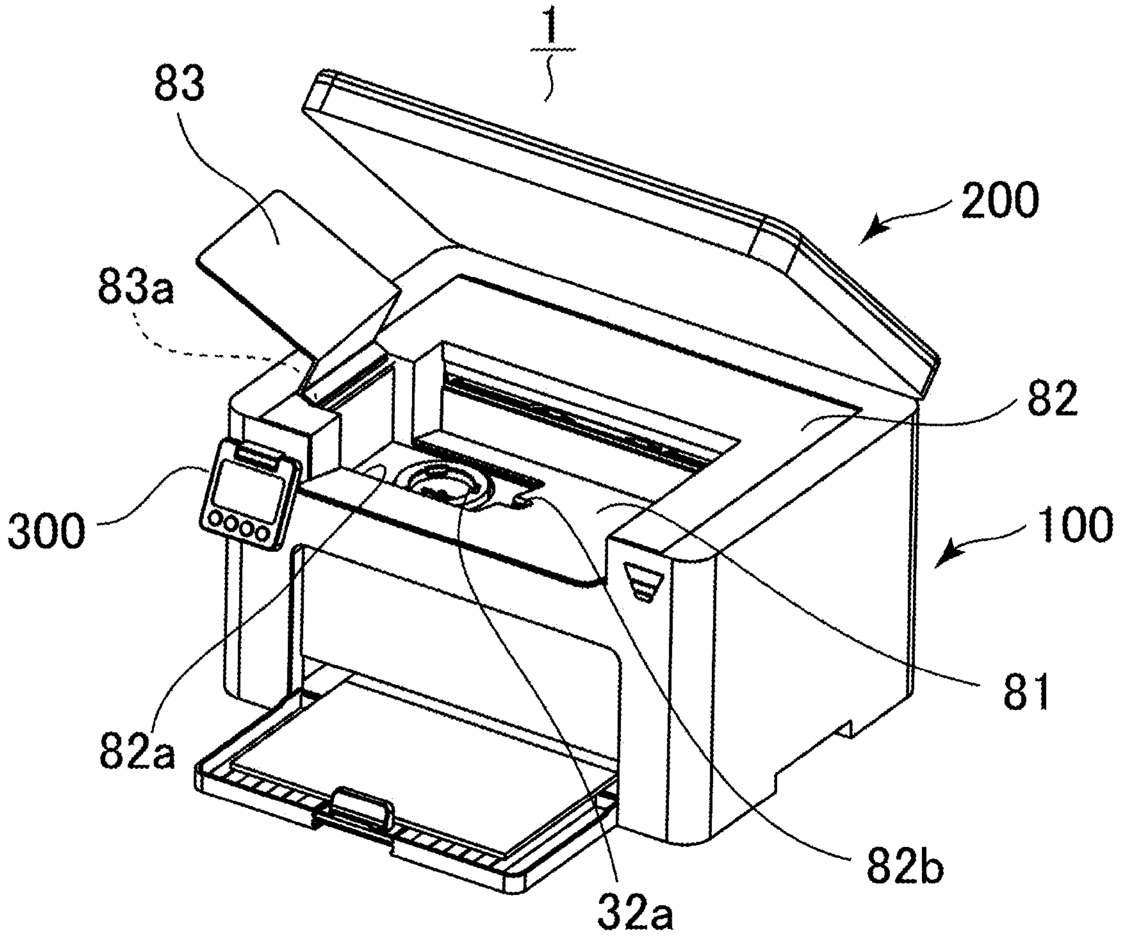
FIG. 2 is a perspective view illustrating the image forming apparatus according to the Embodiment 1.

Part (*a*) of FIG. 1 is a cross-sectional view illustrating a configuration of an image forming apparatus 1 according to an Embodiment of the present disclosure, and part (*b*) of FIG. 1 and FIG. 2 are perspective views of the image forming apparatus 1. The image forming apparatus 1 is a monochrome printer which forms an image on a recording material based on image information input from an external device. The recording material includes a variety of sheet members made of different materials, such as a paper such as a plain paper and a thick paper, a plastic film such as a sheet for an overhead projector, a special shaped sheet such as an envelope and an index paper, and cloth, etc.

The image forming apparatus 1 includes, as shown in part (*a*) and part (*b*) of FIG. 1, a printer main body 100 as an apparatus main body, a reading device 200 supported to be openable and closable by the printer main body 100, and an operating portion 300 attached to an exterior surface of the printer main body 100. The printer main body 100 includes an image forming portion 10 which forms a toner image on the recording material, a feeding portion 60 which feeds the recording material to the image forming portion 10, a fixing portion 70 which fixes the toner image formed by the image forming portion 10 to the recording material, and a discharging roller pair 80.

The image forming portion 10 includes a scanner unit 11, a process unit 20 of an electrophotographic type, a transfer roller 12 which transfers the toner image formed on a photosensitive drum 21 of the process unit 20 to the recording material. The process unit 20 includes the photosensitive drum 21 and a charging roller 22, a pre-exposure device 23 and a developing device 30 including a developing roller 31, which are disposed around the photosensitive drum 21.

The photosensitive drum 21 is an image bearing member which bears an electrostatic latent image and a toner image (developer image). The photosensitive drum 21 is a photosensitive member molded into a cylindrical shape. The photosensitive drum 21 of the present embodiment includes a photosensitive layer formed of a negatively charged organic photosensitive member on a drum-shaped substrate made of aluminum. In addition, the photosensitive drum 21 is driven and rotated by a motor in a predetermined direction (clockwise direction in FIG. 1) at a predetermined process speed.

The charging roller 22 is in contact with the photosensitive drum 21 with a predetermined pressure contact force to form a charging portion. In addition, by desired charging voltage being applied by a charging high voltage power source, a surface of the photosensitive drum 21 is uniformly charged to predetermined potential. In the present Embodiment, the photosensitive drum 21 is charged to negative polarity by the charging roller 22. The pre-exposure device 23 eliminates surface potential of the photosensitive drum 21 before the surface of the photosensitive drum 21 enters the charging portion in order to generate stable electrical discharge in the charging portion.

The scanner unit 11 as an exposure means scans and exposes the surface of the photosensitive drum 21 by irradiating the photosensitive drum 21 using a polygon mirror with a laser beam corresponding to the image information input from the external device or the reading device 200. By this exposure, the electrostatic latent image corresponding to the image information is formed on the surface of the photosensitive drum 21. Incidentally, the scanner unit 11 is not limited to a laser scanner device but, for example, an LED exposure device including an LED array in which a plurality of LEDs are arranged along a longitudinal direction of the photosensitive drum 21 may be employed.

The developing device 30 includes a developing roller 31 as a developer carrying member for carrying developer, a developer container 32 which is a frame of the developing device 30, and a supplying roller 33 capable of supplying the developer to the developing roller 31. The developing roller 31 and the supplying roller 33 are rotatably supported by the developer container 32. In addition, the developing roller 31 is disposed in an opening portion of the developer container 32 so as to face the photosensitive drum 21. The supplying roller 33 is rotatably in contact with the developing roller 31, and toner as the developer accommodated in the developer container 32 is supplied to a surface of the developing roller 31 by the supplying roller 33. Incidentally, the supplying roller 33 is not necessarily required, if a configuration can supply the toner sufficiently to the developing roller 31.

The developing device 30 in the present Embodiment uses a contact developing type as a developing type. That is, a toner layer carried on the developing roller 31 is in contact with the photosensitive drum 21 in a developing portion (developing area) where the photosensitive drum 21 and the developing roller 31 face each other. To the developing roller 31, developing voltage is applied by a developing high voltage power source. Under the developing voltage, by the toner carried on the developing roller 31 being transferred from the developing roller 31 to the surface of the photosensitive drum 21 in accordance with potential distribution on the surface of the photosensitive drum 21, the electrostatic latent image is developed into the toner image. Incidentally, in the present Embodiment, a reverse development type is employed. That is, by the toner adhering to a surface area of the photosensitive drum 21 where a charging amount is attenuated by being exposed in the exposure process, the toner image is formed.

In addition, in the present Embodiment, the toner whose normal charging polarity is negative is used. In more detail, a particle diameter of powder toner is, in the present Embodiment, 2 [μm] or more and 15 [μm] or less. In addition, an angle of repose thereof is 50° or more and 80° or less. An example of the particle diameter of the above toner is 6 μm, and an example of the angle of repose thereof is 62°. As an example, the toner in the present Embodiment employs polymerized toner produced by a polymerization method. In addition, the toner in the present Embodiment does not contain a magnetic component, and is so-called non-magnetic one-component developer in which the toner is carried on the developing roller 31 mainly by intermolecular force or electrostatic force (mirror image force). However, one-component developer containing the magnetic component may be used. In addition, the one-component developer may contain additives (e.g., wax or silica fine particles) to adjust fluidity and charging performance of the toner in addition to the toner particles. In addition, a two-component developer, which is constituted by a non-magnetic toner and a carrier having magnetic properties may be used as the developer. In a case in which a developer having the magnetic property is used, as the developer carrying member, for example, a cylindrical developing sleeve, inside which a magnet is provided, may be used.

To the developer container 32, an accommodating portion 36 as a second toner accommodating portion for accommodating the toner and a stirring member 34 as a stirring means disposed inside the accommodating portion 36 are provided. The stirring member 34 is driven by a motor (not shown) to stir the toner in the developer container 32, and at the same time, feed the toner toward the developing roller 31 and the supplying roller 33. In addition, the stirring member 34 functions to circulate the toner not used for development but stripped off the developing roller 31 in the developer container, thus making the toner uniform in the developer container. The stirring member 34 is not limited to the rotating type. For example, a stirring member of a swinging shape may be employed instead.

In addition, a developing blade 35 which regulates an amount of the toner carried on the developing roller 31 is disposed in the opening portion of the developer container 32 where the developing roller 31 is disposed. As the toner supplied to the surface of the developing roller 31 passes through an opposing portion to the developing blade 35 with the rotation of the developing roller 31, the toner is uniformly formed into a thin layer and is charged to the negative polarity by triboelectric charging.

The feeding portion 60 includes, as shown in part (*a*) and part (*b*) of FIG. 1, a front door 61, which is supported so as to be openable and closable by the printer main body 100, a tray portion 62, a middle plate 63, a tray spring 64 and a pickup roller 65. The tray portion 62 constitutes a bottom surface of a recording material accommodating space which appears when the front door 61 is opened, and the middle plate 63 is supported so as to be ascendable and descendable by the tray portion 62. The tray spring 64 urges the middle plate 63 upward, pushing the recording material P stacked on the middle plate 63 against the pickup roller 65. Incidentally, the front door 61 closes the recording material accommodating space in a state of being closed to the printer main body 100, and supports the recording material P together with the tray portion 62 and the middle plate 63 in a state of being opened to the printer main body 100.

The fixing portion 70 is what of thermal fixing type which performs a fixing process of an image by heating and melting the toner on the recording material. The fixing portion 70 includes a fixing film 71, a fixing heater such as a ceramic heater configured to heat the fixing film 71, a thermistor configured to measure temperature of the fixing heater, and a pressing roller 72 configured to be in pressure contact with the fixing film 71.

Next, an image forming operation of the image forming apparatus 1 will be described. When a command for image formation is input to the image forming apparatus 1, an image forming process by the image forming portion 10 is started based on the image information input from an external computer connected to the image forming apparatus 1 or the reading device 200. The scanner unit 11 irradiates the photosensitive drum 21 with the laser beam based on the input image information. At this time, the photosensitive drum 21 is charged by the charging roller 22 in advance, and the electrostatic latent image is formed on the photosensitive drum 21 by being irradiated with the laser beam. Thereafter, the electrostatic latent image is developed by the developing roller 31, and the toner image is formed on the photosensitive drum 21.

In parallel with the image forming process described above, the pickup roller 65 of the feeding portion 60 feeds the recording material P supported by the front door 61, the tray portion 62 and the middle plate 63. The recording material P is fed to a registration roller pair 15 by the pickup roller 65, and oblique movement thereof is corrected by abutting a nip of the registration roller pair 15. The registration roller pair 15 is then driven in time with a transfer timing of the toner image, and conveys the record material P toward a transfer nip formed by the transfer roller 12 and the photosensitive drum 21.

To the transfer roller 12 as a transfer means, transfer voltage is applied from a transfer high voltage power source and the toner image carried on the photosensitive drum 21 is transferred to the recording material P conveyed by the registration roller pair 15. The recording material P on which the toner image has been transferred is conveyed to the fixing portion 70, and the toner image is heated and pressed when the recording material P passes through a nip portion between the fixing film 71 of the fixing portion 70 and the pressing roller 72. By this, by the toner particles being melted and then solidly fixed, the toner image is fixed on the recording material P. The recording material P which has passed through the fixing portion 70 is discharged to an outside of the image forming apparatus 1 (outside the machine) by the discharging roller pair 80 as a discharging means, and is stacked on a discharge tray 81 as a stacking portion provided at an upper portion of the printer main body 100.

The discharge tray 81 is sloped upward as it goes downstream in a discharging direction of the recording material, and a trailing end of the recording material discharged in the discharge tray 81 is aligned by a regulating surface 84 as the recording material slides down the discharge tray 81. Incidentally, in part (*a*) and part (*b*) of FIG. 1 and FIG. 2, an opening/closing member 83 described below is in a state of being opened, however, the opening/closing member 83 is assumed to be closed in advance in a case in which the image forming operation is performed.

The reading device 200 includes a reading unit 201, which incorporates an unshown reading portion inside, and a pressing plate 202, which is supported so as to be openable and closable by a reading unit 201. On an upper surface of the reading unit 201, a document table glass 203, through which light emitted from the reading portion is transmitted and on which a document is placed, is provided.

In a case in which a user instructs the reading device 200 to read an image of a document, the user places the document on the document table glass 203 with the pressing plate 202 being opened. The pressing plate 202 is then closed to prevent misalignment of the document on the document table glass 203, and a reading command is output to the image forming apparatus 1 by the user operating the operating portion 300, for example. When a reading operation is initiated, the reading portion in the reading unit 201 moves back and forth in a sub scanning direction, i.e., in a left-right direction in a state viewed from a front of the operating portion 300 of the image forming apparatus 1. The reading portion on the one hand emits light from a light emitting portion to the document, and on the other hand receives light reflected by the document with a light receiving portion, and reads an image of the document by photoelectric conversion. Incidentally, hereinafter, a front-back direction, the left-right direction and an up-down direction are defined with reference to the state viewed from the front of the operating portion 300.

On an upper portion of the printer main body 100, a top cover 82 as a stacking tray is provided, and on an upper surface of the top cover 82, the discharge tray 81 as a stacking surface is formed. In the top cover 82, as shown in part (*b*) of FIG. 1 and FIG. 2, the opening/closing member 83 is supported so as to be openable and closable about a rotational shaft 83*a* extending in the front-back direction. In the discharge tray 81 of the top cover 82, an opening portion 82*a* opened upward is provided.

The opening/closing member 83 is configured to be movable between a closing position covering a replenishing opening 32*a* so that a toner pack 40 cannot be mounted to the developer container 32 and an opening position exposing the replenishing opening 32*a* so that the toner pack 40 can be mounted to the developer container 32. The opening/closing member 83 functions as a part of the discharge tray 81 in the closing position. The opening/closing member 83 and the opening portion 82*a* are formed on a left side of the discharge tray 81. In addition, the opening/closing member 83 is opened to a left direction by hooking a finger in a groove portion 82*b* provided in the top cover 82. The opening/closing member 83 is formed substantially L-shaped along a shape of the top cover 82.

The opening portion 82*a* of the discharge tray 81 is open so that the replenishing opening 32*a* for replenishing the toner formed on the upper portion of the developer container 32 is exposed, and by the opening/closing member 83 being opened, a user can access the replenishing opening 32*a*. Incidentally, in the present Embodiment, a type in which the user replenishes the toner from the toner pack 40 (see part (*a*) and part (*b*) of FIG. 1) filled with the toner for replenishing to the developing device 30 while the developing device 30 remains in a state of being mounted to the image forming apparatus 1 (direct replenishing type) is employed. At least a part of the toner pack 40 is exposed to an outside in a state of being mounted to the image forming apparatus 1.

As a result, it is possible to improve usability since it is not necessary to take out the process unit 20 from the printer main body 100 and replace with a new process unit when a remaining amount of the toner in the process unit 20 is low. In addition, it becomes possible to replenish the toner to the developer container 32 at a lower cost than replacing an entire process unit 20. Incidentally, in the direct replenishing type, since it is not necessary to replace various rollers, gears, etc., it is possible to reduce cost even as compared with a case in which only the developing device 30 of the process unit 20 is replaced.

An image forming system 1000 is constituted by the image forming apparatus 1 including the replenishing opening (opening) which can be exposed outside and the toner pack 40 configured to replenish the toner to the image forming apparatus 1 via the replenishing opening by being mounted to and demounted from the image forming apparatus 1. Incidentally, the toner pack 40 shown in part (*a*) and part (*b*) of FIG. 1 and FIG. 2 is a reference example and differs in shape from a toner pack 600 described below.

[Collection of Transfer Remaining Toner]

In the present Embodiment, a cleaner-less configuration in which a transfer remaining toner which remains on the photosensitive drum 21 without being transferred to the recording material P is collected in the developing device 30 and reused is employed. The transfer remaining toner is removed by the following process. In the transfer remaining toner, the toner which is positively charged and the toner which is negatively charged but has no sufficient charge are mixed. By eliminating static electricity of the photosensitive drum 21 after the transfer with the pre-exposure device 23, and generating uniform discharge with the charging roller 22, the transfer remaining toner is charged to negative polarity again. The transfer remaining toner, which is charged to the negative polarity again in the charging portion, reaches the developing portion as the photosensitive drum 21 rotates. The surface area of the photosensitive drum 21 which has passed through the charging portion is then exposed by the scanner unit 11 and the electrostatic latent image is written thereto while still in a state in which the transfer remaining toner is adhering to the surface.

Here, with regard to behavior of the transfer remaining toner which reaches the developing portion will be described with dividing into an exposed portion and a non-exposed portion of the photosensitive drum 21. The transfer remaining toner adhering to the non-exposed portion of the photosensitive drum 21 is transferred to the developing roller 31 by potential difference between potential of the non-exposed portion of the photosensitive drum 21 (dark portion potential) and the developing voltage in the developing portion, and is collected in the developer container 32. This is because the developing voltage applied to the developing roller 31 is positive polarity relative to the potential of the non-exposed portion, assuming that the normal charging polarity of the toner is negative polarity. Incidentally, the toner collected in the developer container 32 is agitated and dispersed with the toner in the developer container by the stirring member 34, and is used again in the developing process by being carried by the developing roller 31.

On the other hand, the transfer remaining toner adhering to the exposed portion of the photosensitive drum 21 is not transferred from the photosensitive drum 21 to the developing roller 31 in the developing portion, but remains on the surface of the drum. This is because the developing voltage applied to the developing roller 31 is even more negative than potential of the exposed portion (light portion potential), assuming that the normal charging polarity of the toner is negative polarity. The transfer remaining toner remaining on the surface of the drum is, together with other toner transferred from the developing roller 31 to the exposed portion, carried by the photosensitive drum 21 and moved to a transfer portion, and transferred to the recording material P in the transfer portion.

Thus, in the present Embodiment, the cleaner-less configuration in which the transfer remaining toner is collected and reused in the developing device 30 is employed, however, it may be configured to collect the transfer remaining toner using a known cleaning blade which is in contact with the photosensitive drum 21. In such a case, the transfer remaining toner collected by the cleaning blade is collected in a collecting container which is installed separately from the developing device 30. However, by employing the cleaner-less configuration, it becomes possible to further downsize the image forming apparatus 1 by eliminating a space for the collecting container configured to collect the transfer remaining toner, etc., and it also becomes possible to reduce printing cost by reusing the transfer remaining toner.

[Configuration of the Toner Pack]

Hereinafter, a replenishing system of the toner (developer) for the image forming apparatus 1 in the present Embodiment will be described. First, a basic configuration of the toner pack 600, which is mountable to and demountable from the image forming apparatus as an apparatus main body and accommodates the toner, will be described using part (*a*) of FIG. 3 through part (*b*) of FIG. 6.

Figure 3:
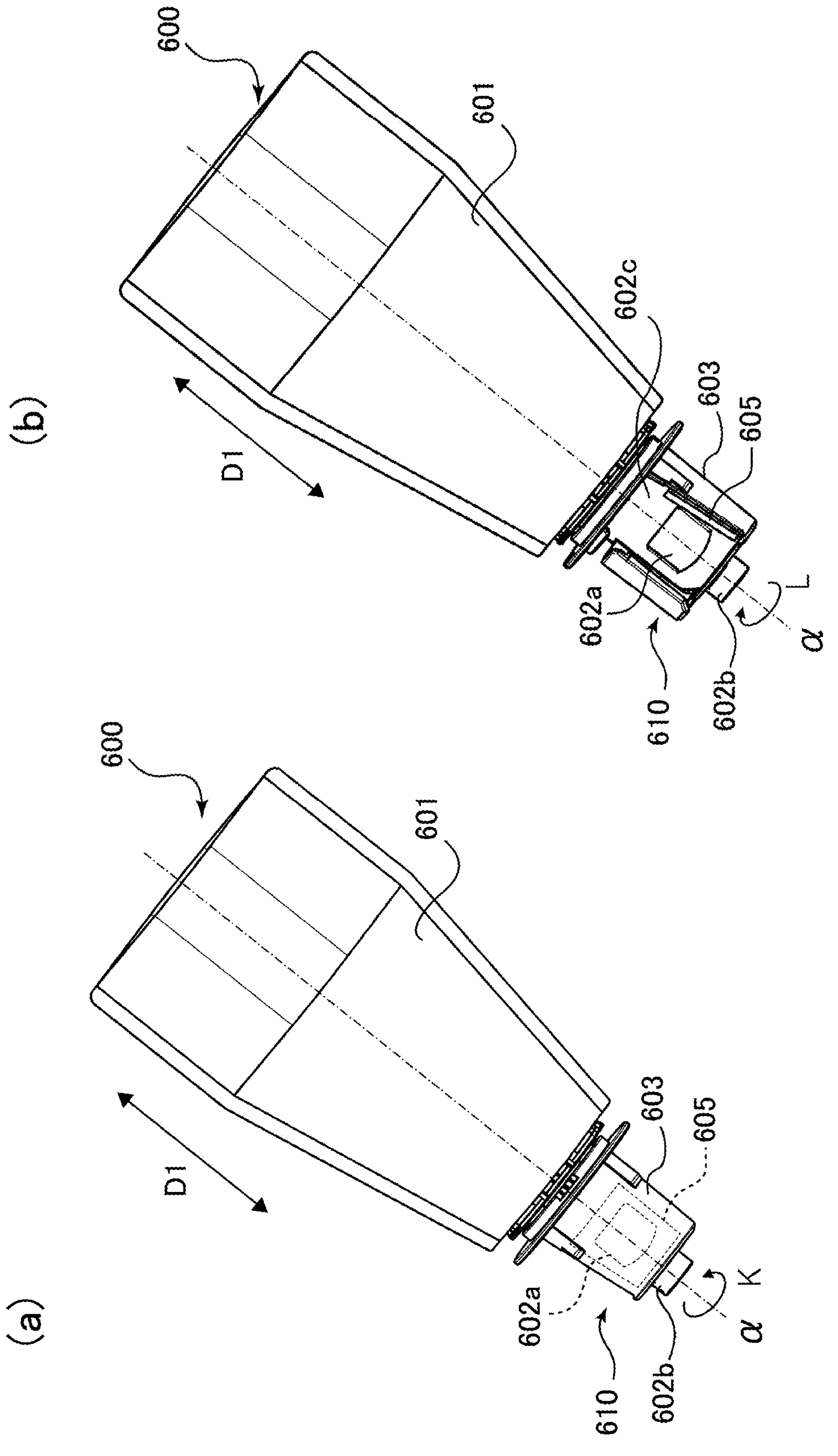
FIG. 3, part (*a*) and part (*b*), is a perspective view of a toner pack according to the Embodiment 1.
Figure 4:
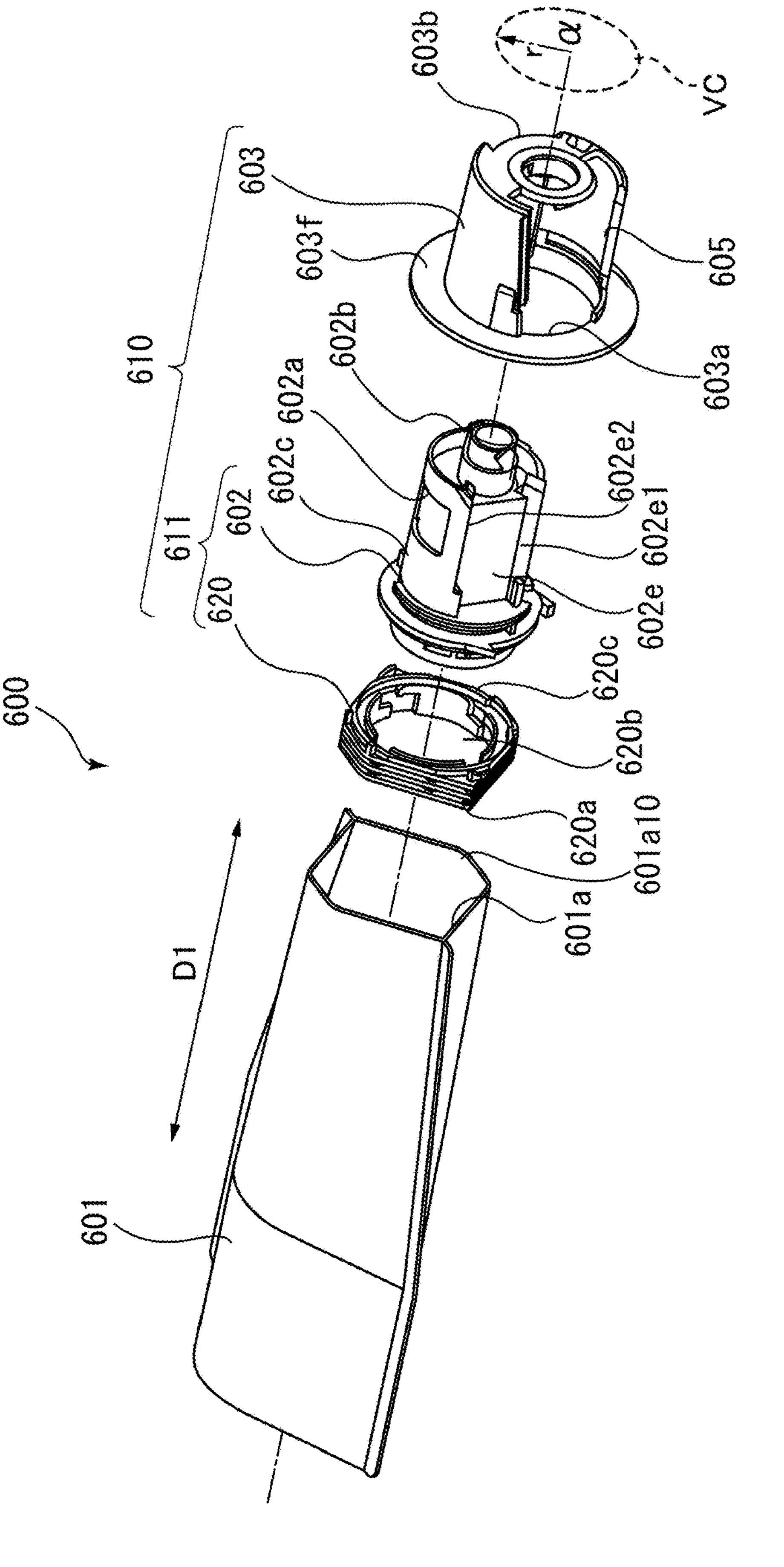
FIG. 4 is an exploded view of the toner pack according to the Embodiment 1.

More specifically, the toner pack 600 as a toner container is mounted to a mounting portion 500 described below, which is provided in the image forming apparatus 1. Part (*a*) of FIG. 3 is a front view of the toner pack 600 when a pack side shutter 603 is in a shielding position. Part (*b*) of FIG. 3 is a front view of the toner pack 600 when the pack side shutter 603 is in an opening position. FIG. 4 is an exploded perspective view of the toner pack 600. Part (*a*) of FIG. 5 is an enlarged view of a vicinity of a nozzle 602 when the pack side shutter 603 is in the shielding position. Part (*b*) of FIG. 5 is a view of the toner pack 600 as viewed in a direction of an arrow U in part (*a*) of FIG. 5. Part (*a*) of FIG. 6 is an enlarged view of a vicinity of the nozzle 602 when the pack side shutter 603 is in the opening position. Part (*b*) of FIG. 6 is a view of the toner pack 600 as viewed in a direction of an arrow U in part (*a*) of FIG. 6.

The toner pack 600 includes a pouch 601 as a first toner accommodating portion which accommodates the toner, an outer ring member 620 connected to the pouch 601, the nozzle 602 and the pack side shutter 603. The outer ring member 620 and the nozzle 602 constitute a base portion 611 connected to the pouch 601.

As shown in part (*a*) and part (*b*) of FIG. 3, the pouch 601 is provided at one end side of the toner pack 600 in an axial direction DI as a first direction. The nozzle unit 610, which is constituted by the outer ring member 620, the nozzle 602 and the pack side shutter 603, is provided on the other end portion side of the toner pack 600 in the axial direction D1. The nozzle unit 610 functions as a discharging member configured to discharge the toner in the pouch 601. In addition, the nozzle unit 610 is a communicating member (adapting portion, connecting portion) which communicates an inner space (accommodating space of the toner) of the pouch 601 and the replenishing opening 32*a* in the printer main body 100 when the toner pack 600 is mounted to the mounting portion 500 of the printer main body 100.

The pouch 601 is a bag member formed of flexible film material (sheet material) such as polypropylene film and having a bag shape with one end portion opened.

The outer ring member 620 includes, as shown in FIG. 4, a connecting surface 620*a*, which is connected (fixed) to one end portion on an opening 601*a*10 side of the pouch 601, and a coupling portion 620*c*, which is coupled to the nozzle 602. An opening edge 601*a*1 of the pouch 601 and the connecting surface 620*a* (connecting portion) of the outer ring member 620 are connected. A connecting method includes, for example, a method using various adhesives such as hot melt, a method in which the pouch 601 is heat welded to an outer periphery of the outer ring member 620, etc., and is not limited thereto as long as the connecting method can seal so that no toner leakage occurs.

The nozzle 602 as a base member is connected to the coupling portion 620*c* of the outer ring member 620 as a cylinder member. The coupling portion 620*c* includes a hole 620*b*. The toner can pass through the hole 620*b*. By this, it becomes possible to fill the toner to the pouch 601 easily via the hole 620*b* and the connecting surface 620*a* of the outer ring member 620. For example, in a state in which the pouch 601 is connected below the outer ring member 620, the pouch 601 is filled with the toner, and then the nozzle 602 is connected to the outer ring member 620. By configuring in this manner, it becomes possible to fill a larger amount of the toner in a shorter time without using a complicated device. This is because the hole 620*b* in the outer ring member 620 has a larger area than a discharging opening 602*a* of the nozzle 602, thereby making the filling of the toner easier and a flow passage of the toner simpler.

To a side surface 602*c* as an outer surface of the nozzle 602 extending in the axial direction D1, the discharging opening 602*a*, which is configured to be communicating with an inside of the pouch 601, and a recessed portion 602*e* are provided. The recessed portion 602*e* is provided at a different position from the discharging opening 602*a* in a rotational direction of the pack side shutter 603. It is configured that the toner accommodated in the pouch 601 is discharged to an outside of the toner pack 600 through the discharging opening 602*a*. Incidentally, the base portion 611 may be a molded resin product in which the nozzle 602 and the outer ring member 620 are integrally molded.

Outside the side surface 602*c* of the nozzle 602, the pack side shutter 603 as a container shutter or a first shutter is provided. The pack side shutter 603 is provided to be rotatable about a rotational axis α, which is extending in a direction along the axial direction D1, and is provided outside the side surface 602*c* in a radial direction r of an virtual circle VC centered on the rotational axis α. The side surface 602*c* of the nozzle 602 is a curved surface (an approximately cylindrical surface) protruding toward an outside in the radial direction r of the virtual circle VC centered on the rotational axis α. An inside surface of the pack side shutter 603, i.e., a surface opposed to the side surface 602*c*, is a curved surface along the side surface 602*c* of the nozzle 602, and a pack side seal 605 as a first seal member having an approximately rectangular shape is attached thereto. As shown in part (*a*) and part (*b*) of FIG. 5, an end surface 603*g*, which forms an opening 603*a* of the pack side shutter 603, and an end surface 605*a* of the pack side seal 605 are inclined surfaces, which are inclined to the rotational axis α. And the end surface 605*a* of the pack side seal 605 is provided in a position protruded to the opening 603*a* side from the end surface 603*g* of the pack side shutter 603.

The pack side shutter 603 is configured to be rotatable between a shielding position as a first shielding position, in which the pack side seal 605 shields the discharging opening 602*a* of the nozzle 602, and an opening position as a first opening position, in which the discharging opening 602*a* is opened, about the rotational axis α. When the pack side shutter 603 is in the opening position, the discharging opening 602*a* of the nozzle 602 is exposed through the opening 603*a*. In addition, as shown in part (*a*) of FIG. 5, when the pack side shutter 603 is in the shielding position, at least a part of the recessed portion 602*e* of the nozzle 602 is exposed from the pack side shutter 603 via the opening 603*a*.

To an end portion of the pack side shutter 603 on the pouch 601 side in the axial direction D1, a disc-shaped flange portion 603*f*, which expands toward an outside in the radial direction r with respect to a side surface of an approximately cylindrical shape of the pack side shutter 603, is provided. In other words, a nozzle unit 610 as a discharging member includes the flange portion 603*f* disposed between the discharging opening 602*a* and the pouch 601 in the axial direction D1 (first direction) and expanding to an outside of an outer surface of the pack side shutter 603 in the radial direction r with respect to the rotational axis α. Since the flange portion 603*f* is provided above the discharging opening 602*a* in a posture upon the toner replenishing (part (*a*) and part (*b*) of FIG. 12), it becomes possible to reduce a possibility that foreign objects fall near the discharging opening 602*a* and the replenishing opening 32*a*. Incidentally, the flange portion 603*f* may be provided separately from the pack side shutter 603.

Part (*a*) of FIGS. 3 and part (*a*) of FIG. 5 illustrate a state in which the pack side shutter 603 is in the shielding position. Part (*b*) of FIG. 3 and part (*a*) of FIG. 6 illustrate a state in which the pack side shutter 603 is in the opening position. As shown in part (*a*) of FIG. 3 and part (*a*) of FIG. 5, when the pack side shutter 603, which is in the shielding position, is rotated in a direction of an arrow K about the rotational axis α, the pack side shutter 603 reaches the opening position illustrated in part (*b*) of FIG. 3 and part (*a*) of FIG. 6. Conversely, by rotating the pack side shutter 603, which is in the opening position, in a direction of an arrow L, the pack side shutter 603 reaches the shielding position. In the rotating operation of the pack side shutter 603, the pack side shutter 603 slides against the side surface 602*c* of the nozzle 602 via the pack side seal 605.

[Mounting Portion]

Next, a configuration of the mounting portion 500 to which the toner pack 600 is mounted will be described using part (*a*) of FIG. 7 through part (*b*) of FIG. 11. In the present Embodiment, the mounting portion 500 is a unit for mounting the toner pack 600 and is provided in the image forming apparatus 1 (see FIG. 2). Part (*a*) of FIG. 7 is an exploded perspective view of the mounting portion 500. Part (*b*) of FIG. 7 is an exploded perspective view of the mounting portion 500 as viewed in a direction different from that of part (*a*) of FIG. 7. Part (*a*) of FIG. 8 and part (*a*) of FIG. 9 are a perspective view illustrating an appearance of the mounting portion 500 when a lever 508 is in a closing position, and a view of the mounting portion 500 as viewed in a mounting direction M, respectively. Part (*b*) of FIG. 8 and part (*b*) of FIG. 9 are a perspective view illustrating the appearance of the mounting portion 500 when the operating lever 508 is in an opening position, and a view of the mounting portion 500 as viewed in the mounting direction M, respectively.

Part (*a*) of FIG. 10 is a perspective view of an apparatus side shutter 509 as viewed from an upstream side in the mounting direction M. Part (*b*) of FIG. 10 is a perspective view of the apparatus side shutter 509 as viewed from a view point different from that of part (*a*) of FIG. 10. Part (*a*) of FIG. 11 is a perspective view of a cover 510 and a shutter sheet 521 as viewed from a downstream side in the mounting direction M. Part (*b*) of FIG. 11 is a perspective view of the cover 510 as viewed from the upstream side in the mounting direction M.

As shown in part (*a*) of FIG. 7 through part (*b*) of FIG. 8, the mounting portion 500 includes a main body base portion 2, and the main body base portion 2 includes a first frame member 507, a second frame member 517, the cover 510 and the shutter sheet 521. The cover 510 and the second frame member 517 are fixed to the first frame member 507. The cover 510 includes, as shown in part (*a*) and part (*b*) of FIG. 11, an engaged portion 510*h* which engages with a positioning portion 507*a* (see part (*a*) of FIG. 7) of the first frame member 507 in order not to rotate about the rotational axis α. Incidentally, the first frame member 507, the cover 510 and the second frame member 517 may be configured as a single member rather than as separate members. As shown in part (*a*) and part (*b*) of FIG. 7, to the second frame member 517, an apparatus side opening 517*a* as a receiving opening is provided, and the apparatus side opening 517*a* communicates with the accommodating portion 36 (see part (*a*) of FIG. 1) of the developer container 32.

The lever 508 and the apparatus side shutter 509 are attached so as to be rotatable with respect to the main body base portion 2 about the rotational axis α, respectively. To the first frame member 507, the positioning portion 507*a* is provided. The positioning portion 507*a* projects inward from an inner peripheral surface of the first frame member 507 centered on the rotational axis α in the radial direction r of the virtual circle VC centered on the rotational axis α.

In addition, to the lever 508, a drive transmitting portion 508*a* and an operating portion 508*b* are provided. The user can rotate the lever 508 about the rotational axis α with respect to the main body base portion 2 by operating the operating portion 508*b*. The drive transmitting portion 508*a* of the lever 508 is, as shown in part (*a*) of FIG. 7, a projecting portion which projects inward from an inner peripheral surface of the lever 508 centered on the rotational axis α in the radial direction r of the virtual circle VC centered on the rotational axis α.

The apparatus side shutter 509 as a main body shutter or a second shutter includes, as shown in part (*a*) and part (*b*) of FIG. 10, an inner peripheral surface 509*h*, a communicating opening 509*a*, which is formed on the inner peripheral surface 509*h* and receives the toner from the toner pack 600, and a bottom surface 509*b*. The apparatus side shutter 509 further includes a center boss 509*d*, a drive transmitted portion 509*e* and a pack contacting surface 509*g*. The drive transmitted portion 509*e* is, as shown in part (*a*) of FIG. 10, a projecting portion which projects inward in the radial direction r of the virtual circle VC centered on the rotational axis α. To the inner peripheral surface 509*h*, an apparatus side seal 511 as a second seal member is attached so as to surround the communicating opening 509*a* (see part (*b*) of FIG. 8).

The apparatus side shutter 509 is configured to take a shielding position as a second shielding position and an opening position as a second opening position with respect to the main body base portion 2. More specifically, the apparatus side shutter 509 rotates, as shown in part (*a*) and part (*b*) of FIG. 10, in a direction of an arrow K from the shielding position to the opening position, and in a direction of an arrow L from the opening position to the shielding position. Incidentally, the direction of the arrow K and the direction of the arrow L are the same as the direction of the arrow K and the direction of the arrow L as the rotational direction of the pack side shutter 603 shown in part (*a*) of FIG. 5. In the apparatus side shutter 509, the communicating opening 509*a* is covered by the apparatus side seal 511 and the cover 510 in the shielding position, and the communicating opening 509*a* is not covered by the cover 510 but opened in the opening position. In other words, the communicating opening 509*a* does not communicate with the apparatus side opening 517*a* of the second frame member 517 when the apparatus side shutter 509 is positioned in the shielding position, but communicates with the apparatus side opening 517*a* of the second frame member 517 when the apparatus side shutter 509 is in the opening position.

An end surface 511*a* of the apparatus side seal 511 is disposed, as shown in part (*b*) of FIG. 8, to be projecting in a peripheral direction from an end surface 509*i* surrounding the communicating opening 509*a*, which is an affixed seat surface (see part (*b*) of FIG. 10). In addition, the end surface 511*a* is an inclined surface.

The apparatus side shutter 509 is positioned in the shielding position in part (*a*) of FIG. 8 and part (*a*) of FIG. 9, and at this time, the communicating opening 509*a* of the apparatus side shutter 509 is not communicating with the apparatus side opening 517*a* of the second frame member 517. In addition, the apparatus side shutter 509 is positioned in the opening position in part (*b*) of FIG. 8 and part (*b*) of FIG. 9, and at this time, the communicating opening 509*a* of the apparatus side shutter 509 is communicating with the apparatus side opening 517*a* of the second frame member 517. By the apparatus side shutter 509 being moved to the opening position, it becomes possible to replenish (supply) the toner from the toner pack 600 to the accommodating portion 36 of the developer container 32 via the communicating opening 509*a*.

Incidentally, since drive of the lever 508 and the apparatus side shutter 509 is not connected, the apparatus side shutter 509 is configured not to rotate even if the lever 508 is operated in a state in which the toner pack 600 is not mounted.

The shutter sheet 521 as a sheet member shown in part (*a*) and part (*b*) of FIG. 8 and part (*a*) and part (*b*) of FIG. 11 is a film having a thickness of about 100 μm, and is fixed to the cover 510 with a double-sided tape, etc. And the shutter sheet 521 slides against the apparatus side seal 511 affixed to the apparatus side shutter 509 when the apparatus side shutter 509 is rotated between the shielding position and the opening position.

[Mounting of the Toner Pack to the Mounting Portion]

Next, a state in which the toner pack 600 is mounted to the mounting portion 500 will be described using part (*a*) of FIG. 12 through part (*b*) of FIG. 14. Part (*a*) and part (*b*) of FIG. 12 are perspective views illustrating a state in which the toner pack 600 is in a process of being mounted to the mounting portion 500 as viewed from different angles. FIG. 13 is a cross-sectional view parallel to the rotational axis α in a state in which the toner pack 600 is moved further from the state in part (*a*) and part (*b*) of FIG. 12 to the mounting direction. Part (*a*) of FIG. 14 is a cross-sectional view taken along a line 14A-14A in FIG. 13. Part (*b*) of FIG. 14 is a cross-sectional view taken along a line 14B-14B in FIG. 13. Incidentally, in FIG. 13 through part (*b*) of FIG. 14, cut surfaces of the pack side shutter 603 and the cover 510 are shaded for better distinction.

In the description below, as shown in part (*a*) and part (*b*) of FIG. 12, the user moves the toner pack 600, which is in a state where the pack side shutter 603 is in the shielding position, to the mounting portion 500, which is in a state where the apparatus side shutter 509 is in the shielding position, in the moving direction M to mount. At this time, the end surface 511*a* of the apparatus side seal 511 and the end surface 605*a* of the pack side seal 605 are contacting to each other in a state of being overlapped in the peripheral direction, and slide while being deformed in the mounting direction M. In other words, the end surface 605*a* of the pack side seal 605 contacts the end surface 511*a* of the apparatus side seal 511 in a state in which the toner pack 600 is being mounted to the main body base portion 2.

Since the end surface 605*a* of the pack side seal 605 is protruding to the opening 603*a* of the pack side shutter 603, the end surfaces 605*a* and 511*a* are in pressure contact with each other when the toner pack 600 is mounted to the main body base portion 2. As a result, the pack side seal 605 and the apparatus side seal 511 contact to each other closely, it becomes possible to improve sealing performance and reduce toner leakage. In addition, since the end surfaces 605*a* and 511*a* extend toward the rotational direction of the pack side shutter 603 (arrow K and L direction) as it goes to a direction of rotational axis α (axial direction D1), it becomes possible to reduce resistance on a way of mounting the toner pack 600 to the mounting portion 500. By this, it becomes possible to mount the toner pack 600 to the mounting portion 500 smoothly and improve operability.

The user positions the recessed portion 602*e* of the nozzle 602 and the opening 603*a* of the pack side shutter 603, and the positioning portion 507*a* of the first frame member 507. At the same time, the user also aligns positions of a drive transmitted portion 603*b* of the pack side shutter 603 and the drive transmitting portion 508*a* of the lever 508.

After such positioning of the toner pack 600 and the mounting portion 500, the user mounts the toner pack 600 to the mounting portion 500 by moving the toner pack 600 in the mounting direction M. Then, as shown in FIG. 13, to an inner peripheral surface 602*b*1 of a projecting portion 602*b* of the nozzle 602, a small diameter portion 509*d*2 of the center boss 509*d* of the apparatus side shutter 509 is fitted. By this, a position of the nozzle 602 in the radial direction with respect to the apparatus side shutter 509 is determined. In addition, by a tip portion of the projecting portion 602*b* of the nozzle 602 abutting the pack contacting surface 509*g* of the apparatus side shutter 509, a position in the mounting direction M of the toner pack 600 is determined.

At this time, as shown in part (*b*) of FIG. 14, end surfaces 510*f* and 510*g* of the cover 510 approach to or engage with surfaces 602*e*1 and 602*e*2 forming the recessed portion 602*e* of the nozzle 602.

In addition, as shown in part (*a*) and part (*b*) of FIG. 14, the drive transmitted portion 603*b* of the pack side shutter 603 engages with the drive transmitted portion 509*e* of the apparatus side shutter 509 and the drive transmitting portion 508*a* of the lever 508. As a result, the rotational axis of the pack side shutter 603 and the rotational axis of the apparatus side shutter 509 become approximately coaxial (the rotational axis α). In addition, since the faces 602*e*1 and 602*e*2 of the recessed portion 602*e* of the nozzle 602 engage with the end surfaces 510*f* and 510*g* of the cover 510, respectively, the nozzle 602 of the toner pack 600 does not rotate with respect to the main body base portion 2 including the cover 510. In other words, the recessed portion 602*e* as an engaging portion restricts the rotation of the nozzle 602 with respect to the image forming apparatus 1 by engaging with the cover 510 as an engaged portion of the image forming apparatus 1 when the toner pack 600 is mounted to the image forming apparatus 1.

And the lever 508, the pack side shutter 603 and the apparatus side shutter 509 can rotate approximately integrally about the rotational axis α with respect to the main body base portion 2 and the nozzle 602.

For example, when the lever 508 is rotated from the closing position to the opening position, the drive transmitting portion 508*a* as a second engaging portion of the lever 508 presses a surface 603*b*1 as a first engaged portion of the pack side shutter 603. As a result, the pack side shutter 603 is rotated from the shielding position to the opening position together with the lever 508. In addition, a surface 603*b*2 as a first engaging portion of the pack side shutter 603, which is rotated from the shielding position to the opening position, presses a surface 509*e*2 as a second engaged portion of the apparatus side shutter 509. As a result, the apparatus side shutter 509 is rotated from the shielding position to the opening position together with the pack side shutter 603.

Conversely, when the lever 508 is rotated from the opening position to the closing position, the drive transmitting portion 508*a* of the lever 508 presses the surface 603*b*2 of the pack side shutter 603. As a result, the pack side shutter 603 is rotated from the opening position to the shielding position together with the lever 508. In addition, the surface 603*b*1 of the pack side shutter 603, which is rotated from the opening position to the shielding position, presses a surface 509*e*1 of the drive transmitted portion 509*e* of the apparatus side shutter 509. As a result, the apparatus side shutter 509 is rotated from the opening position to the shielding position together with the pack side shutter 603.

As such, by operating the lever 508, it is possible to rotate the pack side shutter 603 and the apparatus side shutter 509 between the shielding position and the opening position, and to perform the replenishment of the toner from the toner pack 600 to the developer container 32. When the replenishment of the toner from the toner pack 600 to the developer container 32 is completed, the user rotates the lever 508 from the opening position to the closing position and pulls the toner pack 600 out of the mounting portion 500.

Upon rotating the pack side shutter 603 and the apparatus side shutter 509, the end surface 511*a* of the apparatus side seal 511 and the end surface 605*a* of the pack side seal 605 contact to each other closely and no space is formed, thus it is possible to suppress penetration of the toner.

[Groove Portion of the Pack Side Shutter]

In the pack side shutter 603, as shown in part (*a*) of FIG. 6, a groove portion 603*h* extending in the peripheral direction, i.e., in the rotational direction of the pack side shutter 603 (arrow K and L direction (see part (*a*) of FIG. 5)) is formed. As described above, when the toner pack 600 is mounted to the mounting portion 500 and the lever 508 is rotated from the closing position shown in part (*a*) of FIG. 8 to the opening position shown in part (*b*) of FIG. 8, the drive transmitting portion 508*a* of the lever 508 enters the groove portion 603*h* of the pack side shutter 603. In a state in which the drive transmitting portion 508*a* enters the groove portion 603*h*, it is restricted that the toner pack 600 is pulled out of the mounting portion 500 by the drive transmitting portion 508*a* being caught by the toner pack 600.

Thus, once the replenishment of the toner from the toner pack 600 to the developer container 32 begins, it becomes possible to prevent the toner pack 600 from moving from the mounting portion 500 to an opposite direction to the mounting direction M, and to prevent the toner from leaking outside of the image forming apparatus 1.

In addition, as shown in part (*a*) of FIG. 6, in an entrance portion of the groove portion 603*h*, a taper portion 603*i* having taper shape, which is inclined with respect to the peripheral direction and the axial direction D1, is formed. In other words, the taper portion 603*i* extends toward the rotational direction of the pack side shutter 603 (arrow K and L direction) as it goes to the direction of the rotational axis α (axial direction D1). The taper portion 603*i* is what allows the drive transmitting portion 508*a* to be easily inserted into the groove portion 603*h* even if the toner pack 600 is slightly misaligned in the mounting direction M when the toner pack 600 is mounted to the mounting portion 500. In addition, when the toner pack 600 is pulled out of the mounting portion 500, if the rotational movement of the lever 508 to the closing position is not sufficient, the drive transmitting portion 508*a* of the lever 508 is in contact with the taper portion 603*i*. When the toner pack 600 is pulled out of the mounting portion 500 in this state, by the drive transmitting portion 508*a* being pressed against the taper portion 603*i*, the lever 508 is rotated to the closing position and is returned to a proper position.

As such, by providing the groove portion 603*h* and the taper portion 603*i* in the pack side shutter 603, it becomes possible to prevent the toner pack 600 from exiting, make the rotational operation of the lever 508 easier, and return the lever 508 to the proper shielding position. In addition, it is possible to improve operability such as interference of components does not occur upon mounting the toner pack 600 to the mounting portion 500 again.

[Detail of the Pouch]

Next, the pouch 601 of the toner pack 600 will be described using part (*a*) of FIG. 15 through part (*f*) of FIG. 17. Part (*a*) through part (*d*) of FIG. 15 are views illustrating the toner pack 600 in a state in which a cap 630 for protection is attached to the nozzle unit 610. Part (*a*) of FIG. 15 is a plane view of the toner pack 600. Part (*b*) of FIG. 15 is a side view of the toner pack 600. Part (*c*) of FIG. 15 is a front view of the toner pack 600. Part (*d*) of FIG. 15 is a bottom view of the toner pack 600. Incidentally, the toner pack 600 shown in part (*a*) of FIG. 15 through part (*a*) of FIG. 23 is provided with substantially the same configuration as the toner pack 600 shown in part (*a*) of FIG. 3 through part (*b*) of FIG. 6, except that a shape of the outer ring member 620 is slightly different.

Part (*a*) and part (*b*) of FIG. 16 are perspective views of the toner pack 600 in a state in which the cap 630 is removed. Part (*a*) through part (*f*) of FIG. 17 are six-sided views of the toner pack 600 in the state in which the cap 630 is removed in the third angle projection. Part (*a*) of FIG. 17 is a plane view of the toner pack 600. Part (*b*) of FIG. 17 is a left side view of the toner pack 600. Part (*c*) of FIG. 17 is a front view of the toner pack 600. Part (*d*) of FIG. 17 is a right side view of the toner pack 600. Part (*d*) of FIG. 17 is a back view of the toner pack 600. Part (*f*) of FIG. 17 is a bottom view of the toner pack 600.

To define a shape of the toner pack 600 and the pouch 601, an X axis direction (first direction), a Y axis direction (second direction) and a Z axis direction (third direction), which are perpendicular to each other, will be used in the following description and Figures. The X axis direction is a direction from the nozzle unit 610 (base portion 611) side to the pouch 601 side. The X axis direction in the present Embodiment is a direction substantially parallel to the axial direction DI of the rotational axis α of the pack side shutter 603. The Y axis direction is a longitudinal direction of the pouch 601 as viewed in the X axis direction. The Z axis direction is a widthwise direction of the pouch 601 as viewed in the X axis direction. In other words, the toner pack 600 in the present Embodiment has a shape in which the maximum length of the pouch 601 in the Y axis direction is longer than the maximum length of the pouch 601 in the Z axis direction as viewed in the X axis direction.

As shown in part (*a*) of FIG. 15 through part (*f*) of FIG. 17, the pouch 601 is a bag member made of flexible film material (sheet material). By "flexible", it indicates that the pouch has flexibility to an extent in which the user can easily deform and reduce a volume of the pouch 601 to facilitate the toner discharge by rubbing the pouch 601 with hand in a state in which the discharging opening 602*a* is opened. The pouch 601 includes a side surface portion 601*a* made of two film materials and a bottom portion 601*b* (gusset portion, bottom gusset) 601*b* made of one film material. The pouch 601 is formed into a cylindrical shape with a bottom by the film materials being bonded together by a method such as heat welding. A manufacturing method of the pouch 601 will be described in detail later.

For the film material constituting the pouch 601, for example, a polypropylene film with a thickness of 25 [μm] or more and 300 [μm] or less can be used. In a configuration example to which the present Embodiment is applied, the polypropylene film with the thickness of 110 μm is used. The film material is not limited to polypropylene, but can also be other synthetic resin such as polyethylene and polyethylene terephthalate, or paper. In addition, the film material can be a laminated material in which, on a base layer of polypropylene, etc., other material is laminated. For example, a heat sealing layer may be provided on a surface layer of the film material (surface layer on a welded side), which enhances welding performance by being softened at a lower temperature than the base layer. Other than that, for example, a barrier layer such as a metal vapor deposition film, or a surface layer for enhancing a printability of a surface exposed to a surface of the pouch 601 may be provided. In addition, a different film material may be used between the side surface portion 601*a* and the bottom portion 601*b*.

The side surface portion 601*a* of the pouch 601 is a cylindrical portion which extends in the X axis direction (first direction) while forming the accommodating space for accommodating the toner inside thereof. That is, the side surface portion 601*a* of the pouch 601 is extending along a first direction connecting an opening 601*a*10 side and a bottom portion 601*b* side, which is an opposite side of the opening side. The side surface portion 601*a* in the Embodiment is formed into a cylindrical shape by bonding side edges in the Y axis direction of the two film materials by a method such as welding over an entire area in the X axis direction. In addition, a cross-sectional shape of the side surface portion 601*a* as viewed in the X axis direction is a spindle shape having a longitudinal direction in the Y axis direction and a widthwise direction in the Z axis direction.

The bottom portion 601*b* of the pouch 601 is a portion which closes the accommodating space of the toner from one side in the X axis direction (first direction). The bottom portion 601*b* in the present Embodiment is formed by bonding a peripheral portion of the one film material to each of the two film materials constituting the side surface portion 601*a* by a method such as welding. A shape of the bottom portion 601*b* as viewed in the X axis direction is a spindle shape having a longitudinal direction in the Y axis direction and a widthwise direction in the Z axis direction.

Here, the nozzle unit 610 is a discharging member for discharging the toner in the accommodating space to an outside. To the nozzle unit 610, a top surface portion 620*d* as an opposing surface opposed to the bottom portion 601*b* of the pouch 601 in the X axis direction (see part (*b*) of FIG. 18 and part (*a*) and part (*b*) of FIG. 20) is provided. The top surface portion 620*d* is an end surface of the outer ring member 620 in the X axis direction and is expanded in a direction crossed with the X axis direction. A shape of the top surface portion 620*d* as viewed in the X axis direction is a spindle shape having a longitudinal direction in the Y axis direction and a widthwise direction in the Z axis direction.

The top surface portion 620*d* is a surface which is exposed to the accommodating space inside the pouch 601 when the pouch 601 is attached to the nozzle unit 610. In other words, the accommodating space formed by the side surface portion 601*a* of the cylindrical shape is closed by the bottom portion 601*b* from one side in the X axis direction and by the top surface portion 620*d* of the nozzle unit 610 from the other side in the X axis direction. By this, the accommodating space inside the pouch 601 is sealed (assuming that the pack side shutter 603 is closed).

In a central portion of the top surface portion 620*d* an opening is provided, and inside the opening, a receiving opening 602*f* of the nozzle 602 connected to the outer ring member 620 is exposed. The receiving opening 602*f* is an opening communicating with the discharging opening 602*a* via a flow passage 602*g* inside the nozzle 602. Accordingly, the nozzle unit 610 is configured to receive the toner inside the pouch 601 into the flow passage 602*g* via the receiving opening 602*f* when the toner pack 600 is mounted to the mounting portion 500 of the printer main body 100 and the shutters of the pack side and the apparatus side are opened. The toner flowing into the flow passage 602*g* via the receiving opening 602*f* is, as described above, discharged from the discharging opening 602*a* and replenished into the printer main body 100 via the replenishing opening 32*a*.

The top surface portion 620*d* (opposing surface) in the present Embodiment is configured to be a plane expanding approximately perpendicular to the X axis direction, however, a shape of the surface is not limited thereto. For example, the top surface portion 620*d* (opposing surface) may be configured to be a curved surface (conical shape) which is concave toward a discharging opening 602*a* side in the X axis direction as it approaches the rotational axis α (part (*a*) and part (*b*) of FIG. 16 and part (*a*) and part (*f*) of FIG. 17). In addition, for example, the top surface portion 620*d* (opposing surface) may be formed in a V-shape in which a central portion in the Y axis direction is concave toward the discharging opening 602*a* in the X axis direction compared to both end portions as viewed in the Z axis direction.

Incidentally, as shown in part (*a*) through part (*d*) of FIG. 15, the cap 630 is formed as the cylindrical shape with the bottom and is attached to the pack side shutter 603 so as to be attachable thereto and detachable therefrom. An outer diameter of the cap 630 is smaller than the maximum outer diameter of the flange portion 603*f* of the pack side shutter 603. In a state in which the cap 630 is attached, most of a portion where the nozzle 602 and the pack side shutter 603 interacts with the mounting portion 500 of the printer main body 100 (e.g., the recessed portion 602*e* and the end surfaces 603*g* and 605*a*), is hidden by the cap 630. Therefore, in the state in which the cap 630 is attached, the nozzle unit 610 is protected from damage due to collision with an object or accidental touching by the user.

In addition, as shown in part (*b*) and part (*d*) of FIG. 15, to the flange portion 603*f* of the pack side shutter 603, a straight portion 603*fa*, in which a circumference is notched by a straight line, is provided. In a state in which the pack side shutter 603 is positioned in the shielding position, the straight portion 603*fa* is substantially parallel to the Y axis direction. In other words, the flange portion of the present Embodiment includes a straight portion formed in a linear shape in the second direction (Y axis direction) at a position away from an axis of the shutter (rotational axis α) in the third direction (Z axis direction). By the straight portion 603*fa* being provided, stability when the toner pack 600 is placed on a horizontal plane in a posture in which the X axis direction is approximately horizontal and the straight portion 603*fa* is positioned downside is improved.

[Manufacturing Method of the Pouch]

Next, an example of the manufacturing method of the pouch 601 will be described. Part (*a*) of FIG. 18 is a view schematically representing a method of making the pouch 601, which is a bag member, from three original sheets Sa1, Sa2 and Sb. Part (*b*) of FIG. 18 is a view for describing a connecting method of the pouch 601 to the nozzle unit 610.

As shown in part (*a*) of FIG. 18, first, the original sheet Sb, which is to become the bottom portion 601*b* of the pouch 601, is folded in two and placed between the two original sheets Sa1 and Sa2, which is to become the side surface portion 601*a* of the pouch 601. In this state, the original sheets Sa1 and Sa2 are welded together in an area A1 in the side edges. In addition, by the original sheets Sa1 and Sb being welded together in an area A2, and the original sheets Sa2 and Sb being welded together in an area A3, the pouch 601 of a bag shape (cylindrical shape with the bottom) is formed.

In an actual pouch manufacturing device, the individual pouches 601 are cut out by cutting the original sheets at a position between the adjacent pouches 601, while forming the bag structure of the pouch 601 by sequentially performing welding to web of the original sheet, which are continuously ejected in a flow direction from a web roll. At this time, the cutting is performed at a position corresponding to an end edge in the Y axis direction of the original sheets Sa1, Sa2 and Sb shown in part (*a*) of FIG. 18. By this, the pouch 601 shown in part (*b*) of FIG. 18, etc., can be obtained.

A method for making the pouch 601 in the bag shape (cylindrical shape with the bottom) from one or more film materials (original sheets) is not limited thereto, but for example, a sheet for a side surface gusset may be interposed between the original sheets Sa1 and Sa2.

In addition, in a case in which the original sheets Sa1, Sa2 and Sb are welded together in the areas A2 and A3 shown in part (*a*) of FIG. 18, the bottom portion 601*b* of the pouch 601 becomes a mountain-shaped surface whose central portion in the Y axial direction is protruding as shown in part (*a*) through part (*c*) of FIG. 15. However, the shape of the bottom portion 601*b* is not limited thereto, but the shape of the bottom portion 601*b* can be changed by changing a shape or arrangement of the areas A2 and A3 in which the side surface portion 601*a* and the bottom portion 601*b* are welded together. For example, in the original sheet Sb which is to become the bottom portion 601*b* of the pouch 601, the greater a distance measured along a direction Df perpendicular to a fold line from the area A2, in which the original sheet Sb is welded to the one original sheet Sa1, to the area A3, in which the original sheet Sb is welded to the other original sheet Sa2, the greater a dimension in the Z axis direction of the bottom portion 601*b* of the pouch 601. In other words, the shape of the manufactured pouch 601 can be controlled by changing the areas A1 through A3 in which the original sheets Sa1, Sa2 and Sb are welded together upon manufacturing the pouch 601.

As shown in part (*b*) of FIG. 18, the opening edge 601*a*1 of the side surface portion 601*a* of the pouch 601, which is formed into the bag shape (cylindrical shape with the bottom) open toward the opposite side of the bottom portion 601*b* in the X axis direction, is connected to the outer ring member 620 of the nozzle unit 610. That is, the nozzle unit 610 as a discharging member is connected to an opening side of the pouch 601 as a bag member. The outer ring member 620 includes a connecting surface 620*e* (attaching surface) of a form in which a peripheral edge of the top surface portion 620*d* as viewed in the X axis direction is extended in the X axis direction. And by the opening edge 601*a*1 of the pouch 601 being connected to the connecting surface 620*e* by a method such as hot melt adhesive or welding, the pouch 601 is integrated with the nozzle unit 610.

The connecting surface 620*e* is a connecting portion of the discharging member configured to prevent toner leakage by being connected to the pouch 601 (bag member) with all around of the top surface portion 620*d* as the opposing surface. As described above, the nozzle 602, etc. may be attached to the outer ring member 620 after the pouch 601 is filled with the toner via the opening of the outer ring member 620 in a state in which the pouch 601 is connected to the outer ring member 620.

[Detail of the Shape of the Pouch]

Hereinafter, detail of an outer shape and a cross-sectional shape of the pouch 601 of the toner pack 600 in the present Embodiment will be described using FIG. 19 through part (*b*) of FIG. 23. FIG. 19 is a view illustrating cut positions of the toner pack 600 shown in part (*a*) of FIG. 20 through part (*b*) of FIG. 22.

(1. Overall Description)

Hereinafter, positions in the X axis direction will be defined with reference to a position of the top surface portion 620*d* (opposing surface of the discharging member) of the nozzle unit 610 in the X axis direction (X=0). A position of an end portion of the pouch 601 in an opposite side of the nozzle unit 610 in the X axis direction is defined as X=Xmax. In other words, a range of value X can take with respect to the pouch 601 is $0 \leq X \leq Xmax$. In addition, Xmax is a height of the pouch 601 (external dimension) in the X axis direction with respect to the top surface portion 620*d* (opposing surface). Incidentally, in a case in which the top surface portion 620*d* is not a plane perpendicular to the X axis direction, positions in the X axis direction may be defined with reference to a portion in the top surface portion 620*d* positioned closest to the bottom portion 601*b* side of the pouch 601 in the X axis direction (X=0).

In FIG. 19, $0 < X1 < Xmax/2 < X2 < Xmax$. In other words, X=X1 is a position closer to the nozzle unit 610 than half of the height of the pouch 601 (Xmax) in the X axis direction. Conversely, X=X2 is a position farther from the nozzle unit 610 than half of the height of the pouch 601 (Xmax) in the X axis direction.

Part (*a*) and part (*b*) of FIG. 20 are a perspective view and a cross-sectional view of a portion of the toner pack cut at a position of X=0 shown in FIG. 19. Part (*a*) and part (*b*) of FIG. 21 are a perspective view and a cross-sectional view of a portion of the toner pack cut at a position of X=X1 shown in FIG. 19. Part (*a*) and part (*b*) of FIG. 22 are a perspective view and a cross-sectional view of a portion of the toner pack cut at a position of X=X2 shown in FIG. 19.

Part (*a*) and part (*b*) of FIG. 23 are what plot parameters related to the shape of the pouch 601 with respect to positions in the X axis direction in the configuration example to which the present Embodiment is applied.

In the description below, a dimension of the pouch 601 in the X axis direction is referred to as a "height". Given a position X in the X axis direction, a dimension in the Y axis direction of the pouch 601 in a plane perpendicular to the X axis direction at the position X is referred to as a "width Y" or simply a "width". In addition, given a position X in the X axis direction, a dimension in the Z axis direction of the pouch 601 in the plane perpendicular to the X axis direction at the position X is referred to as a "thickness Z" or simply a "thickness". Incidentally, unless otherwise noted, the width Y and the thickness Z of the pouch 601 shall represent an internal dimension of the pouch 601. The thickness Z is a depth dimension of the toner pack 600 or the pouch 601 when a viewpoint of part (*c*) of FIG. 17 is defined as a front side of the toner pack 600.

Incidentally, in the configuration example of the present Embodiment, a width of the welded area in the side edges of the side surface portion 601*a* of the pouch 601 is about 5 mm in an entire area in the X axis direction. Therefore, an external dimension of the pouch 601 in the Y axis direction is a value in which 10 mm is added to the width Y as the internal dimension. On the other hand, since a thickness of the film material constituting the pouch 601 is smaller than the thickness Z of the pouch 601, the external dimension of the pouch 601 in the Z axis direction is approximately equal to the thickness Z as the internal dimension.

In addition, since the pouch 601 is made of the flexible film material, the shape of the pouch 601 is described based on a natural shape of the pouch 601. The natural shape of the pouch 601 is a shape of the pouch 601 when the pouch 601 is not deformed by external force. If the pouch 601 can take multiple shapes in a state in which the external force is not applied, the natural shape of the pouch 601 can be observed in the following way. First, remove deformation (bending) of the side surface portion 601*a* and the bottom portion 601*b* by gripping the nozzle unit 610 with the nozzle unit 610 up and blowing air into the pouch 601 via the discharging opening 602*a* to make an inner pressure of the pouch 601 slightly higher than 1 atm. The shape of the pouch 601 may then be measured when the air blowing is stopped and the inner pressure of the pouch 601 returns to 1 atm.

(2. Overall Shape of the Pouch)

As shown in part (*a*) through part (*f*) of FIG. 17, the pouch 601 of the toner pack 600 according to the present Embodiment has an outer shape extending long in the X axis direction, and a maximum length Ymax in the Y axis direction of the pouch 601 is longer than a maximum length Zmax in the Z axis direction of the pouch 601 as viewed in the X axis direction. That is, Xmax>Ymax>Zmax.

In addition, in a range of 0≤X≤Xmax (i.e., entire range of the value which X can take with respect to the pouch 601), the thickness Z of the pouch 601 in a cross section perpendicular to the X axis direction is the width Y or less. In other words, the following relationship holds in the range of 0≤X≤Xmax.

$$X_{max} > Y \geq Z$$

Thus, the pouch in the present Embodiment has a shape which is longitudinal in the X axis direction and flat in the Y axis direction.

In addition, as shown in FIG. 19 through part (*b*) of FIG. 22, in the range of 0≤X≤Xa, the width Y and the thickness Z of the pouch 601 increase as it goes toward a side of the bottom portion 601*b* of the pouch 601 in the X axis direction. Here, Xa represents an inflection point of the shape of the pouch 601, and Xmax/2<Xa<Xmax. In other words, a range of 0≤X≤Xa of the pouch 601 (bag member) is a taper portion 601*t*, which is formed so that a cross-sectional area of the pouch in a cross section perpendicular to the X axis direction decreases as it approaches the top surface portion 620*d* of the nozzle unit 610 in the X axis direction (first direction).

Thus, as shown in part (*a*) of FIG. 20 through part (*b*) of FIG. 22, when the widths Y of the pouch 601 at X=0, X=X1 and X=X2 are Y0, Y1 and Y2, respectively, then Y0<Y1<Y2. In addition, when the thicknesses Z of the pouch 601 at X=0, X=X1 and X=X2 are Z0, Z1 and Z2, respectively, then Z0<Z1<Z2.

The taper portion 601*t* has a tapered shape in which the width Y and the thickness Z of the pouch 601 decrease toward the top surface portion 620*d* of the nozzle unit 610. By this, it becomes possible to reduce the width Y0 and the thickness Z0 of a lower end portion of the pouch 601 (X=0) while maintaining capacity of the pouch 601, and to reduce a toner amount which remains in the lower end portion of the pouch 601 upon discharging the toner. Incidentally, the same effect can be obtained if the shape of the pouch 601 is configured that at least one of the width Y or the thickness Z monotonically increases with respect to X in at least some range in the X axis direction including the lower end portion of the pouch 601 (X=0). In addition, the same effect can be obtained if the shape of the pouch 601 is configured that the cross-sectional area of the pouch 601 monotonically increases with respect to X in at least some range in the X axis direction including the lower end portion of the pouch 601 (X=0).

In addition, in the present Embodiment, in the range of Xa≤X≤Xmax, the width Y and the thickness Z of the pouch 601 are constant (Y=Ymax, Z=Zmax).

In the configuration example to which the present Embodiment is applied, Xmax=135 (mm), Ymax=75 (mm), and Zmax=47 (mm). In this configuration example, a volume of the accommodating space in the pouch 601 is about 200 $cm^3$ and an amount of the filled toner is 75 g.

In addition, in this configuration example, the width Y0 and the thickness Z0 of the pouch 601 at X=0 are Y0=47.6 (mm) and Z0=40.5 (mm). In addition, the inflection point (Xa) is in a position about 85 mm from the top surface portion 620*d*. In the taper portion 60*t*, the width Y and the thickness Z vary from Y0, Z0 to Ymax, Zmax, respectively, generally at a constant rate with respect to X.

(3. Thickness of the Pouch)

By the way, in the toner pack 40 of the reference example shown in part (*a*) and part (*b*) of FIG. 1, the pouch has a tapered shape in which the thickness thereof in the Z axis direction decreases as it goes toward the bottom portion side of the pouch (opposite side of the nozzle) in the X axis direction. However, in this configuration, ratio of the volume of the pouch, which is a space capable of actually accommodating the toner, to a space occupied by the pouch (a rectangle having the height Xmax, the width Ymax and the thickness Zmax) is small. Therefore, in order to fill the toner pack 40 with a sufficient amount of the toner, upsizing of the pouch is inevitable.

Thus, in the present Embodiment, a shape in which the pouch 601 has approximately the same thickness Z over an entire area of the pouch 601 in the X axis direction is adopted. Specifically, in the range of 0≤X≤Xmax, the thickness Z of the pouch 601 satisfies the following inequality with respect to the thickness Z0 of the pouch 601 at X=0 (part (*a*) and part (*b*) of FIG. 20).

$$0.8\times Z0 \le Z \le 1.2\times Z0$$

As shown by a solid line in part (*b*) of FIG. 24, a value of Z/Z0 in this configuration example is within a range from 1.0 to 1.2 in the range of 0≤X≤Xmax (=135) and satisfies the above inequality.

As such, over the entire area in the X axis direction (0≤X≤Xmax), the thickness Z of the pouch 601 is configured to be 80% or more of the thickness Z0 at X=0. Therefore, it becomes possible to make ratio of a volume of the pouch 601 to a space occupied by the pouch 601 larger and to fill a sufficient amount of the toner using the compact pouch 601. In addition, the thickness Z of the pouch 601 is configured to be 120% or less of the thickness Z0 at X=0 over the entire area in the X axis direction (0≤X≤Xmax). Therefore, it becomes possible to suppress adverse effect caused when the thickness Z of the pouch 601 is excessively large (e.g., deterioration in alignment performance upon packaging, deterioration in stability upon placing horizontally, etc.).

In addition, in the present Embodiment, the bottom portion 601*b* of the pouch 601 and the top surface portion 620*d* (opposing surface) of the nozzle unit 610, which are opposed to each other in the X axis direction, are both configured to be the spindle shape with the Y axis direction as a major axis direction. And ratio of a length Zc of the top surface portion 620*d* in the Z axis direction (length in a minor axis direction of the spindle shape, part (*b*) of FIG. 20) to a thickness Zd at the bottom portion 601*b* of the pouch 601 (length in a minor axis direction of the spindle shape, part (*a*) of FIG. 17) is configured to be a value close to 1. Specifically, 0.8×Zc≤Zd≤1.2×Zc. By this, the cross-sectional shape of the pouch 601 over an entire area in the X axis direction becomes the spindle shape and the thickness Z thereof is maintained generally in a value close to Zc. Thus, a configuration, in which it is possible to fill a sufficient amount of the toner using the compact pouch and, at the same time, suppress the adverse effect caused when the thickness Z of the pouch 601 is excessively large, can be realized by the shape of the pouch which can be easily manufactured.

(4. Relationship 1 Between the Width Y and the Thickness Z of a Lower Half Portion of the Pouch)

The pouch 601 in the present Embodiment is configured, in addition to (2) and (3) above, so as to be Y≤2×Z in the range of 0≤X<0.5×Xmax (Y/Z≤2 in part (*a*) of FIG. 23).

In other words, in the lower half portion of the pouch 601 (portion on a nozzle unit 610 side from X=½×Xmax), the width Y of the pouch 601 is configured not to exceed twice the thickness Z. That is, in the lower half portion of the pouch 601, it is designed so that the cross-sectional shape of the pouch 601 in a plane perpendicular to the X axis direction is not excessively flat in the Y axis direction.

Since the pouch 601 in the present Embodiment is made of the flexible film material and has an external shape which is longitudinal in the X axis direction (first direction) and flat in the Y axis direction (second direction) as described in (2) above, it is required to ensure bending strength against external force in the Z axis direction (third direction). According to the configuration of Y≤2×Z in the range of 0≤X<0.5×Xmax, the cross-sectional shape of the pouch 601 does not become excessively flat in the lower half portion of the pouch 601 (thickness Z does not become excessively small relative to the width Y). By this, it becomes possible to ensure the bending strength of the pouch 601 in the Z axis direction and suppress inconveniences such as, for example, deteriorating workability in packaging and the like by an upper half portion of the pouch 601 bending to one side in the Z axis direction during the toner replenishment or bending easily during handling.

Incidentally, as shown in part (*a*) of FIG. 23, it is more preferable to configure the pouch 601 so as to be Y≤2×Z over the entire area of X (0≤X<Xmax). In addition, it is more preferable to configure the pouch 601 so as to be Y≤1.75×Z in the range of 0≤X<0.5×Xmax. By this, it becomes easier to ensure the bending strength of the pouch 601 in the Z axis direction.

(5. Product of the Width Y and the Thickness Z in the Lower Half Portion of the Pouch)

In addition, the pouch 601 in the present Embodiment is configured, in addition to (2) and (3) above, so as to be Y0×Z0≤Y×Z≤2.5×Y0×Z0 in the range of 0≤X<0.5×Xmax (1≤Y×Z/Y0×Z0≤2.5 in part (*b*) of FIG. 23). In other words, in the lower half portion of the pouch 601, a lower limit and an upper limit of a product Y×Z of a vertical length and a horizontal length in the cross section of the pouch 601 are set with reference to a product Y0×Z0 of a vertical length and a horizontal length in the cross section at the lower end portion of the pouch 601 (X=0).

Here, as described in (3) above, the thickness Z of the pouch 601 is set about the same as the thickness Z0 at X=0 over the entire area in the X axis direction. Thus, according to the relationship Y×Z≤2.5×Y0×Z0, in the lower half portion of the pouch 601, the width Y does not become extremely large relative to the thickness Z which is generally constant.

Since the pouch 601 in the present Embodiment is made of the flexible film material and has the external shape which is longitudinal in the X axis direction (first direction) and flat in the Y axis direction (second direction) as described in (2) above, it is required to ensure the bending strength against the external force in the Z axis direction (third direction). According to the configuration of Y×Z≤2.5×Y0×Z0 in the range of 0≤X<0.5×Xmax, in the lower half portion of the pouch 601, the cross-sectional shape of the pouch 601 does not become excessively flat (the thickness Z does not become excessively small relative to the width Y). By this, the bending strength of the pouch 601 in the Z direction can be ensured. In addition, by the configuration of Y0×Z0≤Y×Z in the range of 0≤X<0.5×Xmax, the cross-sectional area of the pouch 601 in the lower half portion becomes equal to or more than the cross sectional area at the lower end portion of the pouch 601 (X=0), therefore the volume of the pouch 601 is ensured.

Incidentally, as shown in part (*b*) of FIG. 23, it is more preferable to configure the pouch 601 so as to be Y0×Z0≤Y×Z≤2×Y0×Z0 over the entire area of X (0≤X<Xmax). By this, it becomes easier to ensure the bending strength of the pouch 601 in the Z axis direction.

(6. Relationship 2 Between the Width Y and the Thickness Z of the Lower Half Portion of the Pouch)

In addition, the pouch in the present Embodiment is configured, in addition to (2) and (3) above, so as to be Z≤0.9×Y in the range 0≤X<0.5×Xmax (Y/Z≥1.11 . . . in part (*a*) of FIG. 23). In other words, in the lower half portion of the pouch 601, the cross-sectional shape of the pouch 601 has a wide shape in the Y axis direction in which the thickness Z is 90% or less of the width Y.

The pouch 601 in the present Embodiment is made of the flexible film material, and is configured so that, upon the toner replenishment, the nozzle unit 610 of the pouch 601 is placed down and the user rubs the pouch 601 with hand to discharge the toner. In this case, by the cross-sectional shape in the lower half portion of the pouch 601 being longitudinal in the Y axis direction, it becomes easier for the user to discharge the toner from the pouch 601 by pinching and pushing the pouch with fingers from both sides in the Z axis direction.

(7. Relationship Between the Width Y of the Lower End Portion of the Pouch and the Width Yc of the Top Portion of the Nozzle)

In addition, the pouch 601 in the present Embodiment is configured, in addition to (2) and (3) above, so as to be $1 \leq Y0/Yc \leq 1.5$. Here, Yc is a width in the Y axis direction of the top surface portion 620*d* of the nozzle unit 610 (part (*b*) of FIG. 20).

In the present Embodiment, the pouch 601 having a flat cross-sectional shape in the Y axis direction (second direction) is used, and upon the toner replenishment, the nozzle unit 610 is placed down and the toner is discharged from the pouch 601. In such a configuration, if difference between the width Yc of the top surface portion 620*d* of the nozzle unit 610 (opposing surface of the discharging member) and the width Y0 of the lower end portion of the pouch 601 is large, the toner tends to remain in the lower end portion of the pouch 601 without being discharged. In contrast, in the present Embodiment, by configuring as $1 \leq Y0/Yc \leq 1.5$, it becomes possible to make the toner be not likely to remain in the lower end portion of the pouch 601 upon discharging the toner.

By the way, as shown in part (*a*) of FIG. 21, in the opening edges 601*a*1 of the side surface portion 601*a* of the pouch 601, welding margins (A5), in which the opening edges 601*a*1 are welded to each other outside the outer ring member 620, are provided (see also part (*b*) of FIG. 18 and part (*b*) of FIG. 20). In other words, the side surface portion 601*a* of the pouch 601 includes an extended area A5, in which the opening edges 601*a*1 are welded to each other, between an area A4 where the opening edges 601*a*1 are connected to the connecting surface 620*e* of the outer ring member 620 and the area A1 where the side surface portions 601*a* are welded to each other at the side edges in the Y axis direction. By setting the extended area A5, even if a peripheral length of the opening edge 601*a*1 varies more or less due to tolerance upon manufacturing of the pouch 601, the peripheral length of the opening edge 601*a*1 will not fall below a peripheral length of the connecting surface 620*e*, and therefore it becomes possible to fit the opening edges 601*a*1 externally to the connecting surface 620*e* easily. Thus, workability in integrating the pouch 601 (bag member) with the nozzle unit 610 (discharging member) is improved.

The area A4 is a first part in which the film material constituting the side surface portion 601*a* of the pouch 601 (bag member) is connected to the outer ring member 620 of the spindle shape. The extended area A5 is a second part in which the film materials are welded to each other from a major axis end of the outer ring member 620 toward outside of both sides in the second direction (Y axis direction). The area A1 is an area extending from an end portion of the second part in the second direction (Y axis direction) toward a side of the bottom portion 601*b* of the pouch 601 in the first direction (X axis direction), and is a third part in which both side edges of the film material in the second direction (Y axis direction) are welded to each other. Thus, the width Y0 of the pouch 601 at the lower end portion of the pouch 601 (X=0) is a sum of the width Yc of the top surface portion 620*d* (opposing surface of the discharging member) of the nozzle unit 610 and the lengths of the extended areas A5 (two of the second parts) on both sides in the Y axis direction.

In such a configuration, if the extended areas A5 are provided so as to be $1 \leq Y0/Yc \leq 1.5$, it becomes possible to realize a configuration where workability upon manufacturing is high and the toner is not likely to remain in the lower end portion of the pouch 601 upon discharging the toner.

Incidentally, in order for the toner to be less likely to remain in the pouch 601 upon discharging the toner, it is more preferable to be $1 \leq Y0/Yc \leq 1.3$.

In addition, in the present Embodiment, it has been described with assuming that the length Zc in the Z axis direction of the top surface portion 620*d* of the nozzle unit 610 (part (*b*) of FIG. 20) is the same as the thickness Z0 of the lower end portion of the pouch 601, however, in a case in which Z0 and Zc are different, it is preferable to be $1 \leq Z0/Zc \leq 1.5$. In addition, more preferably, $1 \leq Z0/Zc \leq 1.3$.

(8. Range of the Width Y and a Lower Limit of the Thickness Z)

In addition, the pouch 601 in the present Embodiment is configured, in addition to (2) and (3) above, so as to be $Y0 \leq Y \leq 2.5 \times Y0$ and $Z \geq 30$ (mm) in the range of $0 \leq X \leq X\max$ ($1 \leq Y/Y0 \leq 2.5$ in part (*b*) of FIGS. 23 and $Z \geq 30$ in part (*a*) of FIG. 23). In other words, in the entire area in the X axis direction, the width Y of the pouch 601 is within a range from 100% to 250% of the width Y0 at the lower end portion of the pouch 601, and a lower limit of the thickness Z of the pouch 601 is 30 mm.

As such, by setting a lower limit and an upper limit for the width Y of the pouch 601, and setting the lower limit for the thickness Z, it becomes possible to ensure the bending strength of the pouch 601 in the Z direction while ensuring the capacity of the pouch 601.

By comprising at least one of the configurations described in (4) through (8) above, a new form of the toner container can be provided.

(9. Geometrical Moment of Inertia of the Pouch)

In order to further clarify the preferred shape of the pouch 601, estimated results of geometrical moment of inertia of the cross-sectional shape of the pouch 601 by two different methods will be described. Part (*a*) of FIG. 24 illustrates a case in which the cross-sectional shape of the pouch 601 in a plane perpendicular to the X axis direction is approximated as an ellipse, whose major axis length is equal to the width Y and whose minor axis length is equal to the thickness Z. Part (*b*) of FIG. 24 illustrates a case in which the cross-sectional shape of the pouch 601 in the plane perpendicular to the X axis direction is approximated as a rhombus, whose length of a longer diagonal is equal to the width Y and whose length of a shorter diagonal is equal to the thickness Z. The geometrical moment of inertia referred here is geometrical moment of inertia with respect to an axis $\beta$ in the Y axis direction passing through a central position of the pouch 601 in the Z axis direction, and represents resistance to deformation of the pouch 601 against bending moment in the Z axis direction.

Part (*a*) and part (*b*) of FIG. 25 are views for describing relationship between the width Y and the thickness Z of pouch 601 and the geometrical moment of inertia. Part (*a*) of FIG. 25 is a graph showing the geometrical moment of inertia (mm^4) when the width Y and the thickness Z are varied while keeping an area thereof constant with respect to the ellipse in part (*a*) of FIG. 24. Part (*b*) of FIG. 25 is a graph showing the geometrical moment of inertia (mm^4) when the width Y and the thickness Z are varied while keeping an area thereof constant with respect to the rhombus of part (*b*) of FIG. 24. In part (*a*) and part (*b*) of FIG. 25, the area is assumed to be constant as the ellipse or the rhombus of the width Y0 and the thickness Z0 at the lower end portion of the pouch 601 (X=0).

As shown in part (*a*) and part (*b*) of FIG. 25, if the area is constant, the greater the thickness Z, the greater the geometrical moment of inertia of the pouch 601. Therefore, it can be seen that in order to ensure the bending strength in the Z axis direction, it is effective to ensure the thickness Z.

Incidentally, the geometrical moment of inertia of the pouch 601 in the case of being approximated as the ellipse (part (*a*) of FIG. 25) is greater than the geometrical moment of inertia of the pouch 601 in the case of being approximated as the rhombus (part (*b*) of FIG. 25). This is because, in the case of the cross-sectional shape of the spindle shape in the present Embodiment, as shown in part (*a*) of FIG. 24, the ellipse tends to have more area extending outside of an actual cross section of the pouch 601 and have larger geometrical moment of inertia than the actual one. In addition, as shown in part (*b*) of FIG. 24, the rhombus tends to have more area retreated inside the actual cross section of the pouch 601 and have smaller geometrical moment of inertia than the actual one.

Part (*a*) of FIG. 26 shows the geometrical moment of inertia (mm^4) and section modulus (mm^3) of the pouch 601 estimated by the approximation with the ellipse using the width Y and the thickness Z shown in part (*a*) of FIG. 23. Part (*b*) of FIG. 26 shows the geometrical moment of inertia (mm^4) and the section modulus (mm^3) of the pouch 601 estimated by the approximation with the rhombus using the width Y and the thickness Z shown in part (*a*) of FIG. 23.

Here, the section modulus is a value calculated by dividing the geometrical moment of inertia by a distance from the axis β to a farthest point from the axis β in the cross section (i.e., ½ of the thickness Z). There is relationship of $\sigma = m/z$ between section modulus z, bending moment m and bending stress degree σ, and if the bending stress degree o exceeds allowable stress degree of the film material constituting the pouch 601, then bending of the pouch 601 (buckling of the side surface portion 601*a*) occurs. Therefore, magnitude of the section modulus represents degree of resistance of the pouch 601 to maintain the shape thereof without being bent against the bending moment in the Z direction. Incidentally, both the geometrical moment of inertia and the section modulus represent strength against the bending moment, however, the geometrical moment of inertia differs from the section modulus in that the geometrical moment of inertia is used to evaluate easiness of being flexed against the bending moment.

In a case in which the cross-sectional shape and the cross-sectional area of the pouch 601 vary depending on a position in the X axis direction, it is preferable that the geometrical moment of inertia or the section modulus be maintained in a certain magnitude even if the cross-sectional area decreases in order to ensure the bending strength of the pouch 601 in the Z axis direction. Therefore, the shape of the pouch 601 in the present Embodiment will be examined in comparison to a reference example in which the cross-sectional area varies while maintaining similarity of the cross-sectional shape.

Broken lines in part (*a*) of FIG. 26 represent the geometrical moment of inertia and the section modulus in a case assuming that the cross-sectional area of the pouch 601 at each position in the X axis direction is equal to that of the ellipse of a solid line, and that the cross-sectional shape of the pouch 601 at each position in the X axis direction is similar to the ellipse at X=Xmax. Broken lines in part (*b*) of FIG. 26 represent the geometrical moment of inertia and the section modulus in a case assuming that the cross-sectional area of the pouch 601 at each position in the X axis direction is equal to that of the rhombus of a solid line, and that the cross-sectional shape of the pouch 601 at each position in the X axis direction is similar to the rhombus at X=Xmax. That is, the pouch in the reference example differs from the present Embodiment in that, while the reference example has a taper portion whose cross-sectional area decreases toward the nozzle unit 610 as in the present Embodiment, aspect ratio of the cross-sectional shape is constant.

In the reference example shown by the broken lines in part (*a*) and part (*b*) of FIG. 26, it can be seen that the geometrical moment of inertia and the section modulus decrease rapidly as X decreases in a range of X<Xa. In contrast, in a case of the present Embodiment shown by solid lines in part (*a*) and part (*b*) of FIG. 26, even though the geometrical moment of inertia and the section modulus decrease as X decreases in the range of X<Xa, slope is more gradual than that of the broken line.

This is because in a case in which the cross-sectional area of the pouch 601 decreases toward the nozzle unit 610, since the similarity of the cross-sectional shape is maintained in the reference example, the width Y and the thickness Z decrease in equal proportions to each other. In addition, this is also because, in the present Embodiment, when the cross-sectional area of the pouch 601 decreases toward the nozzle unit 610, decreasing rate of the thickness Z is small relative to decreasing rate of the width Y (see part (*a*) of FIG. 23). In calculation of the geometrical moment of inertia with respect to the bending moment in the Z axis direction, since effect of variation in the thickness Z is greater than effect of variation in the width Y, difference between the reference example and the present Embodiment in part (*a*) and part (*b*) of FIG. 26 arises.

For the above reasons, as the cross-sectional area of the pouch 601 decreases toward the nozzle unit 610, it is preferable that the decreasing rate of the thickness Z be small relative to the decreasing rate of the width Y (Y/Z approach 1 in response to decreasing of X). By this it becomes easier to ensure the bending strength of the pouch 601 near the nozzle unit 610 in the X axis direction.

In the configuration example of the present Embodiment, ratio of a minimum value of the cross-sectional area (cross-sectional area at X=0) to a maximum value of the cross-sectional area (cross-sectional area at X=Xa) of the pouch 601 is 54.7%. In this case, in the reference example in which the similarity of the cross-sectional shape is maintained, the minimum value of the geometrical moment of inertia of the cross section of the pouch 601 (value at X=0) is reduced to 29.9% of the maximum value of the geometrical moment of inertia (value at X=Xa). In contrast, in the configuration example of the present Embodiment, the minimum value of the geometrical moment of inertia of the cross section of the pouch 601 (value at X=0) is 40.6% of the maximum value of the geometrical moment of inertia (value at X=Xa). As such, it is preferable to configure the pouch 601 so that the minimum value of the geometrical moment of inertia of the cross section of the pouch 601 is 40% or more of the maximum value of the geometrical moment of inertia.

In addition, in the reference example in which the similarity of the cross-sectional shape is maintained, a minimum value of the section modulus of the cross section of the pouch 601 (value at X–0) is reduced to 40.4% of a maximum value of the section modulus (value at X=Xa). In contrast, in the configuration example of the present Embodiment, the minimum value of the section modulus of the cross section of the pouch 601 (value at X=0) is 47.1% of the maximum value of the section modulus (value at X=Xa). Thus, it is preferable to configure the pouch 601 so that the minimum value of the section modulus of the cross section of the pouch 601 is 47% or more of the maximum value of the section modulus.

Modified Example 1

The toner pack 600 described in the Embodiment 1 above is an example of a toner container, and the shape of the pouch 601 may be changed. Part (*a*) of FIG. 27 is a plane view, part (*b*) is a left side view, part (*c*) is a front view and part (*d*) is a bottom view of a toner pack 600A according to a Modified Example 1. In the present Modified Example, the height of the pouch 601 in the X axis direction (Xmax) is set lower than that of the Embodiment 1. And the capacity of the pouch 601 is set less than the capacity in the Embodiment 1 (200 cc). Other configurations are the same as in the Embodiment 1.

By this Modified Example also, it is possible to provide a new form of the toner container. In addition, the present Modified Example can provide a more compact toner container in a case in which less toner amount than the toner pack 600 of the Embodiment 1 described above is filled.

Modified Example 2

Part (*a*) of FIG. 28 is a plane view, part (*b*) is a left side view, part (*c*) is a front view, part (*d*) is a bottom view and part (*e*) is a perspective view of a toner pack 600B according to a Modified Example 2. The pouch 601 in the present Modified Example includes a second taper portion 601*s* in which the cross-sectional area of the pouch 601 decreases toward an end portion on the bottom portion 601*b* side in the X axis direction, other than the taper portion 601*t* as in the Embodiment 1 described above.

The second taper portion 601*s* is provided in a range of Xa≤X≤Xmax. In the second taper portion 601*s*, the thickness Z of the pouch 601 decreases toward the end portion on the bottom portion 601*b* side of the pouch 601 in the X axis direction. Thus, the thickness Zd of the pouch 601 at X=Xmax and a thickness of the bottom portion 601*b* is less than a maximum value of the thickness Z (Zmax). Incidentally, in the illustrated Modified Example, the width Y of the pouch 601 is constant in the range of Xa≤X≤Xmax, however, the shape may be configured as the width Y decreases together with the thickness Z. Other configurations are the same as in the Embodiment 1.

By this Modified Example also, it is possible to provide a new form of the toner container.

Embodiment 2

FIG. 29 is a schematic view for describing the toner pack 600 of an Embodiment 2. The toner pack 600 of the Embodiment 2 differs from the Embodiment 1 in that it includes a rough surface area 6010 formed on the side surface portion 601*a* of the pouch 601, and other configurations are the same as in the Embodiment 1. Thus, in the description below, the configuration different from that of the Embodiment 1 will be described, and with respect to a part common to the Embodiment 1, the same reference numeral will be used and description thereof will be omitted.

Part (*a*) of FIG. 29 is a left side view of the toner pack 600 and part (*b*) of FIG. 29 is a right side view of the toner pack 600. As shown in part (*a*) and part (*b*) of FIG. 29, the rough surface area 6010 (hatched portion in FIG. 29) is formed on the side surface portion 601*a* of the pouch 601 on both the left side and right side of the toner pack 600. The rough surface area 6010 is an area having a predetermined length in the X axis direction (first direction D1), and a surface thereof is roughened (matted).

The above rough surface area 6010 is formed, for example, by applying matte coating (matte printing), which creates microscopic irregularities on a surface, to a surface of the film constituting the pouch 601 by coating synthetic resin containing filler. Specifically, in the original sheets Sa1 and Sa2 in part (*a*) of FIG. 18 above, the above matte coating is applied to a surface which is to be an outside surface of the side surface portion 601*a* (hereinafter referred to as an outer surface or simply as a surface). Therefore, in the pouch 601 manufactured with the original sheets Sa1 and Sa2, the rough surface area 6010 is formed in an entire surface of the side surface portion 601*a*.

In this rough surface area 6010, surface roughness of the outer surface of the side surface portion 601*a* is set to 1.0 [μm] or more and 100.0 [μm] or less in arithmetic mean roughness Ra. In addition, when expressed in ten point average roughness Rz, the surface roughness is set to 15.0 [μm] or more and 250 [μm] or less.

Furthermore, it is more preferable that the surface roughness of the outer surface of the side surface portion 601*a* in the above rough surface area 6010 be set to 2.0 [μm] or more and 20.0 [μm] or less in the arithmetic mean roughness Ra. In addition, in the case of the ten point average roughness Rz, it is preferable that the surface roughness be set to 20.0 [μm] or more and 150 [μm] or less. Furthermore, it is more preferable that the surface roughness of the outer surface of the side surface portion 601*a* in the above rough surface area 6010 be set to 2.0 [μm] or more and 5.0 [μm] or less in the arithmetic mean roughness Ra. As an example of the surface roughness of the outer surface of the side surface portion 601*a* in the above rough surface area 6010 is, for example, set to 3.8 [μm] in the arithmetic mean roughness Ra.

The toner pack 600 accommodates powder toner as its contents. Therefore, even if the discharging opening 602*a* of the toner pack 600 is directed downward in the gravity direction, when relying only on gravity force, discharging performance of the toner in the pouch 601 is low compared to a case in which contents are liquid, etc. Thus, in a state in which the toner pack 600 is mounted to the mounting portion 500, the user needs to squeeze the side surface portion 601*a* of the pouch 601 with fingers from the bottom portion 601*b* side in the X axis direction (first direction D1) toward the nozzle unit 610 side to push out the toner inside.

In the present Embodiment, at least an area to which the squeezing operation (pushing-out operation of the toner) by the user is performed is configured to be the rough surface area 6010. Therefore, compare to a case in which the surface of the pouch 601 is a glossy surface having high smoothness, a contacting area between the pouch and fingers is smaller and slipperiness is better. And by the outer surface of the side surface portion 601*a* of the pouch 601, to which this squeezing operation is performed, being roughened (matted), it becomes possible to discharge the toner smoothly upon squeezing the side surface portion 601*a* of the pouch 601.

Hereinafter, relationship between the slipperiness of the fingers and the surface roughness of the outer surface of the side surface portion 601*a* of the pouch 601 will be described. Table 1 shows results of sensory evaluation with respect to finger slipperiness conducted by the inventor. As shown in Table 1, when the arithmetic mean roughness Ra of the rough surface area 6010 is lower than 1.0 [μm], the finger slipperiness is reduced. This is because, as described above, in a case of the glossy surface having the arithmetic mean roughness Ra less than 1.0 [μm], the contacting area with the fingers becomes greater, and by this, resistance to the fingers upon the squeezing operation becomes greater.

TABLE 1

| | Ra | | | | | | | |
|---|---|---|---|---|---|---|---|---|
| | Less than 1μ | 1μ | 20μ | 30μ | 50μ | 70μ | 100μ | Over 100μ |
| slipperiness | C | A | A | A | A | A | A | C |
| Scratches | B | B | A | A | A | A | A | A |
| Fingerprint stain | B | B | B | A | A | A | A | A |

Incidentally, symbols A, B and C in Table 1 above indicate A: Excellent, B: Good and C: OK, respectively. That is, in Table 1, B has better evaluation result in the sensory evaluation than C, and A has better evaluation result in the sensory evaluation than B (A>B>C).

In addition, in a range of the arithmetic mean roughness Ra from 1.0 [μm] to 100 [μm] for the rough surface area 6010, the finger slipperiness is good. This is because, by the outer surface of the side surface portion 601*a* of the pouch 601 being roughened, the above contacting area with the fingers decreases and the resistance to the fingers upon the squeezing operation is reduced.

Table 2 shows results of experiment verifying the slipperiness of the fingers on cases in which the surface of the pouch is the glossy surface and the matte surface. In the experiment, first, two types, which is the same film forming the above pouch 601, and whose surfaces are the glossy surface and the matte surface, are prepared. Next, a weight made of nitrile rubber which resembles a human hand is placed on each film. Then, a placing plate on which the film is placed is gradually tilted, and coefficient of static friction is calculated based on a tilted angle at which the weight made of nitrile rubber begins to slip (hereinafter referred to as a friction angle). In the results of this experiment also, the friction angle (or the coefficient of static friction) is higher on the case of the glossy surface with the surface roughness of Ra=0.5 than on the case of the matte surface of Ra=3.8, therefore it can be seen that, by the surface of the film being roughened (matted), the finger slipperiness is improved.

TABLE 2

| | Surface roughness | | Friction angle | n3 average Coefficient of |
|---|---|---|---|---|
| | Rz [μm] | Ra [μm] | Friction Angle [°] | static friction |
| Glossy | 13.2 | 0.5 | 53.5 | 1.35 |
| Matte | 28.5 | 3.8 | 45.2 | 1 |

Incidentally, in the experiment with respect to Table 2 above, the surface roughness is measured by observing the surface of the film with a laser microscope VK-X200 manufactured by Keyence at 20×lens magnification. In addition, the surface roughness described in this application is a value of roughness measured by observing the surface with the above laser microscope VK-X200 manufactured by Keyence. Incidentally, in the present Embodiment, the coefficient of static friction of the rough surface area 6010 described above is between 0.5 or more and 1.2 or less.

On the other hand, when the arithmetic mean roughness Ra of the rough surface area 6010 becomes rougher than 100 [μm], in turn, the resistance due to this roughness of the surface becomes great, and the finger slipperiness deteriorates.

In the present Embodiment, the arithmetic mean roughness Ra of the rough surface area 6010 is set in the range of 1.0 [μm] to 100.0 [μm], more preferably in the range of 2.0 [μm] to 20.0 [μm], in which the above finger slipperiness is high. Therefore, it becomes possible to push out and discharge smoothly the powder toner inside the pouch 601 in toner pack 600, where all contents are required to be discharged as smoothly as possible at once, unlike a toothpaste tube, etc., where contents are taken out little by little. In particular, in the range of 2.0 [μm] to 20.0 [μm] in the arithmetic mean roughness Ra, the finger slipperiness is better and the toner can be pushed out well.

In addition, since the toner accommodated in the toner pack 600 is powder, the toner may aggregate in the pouch 601. Therefore, upon using the toner pack 600, the user shakes the toner pack 600 well to loosen the toner before use. However, if the user does not loosen the toner enough, even if the toner is somewhat loosened, some toner may remain aggregated inside the toner pack 600. Even in such a case, if the arithmetic mean roughness Ra of the above rough surface area 6010 is in the range of 1.0 [μm] to 100.0 [μm], the aggregated toner can be loosened and pushed out upon squeezing the side surface portion 601*a* of the pouch 601.

Furthermore, by providing the rough surface area 6010 on the side surface portion 601*a* of the pouch 601, it becomes possible to make scratches on the toner pack 600 less noticeable. Here, as shown in Table 1, effect begins to be particularly high at the arithmetic mean roughness Ra of about 3 [μm], and in a case at 20 [μm] or more, the effect of making the scratches on the toner pack 600 less noticeable is significantly high.

In addition, by providing the rough surface area 6010 on the side surface portion 601*a* of the pouch 601, it becomes possible to prevent sticking of fingerprints to the toner pack 600. Here, as shown in Table 1, when the arithmetic mean roughness Ra is 30 [μm] or more, effect of preventing the sticking of the fingerprints to the toner pack 600 becomes particularly high.

Next, relationship between the rough surface area 6010 and a two-dimensional code 6011 will be described. As shown in part (*b*) of FIG. 29, the two-dimensional code 6011 is provided in the rough surface area 6010 on one side (right side surface) of the toner pack 600. More specifically, this two-dimensional code 6011 is a QR code. Thus, by forming the two-dimensional code 6011 on the rough surface area 6010, which is a matte surface, reflection of light on the surface of the pouch 601 is suppressed, and it becomes possible to improve readability of the two-dimensional code 6011.

Modified Example 3

Incidentally, in the Embodiment 2, the matte coating is applied to the surface of the original sheets Sa1 and Sa2 to form the rough surface area 6010. However, for example, the matte coating may be applied to the outside surface of the side surface portion 601*a* of the pouch 601 to form the rough surface area 6010 after the pouch 601 is formed into the bag shape. In this case, first, for example, ink made of synthetic resin containing filler is prepared. Then, the ink made of the synthetic resin containing the filler is applied to a transfer mold (transfer roller). Then, the ink made of the synthetic resin containing the filler is transferred to the surface of the pouch 601 to form the rough surface area 6010.

Incidentally, in this case, it is not necessary to form the rough surface area 6010 on an entire outside surface of the side surface portion 601*a* of the pouch 601. That is, as shown in part (*a*) and part (*b*) of FIG. 30, the sealing area A1 of the side surface portion 601*a* of the pouch 601 is not an area where the squeezing operation (pushing-out operation of the toner) by the user as described above is performed. Therefore, the matte coating may not be applied to the sealing area A1, and the rough surface area 6010 may be formed only for an area where this squeezing operation is performed. In the Embodiment 2 described above, the matte coating is applied using an ink made of synthetic resin containing filler, however, a method of the matte coating is not limited thereto. For example, shrinking printing using UV ink is one method of the matte coating.

In addition, when the above sealing area A1 in the side edges is heat-sealed, a fibrous sheet with high releasing property is placed between the surfaces of the original sheets Sa1 and Sa2 and a forming die (heating roll) of the pouch manufacturing device. Therefore, to the surface of the sealing area A1, a surface shape of the releasing sheet may be transferred during the sealing. Thus, the surface roughness of the sealing area A1 may be rougher than the area where the squeezing operation is performed inside an area bounded by the bottom portion 601*b* of the pouch 601, the sealing area A1 and a connecting portion 6012 to the nozzle unit 610 of the pouch 601 (hatched area in FIG. 30). However, as described above, normally, the sealing area A1 is not the area where the squeezing operation is performed by the user. Therefore, it is preferable that the surface roughness be within the range described above, but it may be higher.

Furthermore, the rough surface area 6010 need not be formed as one large area, but may be formed, for example, by a plurality of small areas aligned in the X axis direction at predetermined intervals in the area where the above squeezing operation is performed.

Furthermore, in the Embodiment 2, an example in which the rough surface area 6010 is formed by the matte coating is described, however, for example, the rough surface area 6010 may be formed by roughing the surface of the film forming the pouch 601 by sandblasting. In addition, the rough surface area 6010 may also be formed by molding a film forming the pouch 601 in a manner that mat material is kneaded into the film in advance. Furthermore, the rough surface area 6010 may also be formed by transferring an embossed mold surface pattern to the outer surface of the side surface portion 601*a* of the pouch 601. In addition, the rough surface area 6010 may also be formed by attaching a seal, etc., of which a surface is rough, to the outer surface of the side surface portion 601*a* of the pouch 601. Furthermore, the shape of the pouch 601 can be any shape as long as the shape is a bag shape which can accommodate the toner and, for example, it can be a shape without the gusset on the bottom portion.

Other Embodiments

In the Embodiments and the Modified Examples described above, the configuration in which the pack side shutter 603 and the apparatus side shutter 509 are opened by operating the lever 508 on the main body side after the toner pack 600 is mounted to the mounting portion 500 of the printer main body 100 is described. However, the connecting method between the toner container and the replenishing opening of the image forming apparatus is not limited thereto. For example, it may be configured that the discharging opening 602*a* of the nozzle 602 and the replenishing opening 32*a* of the printer main body 100 is communicated with each other by the user gripping and rotating the pouch 601 with respect to the printer main body 100 after the toner pack 600 is mounted to the mounting portion 500. In addition, for example, it may be configured that the discharging opening of the toner container may be exposed by the user removing a cap or a seal of the toner container. Furthermore, the present invention according to the Embodiments described above may be combined in any manner.

The present invention summarizes the following constitution examples.

(Constitution 1)

A toner container mounted to and demounted from an image forming apparatus comprising:

- a bag member made of flexible film material, the bag member including a side surface portion configured to form an accommodating space for accommodating toner inside thereof and extend in a first direction and a bottom portion configured to close the accommodating space from one side in the first direction; and
- a discharging member connected to the bag member and configured to discharge the toner from the accommodating space to an outside, the discharging member including an opposing surface configured to close the accommodating space from the other side in the first direction and opposed to the bottom portion, a receiving opening provided in the opposing surface and configured to receive the toner inside the accommodating space, and a discharging opening communicating with the receiving opening and configured to discharge the toner received via the receiving opening,
- wherein when directions perpendicular to the first direction respectively and perpendicular to each other are defined as a second direction and a third direction,
- a length from the opposing surface to an end portion in an opposite side of the opposing surface of the bag member in the first direction is defined as Xmax, and
- in a case in which a position X ($0\leq X=Xmax$) using the opposing surface as a reference in the first direction is given, a length of the bag member on a plane perpendicular to the first direction in the second direction is defined as Y and a length of the bag member on the plane in the third direction is defined as Z,
- in a case in which Z is Z0 in $X=0$, $Xmax>Y\geq Z$ in a range of $0\leq X\leq Xmax$, $0.8\times Z0\leq Z\leq 1.2\times Z0$ in the range of $0\leq X=Xmax$, and $Y\leq 2\times Z$ in a range of $0\leq X<0.5\times Xmax$.

(Constitution 2)

A toner container according to Constitution 1, wherein in a case in which Y is Y0 in $X=0$, $Y0\times Z0\leq Y\times Z\leq 2.5\times Y0\times Z0$ in a range of $0\leq X<0.5\times Xmax$.

(Constitution 3)

A toner container mounted to and demounted from an image forming apparatus comprising:

- a bag member made of flexible film material, the bag member including a side surface portion configured to form an accommodating space for accommodating toner inside thereof and extend in a first direction and a bottom portion configured to close the accommodating space from one side in the first direction; and
- a discharging member connected to the bag member and configured to discharge the toner from the accommodating space to an outside, the discharging member including an opposing surface configured to close the accommodating space from the other side in the first direction and opposed to the bottom portion, a receiving opening provided in the opposing surface and configured to receive the toner inside the accommodating space, and a discharging opening communicating with the receiving opening and configured to discharge the toner received via the receiving opening, wherein when directions perpendicular to the first direction respectively and perpendicular to each other are defined as a second direction and a third direction, a length from the opposing surface to an end portion in an opposite side of the opposing surface of the bag member in the first direction is defined as Xmax, and in a case in which a position X ($0 \le X \le Xmax$) using the opposing surface as a reference in the first direction is given, a length of the bag member on a plane perpendicular to the first direction in the second direction is defined as Y and a length of the bag member on the plane in the third direction is defined as Z, in a case in which Y and Z are Y0 and Z0 in X=0, respectively, $Xmax > Y \ge Z$ in a range of $0 \le X \le Xmax$, $0.8 \times Z0 \le Z \le 1.2 \times Z0$ in the range of $0 \le X \le Xmax$, and $Y0 \times Z0 \le Y \times Z \le 2.5 \times Y0 \times Z0$ in a range of $0 \le X < 0.5 \times Xmax$.

(Constitution 4)

A toner container according to any one of Constitutions 1 to 3, wherein $Z \le 0.9Y$ in the range of $0 \le X < 0.5 \times Xmax$.

(Constitution 5)

A toner container mounted to and demounted from an image forming apparatus comprising:

a bag member made of flexible film material, the bag member including a side surface portion configured to form an accommodating space for accommodating toner inside thereof and extend in a first direction and a bottom portion configured to close the accommodating space from one side in the first direction; and a discharging member connected to the bag member and configured to discharge the toner from the accommodating space to an outside, the discharging member including an opposing surface configured to close the accommodating space from the other side in the first direction and opposed to the bottom portion, a receiving opening provided in the opposing surface and configured to receive the toner inside the accommodating space, and a discharging opening communicating with the receiving opening and configured to discharge the toner received via the receiving opening, wherein when directions perpendicular to the first direction respectively and perpendicular to each other are defined as a second direction and a third direction, a length from the opposing surface to an end portion in an opposite side of the opposing surface of the bag member in the first direction is defined as Xmax, and in a case in which a position X ($0 \le X \le Xmax$) using the opposing surface as a reference in the first direction is given, a length of the bag member on a plane perpendicular to the first direction in the second direction is defined as Y and a length of the bag member on the plane in the third direction is defined as Z, in a case in which Z is Z0 in X=0, $Xmax > Y \ge Z$ in a range of $0 \le X \le Xmax$, $0.8 \times Z0 \le Z \le 1.2 \times Z0$ in the range of $0 \le X \le Xmax$, and $Z \le 0.9Y$ in a range of $0 \le X < 0.5 \times Xmax$.

(Constitution 6)

A toner container according to any one of Constitutions 1 to 5, wherein in a case in which Y is Y0 in X=0 and a length of the opposing surface in the second direction is Yc, $1 \le Y0/Yc \le 1.5$.

(Constitution 7)

A toner container mounted to and demounted from an image forming apparatus comprising:

a bag member made of flexible film material, the bag member including a side surface portion configured to form an accommodating space for accommodating toner inside thereof and extend in a first direction and a bottom portion configured to close the accommodating space from one side in the first direction; and a discharging member connected to the bag member and configured to discharge the toner from the accommodating space to an outside, the discharging member including an opposing surface configured to close the accommodating space from the other side in the first direction and opposed to the bottom portion, a receiving opening provided in the opposing surface and configured to receive the toner inside the accommodating space, and a discharging opening communicating with the receiving opening and configured to discharge the toner received via the receiving opening, wherein when directions perpendicular to the first direction respectively and perpendicular to each other are defined as a second direction and a third direction, a length from the opposing surface to an end portion in an opposite side of the opposing surface of the bag member in the first direction is defined as Xmax, and in a case in which a position X ($0 \le X \le Xmax$) using the opposing surface as a reference in the first direction is given, a length of the bag member on a plane perpendicular to the first direction in the second direction is defined as Y and a length of the bag member on the plane in the third direction is defined as Z, in a case in which Y is Y0 in X=0 and a length of the opposing surface in the second direction is Yc, $Xmax > Y \ge Z$ in a range of $0 \le X \le Xmax$, $0.8 \times Z0 \le Z \le 1.2 \times Z0$ in the range of $0 \le X \le Xmax$, and $1 \le Y0/Yc \le 1.5$.

(Constitution 8)

A toner container according to any one of Constitutions 1 to 7, wherein in a case in which Y is Y0 in X=0, $Y0 \le Y \le 2.5 \times Y0$ and $Z \ge 30$ (mm) in the range of $0 \le X \le Xmax$.

(Constitution 9)

A toner container mounted to and demounted from an image forming apparatus comprising:

a bag member made of flexible film material, the bag member including a side surface portion configured to form an accommodating space for accommodating toner inside thereof and extend in a first direction and a bottom portion configured to close the accommodating space from one side in the first direction; and a discharging member connected to the bag member and configured to discharge the toner from the accommodating space to an outside, the discharging member including an opposing surface configured to close the accommodating space from the other side in the first direction and opposed to the bottom portion, a receiving opening provided in the opposing surface and configured to receive the toner inside the accommodating space, and a discharging opening communicating with the receiving opening and configured to discharge the toner received via the receiving opening, wherein when directions perpendicular to the first direction respectively and perpendicular to each other are defined as a second direction and a third direction, a length from the opposing surface to an end portion in an opposite side of the opposing surface of the bag member in the first direction is defined as Xmax, and in a case in which a position X ($0 \le X \le X_{max}$) using the opposing surface as a reference in the first direction is given, a length of the bag member on a plane perpendicular to the first direction in the second direction is defined as Y and a length of the bag member on the plane in the third direction is defined as Z, in a case in which Y is $Y0$ in X=0, $X_{max} > Y \ge Z$ in a range of $0 \le X \le X_{max}$, $0.8 \times Z0 \le Z \le 1.2 \times Z0$ in the range of $0 \le X \le X_{max}$, and $Y0 \le Y \le 2.5 \times Y0$ and $Z \ge 30$ (mm) in the range of $0 \le X \le X_{max}$.

(Constitution 10)

A toner container according to any one of Constitutions 1 to 9, wherein the bag member includes a taper portion formed so as to decrease a cross sectional area of the bag member in a cross section perpendicular to the first direction toward the opposing surface of the discharging member in the first direction.

(Constitution 11)

A toner container according to Constitution 10, wherein a rate of decrease of Z in the taper portion toward a side of the discharging member in the first direction is smaller than a rate of decrease of Y in the taper portion toward the side of the discharging member in the first direction.

(Constitution 12)

A toner container according to Constitution 10 or 11, wherein a minimum value of geometrical moment of inertia in the cross section of the bag member and the accommodating space on the plane perpendicular to the first direction is 40% or more of a maximum value of the geometrical moment of inertia.

(Constitution 13)

A toner container according to any one of Constitutions 10 to 12, wherein a minimum value of section modulus in the cross section of the bag member and the accommodating space on the plane perpendicular to the first direction is 47% or more of a maximum value of the section modulus.

(Constitution 14)

A toner container according to any one of Constitutions 1 to 13, wherein the side surface portion is made of two film materials welded each other in side edges in both sides in the second direction, and wherein the bottom portion is made of one film material disposed between the two film materials and welded to each of the two films.

(Constitution 15)

A toner container according to Constitution 14, wherein each of the opposing surface of the discharge member and the bottom portion of the bag member is a spindle shape having a major axis in the second direction as viewed in the first direction.

(Constitution 16)

A toner container according to Constitution 15, wherein when a length of the opposing surface of the discharging member in the second direction is defined as Zc and a length of the bottom portion of the bag member in the second direction is defined as Zd, $$0.8 \times Zc < Zd < 1.2 \times Zc.$$

(Constitution 17)

A toner container according to any one of Constitutions 14 to 16, wherein the discharging member includes a connecting portion to which an opening edge of the other side of the bag member in the first direction is connected, wherein the connecting portion extends in the first direction from a peripheral edge of the opposing surface to the other side in the first direction, wherein the side surface portion of the bag member includes a first part in which each of the two film materials is connected to the connecting portion and two second parts in which the two film materials are welded each other over a range from both end portions of the connecting portion in the second direction to the side edges, and wherein when a length of the opposing surface in the second direction is defined as Yc, $Y0$ is a sum of Yc and a length of the two second parts in the second direction and $1 \le Y0/Yc \le 1.5$.

(Constitution 18)

A toner container according to Constitution 17, wherein $Y0/Yc \le 1.3$.

(Constitution 19)

A toner container according to any one of Constitutions 1 to 18, wherein the discharging member includes a rotatable shutter between a position covering the discharging opening and a position exposing the discharging opening about an axis in the first direction, and a flange portion disposed between the discharging opening and the bag member in the first direction and expanding to an outside of an outer surface of the shutter in a radial direction with respect to the axis, and the flange portion includes a straight portion formed in a linear shape in the second direction at a position away from the axis in the third direction.

(Constitution 20)

An image forming system comprising:

a toner container according to any one of Constitutions 1 to 19; and an image forming apparatus including a replenishing opening capable of exposing to the outside, which the toner container is mounted to and demounted from and configured to form an image on a recording material using toner replenished from the toner container via the replenishing opening.

(Constitution 21)

A toner container comprising:

a flexible bag member configured to form an accommodating space for accommodating powder toner inside thereof; and a discharging member connected to an opening side of the bag member and configured to discharge the toner in the accommodating space to an outside, wherein the bag member is provided with a side surface portion extending along a first direction connecting the opening side and a bottom portion side opposite to the opening side, wherein an outer surface of the side surface portion includes a rough surface area having a predetermined length in the first direction, and wherein an arithmetic mean roughness Ra of the rough surface area is 1.0 [μm] or more and 100.0 [μm] or less.

(Constitution 22)

A toner container according to Constitution 21, wherein the arithmetic mean roughness Ra of the rough surface area is 2.0 [μm] or more.

(Constitution 23)

A toner container according to Constitution 21 or 22, wherein the arithmetic mean roughness Ra of the rough surface area is 20.0 [μm] or less.

(Constitution 24)

A toner container according to any one of Constitutions 21 to 23, wherein the bag member is formed by a flexible film of which thickness is 25 [μm] or more and 300 [μm] or less.

(Constitution 25)

A toner container according to any one of Constitutions 21 to 24, wherein the rough surface area is provided with a two-dimensional code.

(Constitution 26)

A toner container according to any one of Constitutions 21 to 25, wherein a coefficient of static friction of the rough surface area is 0.5 or more and 1.2 or less.

(Constitution 27)

A toner container according to any one of Constitutions 21 to 26, wherein the discharging member is provided with an opposing surface opposite to the bottom portion side, a receiving opening provided in the opposing surface and configured to receive the toner inside the accommodating space, and a discharging opening communicating with the receiving opening and configured to discharge the toner received via the receiving opening, wherein when directions perpendicular to the first direction respectively and perpendicular to each other are defined as a second direction and a third direction, a length from the opposing surface to an end portion in an opposite side of the opposing surface of the bag member in the first direction is defined as Xmax, and in a case in which a position X ($0 \leq X \leq Xmax$) using the opposing surface as a reference in the first direction is given, a length of the bag member on a plane perpendicular to the first direction in the second direction is defined as Y and a length of the bag member on the plane in the third direction is defined as Z, in a case in which Y is Y0 in X=0, $Xmax > Y \geq Z$ in a range of $0 \leq X \leq Xmax$, and $Y \leq 2 \times Z$ in a range of $0 \leq 0.5 \times Xmax$.

(Constitution 28)

A toner container according to any one of Constitutions 21 to 27, wherein a particle diameter of the toner is 2 [μm] or more and 15 [μm] or less.

(Constitution 29)

A toner container according to any one of Constitutions 21 to 27, wherein an angle of repose of the toner is 50° or more and 80° or less.

(Constitution 30)

An image forming system comprising:

a toner container according to any one of Constitutions 21 to 29; and an image forming apparatus including a replenishing opening capable of exposing to the outside, which the toner container is mounted to and demounted from and configured to form an image on a recording material using toner replenished from the toner container via the replenishing opening.

Industrial Applicability

According to the present invention, there is provided a toner container which is mountable to an image forming apparatus and an image forming system.

The present invention is not limited to the Embodiments described above, and various changes and variations are possible without departing from the spirit and the scope of the present invention. Accordingly, the following claims are appended to make public the scope of the present invention.

This application claims priority based on Japanese Patent Application No. 2021-197505 filed on Dec. 6, 2021, and Japanese Patent Application No. 2021-204531 filed on Dec. 16, 2021, all of which are hereby incorporated herein by reference.

The invention claimed is:

1. A toner container mountable to and demountable from an image forming apparatus, the toner container comprising:

a bag member made of flexible film material, the bag member including (i) a side surface portion configured to form an accommodating space for accommodating toner inside thereof and extending in a first direction and (ii) a bottom portion configured to close the accommodating space from a first side in the first direction; and a discharging member connected to the bag member and configured to discharge the toner from the accommodating space to outside of the toner container, the discharging member including (i) an opposing surface configured to close the accommodating space from a second side of the bag member in the first direction and opposed to the bottom portion, (ii) a receiving opening provided in the opposing surface and configured to receive the toner inside the accommodating space, and (iii) a discharging opening communicating with the receiving opening and configured to discharge the toner received via the receiving opening, wherein, when directions perpendicular to the first direction and perpendicular to each other are defined as a second direction and a third direction, a length from the opposing surface to an end in an opposite side of the opposing surface of the bag member in the first direction is defined as Xmax, in a case in which a position X, where $0 \leq X \leq Xmax$, using the opposing surface as a reference in the first direction is given, a length of the bag member on a plane perpendicular to the first direction in the second direction is defined as Y, and a length of the bag member on the plane in the third direction is defined as Z, and in a case in which Z is ZO in X=0, then:

$$Xmax > Y \geqq Z \text{ in a range of } 0 \leqq X \leqq Xmax,$$

$$0.8 \times Z0 \leqq Z \leqq 1.2 \times Z0 \text{ in the range of } 0 \leqq X \leqq Xmax, \text{ and}$$

$$Y \leqq 2 \times Z \text{ in a range of } 0 \leqq X < 0.5 \times Xmax.$$

2. A toner container according to claim 1, wherein in a case in which Y is YO in X=0, $YO \times ZO \leq Y \times Z \leq 2.5 \times Y0 \times ZO$ in a range of $0 \leq X < 0.5 \times Xmax$.

3. A toner container according to claim 1, wherein $Z \leq 0.9Y$ in the range of $0 \leq X < 0.5 \times Xmax$.

4. A toner container according to claim 1, wherein, in a case in which Y is YO in X=0 and a length of the opposing surface in the second direction is Yc, then $1 \leq YO/Yc \leq 1.5$.

5. A toner container according to claim 1, wherein, in a case in which Y is YO in X=0, $YO \leq Y \leq 2.5 \times Y0$ and Z=30 mm in the range of $0 \leq X \leq Xmax$.

6. A toner container according to claim 1, wherein the bag member includes a taper portion formed so as to decrease a cross sectional area of the bag member in a cross-section perpendicular to the first direction toward the opposing surface of the discharging member in the first direction.

7. A toner container according to claim 6, wherein a rate of decrease of Z in the taper portion toward a side of the discharging member in the first direction is less than a rate of decrease of Y in the taper portion toward the side of the discharging member in the first direction.

8. A toner container according to claim 6, wherein a minimum value of a geometrical moment of inertia in the cross section of the bag member and the accommodating space on the plane perpendicular to the first direction is 40% or more of a maximum value of the geometrical moment of inertia.

9. A toner container according to claim 6, wherein a minimum value of section modulus in the cross section of the bag member and the accommodating space on the plane perpendicular to the first direction is 47% or more of a maximum value of the section modulus.

10. A toner container according to claim 1, wherein the side surface portion is made of two film materials welded to each other in side edges at both sides in the second direction, and wherein the bottom portion is made of one film material disposed between the two film materials and welded to each of the two films.

11. A toner container according to claim 10, wherein each of the opposing surfaces of the discharge member and the bottom portion of the bag member is a spindle shape having a major axis in the second direction as viewed in the first direction.

12. A toner container according to claim 11, wherein, when a length of the opposing surface of the discharging member in the second direction is defined as Zc and a length of the bottom portion of the bag member in the second direction is defined as Zd, then $0.8 \times Zc < Zd < 1.2 \times Zc$.

13. A toner container according to claim 10, wherein the discharging member includes a connecting portion to which an opening edge of the second side of the bag member in the first direction is connected, wherein the connecting portion extends in the first direction from a peripheral edge of the opposing surface to the second side of the bag member in the first direction, wherein the side surface portion of the bag member includes a first part in which each of the two film materials are connected to the connecting portion and two second parts in which the two film materials are welded each other over a range from both end portions of the connecting portion in the second direction to the side edges, and wherein, when a length of the opposing surface in the second direction is defined as Yc, YO is a sum of Yc and a length of the two second parts in the second direction, then $1 \leq YO/Yc \leq 1.5$.

14. A toner container according to claim 13, wherein $YO/Yc \leq 1.3$.

15. A toner container according to claim 1, wherein the discharging member includes a rotatable shutter that is rotatable about an axis in the first direction between a position covering the discharging opening and a position exposing the discharging opening, and a flange portion disposed between the discharging opening and the bag member in the first direction and expanding to outside of an outer surface of the shutter in a radial direction with respect to the axis, and wherein the flange portion includes a straight portion formed in a linear shape in the second direction at a position away from the axis in the third direction.

16. An image forming system comprising:

a toner container according to claim 1; and an image forming apparatus including a replenishing opening capable of being exposed to outside of the image forming apparatus, wherein the toner container is mounted to and demounted from the image forming apparatus via the replenishing opening, and wherein the image forming system is configured to form an image on a recording material using toner provided from the toner container via the replenishing opening.

17. A toner container mountable to and demountable from an image forming apparatus, the toner container comprising:

a bag member made of flexible film material, the bag member including (i) a side surface portion configured to form an accommodating space for accommodating toner inside thereof and extending in a first direction and (ii) a bottom portion configured to close the accommodating space from a first side in the first direction; and a discharging member connected to the bag member and configured to discharge the toner from the accommodating space to outside of the toner container, the discharging member including (i) an opposing surface configured to close the accommodating space from a second side of the bag member in the first direction and opposed to the bottom portion, a receiving opening provided in the opposing surface and configured to receive the toner inside the accommodating space, and (iii) a discharging opening communicating with the receiving opening and configured to discharge the toner received via the receiving opening, wherein, when directions perpendicular to the first direction and perpendicular to each other are defined as a second direction and a third direction, a length from the opposing surface to an end in an opposite side of the opposing surface of the bag member in the first direction is defined as Xmax, in a case in which a position X, where $0 \leq X \leq Xmax$, using the opposing surface as a reference in the first direction is given, a length of the bag member on a plane perpendicular to the first direction in the second direction is defined as Y and a length of the bag member on the plane in the third direction is defined as Z, and in a case in which Y and Z are YO and ZO in X=0, then:

$$X\text{max} > Y \geqq Z \text{ in a range of } 0 \leqq X \leqq X\text{max},$$

$$0.8 \times Z0 \leqq Z \leqq 1.2 \times Z0 \text{ in the range of } 0 \leqq X \leqq X\text{max, and}$$

$$Y0 \times Z0 \leqq Y \times Z \leqq 2.5 \times Y0 \times Z0 \text{ in a range of } 0 \leqq X < 0.5 \times X\text{max}.$$

18. A toner container mountable to and demountable from an image forming apparatus, the toner container comprising:

a bag member made of flexible film material, the bag member including (i) a side surface portion configured to form an accommodating space for accommodating toner inside thereof and extending in a first direction and (ii) a bottom portion configured to close the accommodating space from a first side in the first direction; and a discharging member connected to the bag member and configured to discharge the toner from the accommodating space to outside of the toner container, the discharging member including (i) an opposing surface configured to close the accommodating space from a second side of the bag member in the first direction and opposed to the bottom portion, a receiving opening provided in the opposing surface and configured to receive the toner inside the accommodating space, and (iii) a discharging opening communicating with the receiving opening and configured to discharge the toner received via the receiving opening, wherein, when directions perpendicular to the first direction and perpendicular to each other are defined as a second direction and a third direction, a length from the opposing surface to an end in an opposite side of the opposing surface of the bag member in the first direction is defined as Xmax, and in a case in which a position X, where 0≤X≤Xmax, using the opposing surface as a reference in the first direction is given, a length of the bag member on a plane perpendicular to the first direction in the second direction is defined as Y and a length of the bag member on the plane in the third direction is defined as Z, and in a case in which Z is ZO in X=0, then:

$$X\max > Y \geqq Z \text{ in a range of } 0 \leqq X \leqq X\max,$$

$$0.8 \times Z0 \leqq Z \leqq 1.2 \times Z0 \text{ in the range of } 0 \leqq X \leqq X\max, \text{ and}$$

$$Z \leqq 0.9 \times Y \text{ in a range of } 0 \leqq X < 0.5 \times X\max.$$

19. A toner container mountable to and demountable from an image forming apparatus, the toner container comprising:

a bag member made of flexible film material, the bag member including (i) a side surface portion configured to form an accommodating space for accommodating toner inside thereof and extending in a first direction and (ii) a bottom portion configured to close the accommodating space from a first side in the first direction; and a discharging member connected to the bag member and configured to discharge the toner from the accommodating space to outside of the toner container, the discharging member including (i) an opposing surface configured to close the accommodating space from a second side of the bag member in the first direction and opposed to the bottom portion, a receiving opening provided in the opposing surface and configured to receive the toner inside the accommodating space, and (iii) a discharging opening communicating with the receiving opening and configured to discharge the toner received via the receiving opening, wherein, when directions perpendicular to the first direction and perpendicular to each other are defined as a second direction and a third direction, a length from the opposing surface to an end in an opposite side of the opposing surface of the bag member in the first direction is defined as Xmax, in a case in which a position X, where 0≤X≤Xmax, using the opposing surface as a reference in the first direction is given, a length of the bag member on a plane perpendicular to the first direction in the second direction is defined as Y and a length of the bag member on the plane in the third direction is defined as Z, and in a case in which Y is YO in X=0 and a length of the opposing surface in the second direction is Yc, then:

$$X\max > Y \geqq Z \text{ in a range of } 0 \leqq X \leqq X\max,$$

$$0.8 \times Z0 \leqq Z \leqq 1.2 \times Z0 \text{ in the range of } 0 \leqq X \leqq X\max, \text{ and}$$

$$1 \leqq Y0/Yc \leqq 1.5.$$

20. A toner container mountable to and demountable from an image forming apparatus, the toner container comprising:

a bag member made of flexible film material, the bag member including (i) a side surface portion configured to form an accommodating space for accommodating toner inside thereof and extending in a first direction and (ii) a bottom portion configured to close the accommodating space from a first side in the first direction; and a discharging member connected to the bag member and configured to discharge the toner from the accommodating space to outside of the toner container, the discharging member including (i) an opposing surface configured to close the accommodating space from a second side of the bag member in the first direction and opposed to the bottom portion, a receiving opening provided in the opposing surface and configured to receive the toner inside the accommodating space, and (iii) a discharging opening communicating with the receiving opening and configured to discharge the toner received via the receiving opening, wherein, when directions perpendicular to the first direction and perpendicular to each other are defined as a second direction and a third direction, a length from the opposing surface to an end in an opposite side of the opposing surface of the bag member in the first direction is defined as Xmax, and in a case in which a position X, where 0≤X≤Xmax, using the opposing surface as a reference in the first direction is given, a length of the bag member on a plane perpendicular to the first direction in the second direction is defined as Y and a length of the bag member on the plane in the third direction is defined as Z, and in a case in which Y is YO in X=0, then:

$$X\max > Y \geqq Z \text{ in a range of } 0 \leqq X \leqq X\max,$$

$$0.8 \times Z0 \leqq Z \leqq 1.2 \times Z0 \text{ in the range of } 0 \leqq X \leqq X\max, \text{ and}$$

$$Y0 \leqq Y \leqq 2.5 \times Y0 \text{ and } Z \geqq 30 \text{ mm in the range of } 0 \leqq X \leqq X\max.$$

* * * * *